(12) United States Patent
Palermo et al.

(10) Patent No.: US 12,278,690 B2
(45) Date of Patent: Apr. 15, 2025

(54) ULTRA-LOW LATENCY INTER-SATELLITE COMMUNICATION LINKS

(71) Applicant: Intel Corporation, Santa Clara, CA (US)

(72) Inventors: Stephen T. Palermo, Chandler, AZ (US); Valerie J. Parker, Portland, OR (US); Udayan Mukherjee, Portland, OR (US); Rajesh Gadiyar, Chandler, AZ (US); Jason K. Smith, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 17/849,402

(22) Filed: Jun. 24, 2022

(65) Prior Publication Data

US 2022/0345210 A1 Oct. 27, 2022

Related U.S. Application Data

(60) Provisional application No. 63/217,000, filed on Jun. 30, 2021.

(51) Int. Cl.
*H04B 7/185* (2006.01)

(52) U.S. Cl.
CPC ..... *H04B 7/18584* (2013.01); *H04B 7/18519* (2013.01); *H04B 7/18521* (2013.01)

(58) Field of Classification Search
CPC ............... H04B 7/18513; H04B 7/195; H04B 7/18521; H04B 7/18541; H04B 7/2041; H04B 7/18504; H04B 7/18519; H04B 7/1851; H04B 7/18508; H04B 7/18563; H04B 7/18517; H04B 7/18526; H04B 7/18515; H04B 7/18528; H04B 7/18539; H04B 15/00; H04B 7/18545; H04B 7/18547; H04B 7/19; H04B 7/185; H04B 7/18578; H04B 17/309; H04B 17/318;
(Continued)

(56) References Cited

U.S. PATENT DOCUMENTS

| | | | |
|---|---|---|---|
| 9,973,984 B1* | 5/2018 | Hall | H04B 7/18513 |
| 2018/0227043 A1* | 8/2018 | Dankberg | H04B 7/2041 |
| 2022/0247486 A1* | 8/2022 | Iyer | H04B 7/18541 |
| 2023/0110434 A1* | 4/2023 | Holz | H04B 7/18563 |

(Continued)

FOREIGN PATENT DOCUMENTS

| | | |
|---|---|---|
| WO | 2021221736 | 11/2021 |
| WO | 2021221842 | 11/2021 |

OTHER PUBLICATIONS

Analysis of Inter-Satellite Link Paths for LEO Mega-Constellation Networks Quan Chen , Giovanni Giambene , Senior Member, IEEE, Lei Yang, Chengguang Fan, and Xiaoqian Chen, IEEE Transactions on Vehicular Technology, vol. 70, No. 3, Mar. 2021.*
"European Application Serial No. 22182083.0, Extended European Search Report mailed Nov. 18, 2022", 8 pgs.
Chen, Quan, "Analysis of Inter-Satellite Link Paths for LEO Mega-Constellation Networks", IEEE Transactions on Vehicular Technology, IEEE, USA, vol. 70, No. 3, (Feb. 9, 2021), 2743-2755.
(Continued)

*Primary Examiner* — Golam Sorowar
(74) *Attorney, Agent, or Firm* — Schwegman Lundberg & Woessner, P.A.

(57) ABSTRACT

Various approaches for the deployment and coordination of inter-satellite communication pathways, defined for use with a satellite non-terrestrial network, are discussed. Among other examples, such inter-satellite communication pathways may be identified, reserved, allocated, and used for ultra-low-latency communication purposes.

26 Claims, 42 Drawing Sheets

(58) Field of Classification Search
CPC .............. H04B 7/0617; H04B 7/18506; H04B 7/18584; H04B 7/024; H04W 84/06; H04W 16/28; H04W 36/00837; H04W 56/0045; H04W 64/00; H04W 24/02; H04W 84/005; H04W 48/12; H04W 28/08; H04W 36/328; H04W 48/10; H04W 4/40; H04W 36/085; H04W 36/322; H04W 76/15; H04W 12/08; H04W 24/08; H04W 64/006; H04W 84/042; G01S 19/02; G01S 19/14; G01S 19/07; G01S 19/074; G01S 19/10; G01S 19/33; G01S 19/40; G01S 19/072; G01S 19/073; G01S 19/256

See application file for complete search history.

(56) References Cited

U.S. PATENT DOCUMENTS

2023/0128255 A1* 4/2023 Liberg ............... H04B 7/18541
 455/427
2023/0130388 A1* 4/2023 Reid ....................... G01S 19/14
 342/357.44

OTHER PUBLICATIONS

"European Application Serial No. 22182083.0, Response filed Jul. 4, 2023 to Extended European Search Report mailed Nov. 18, 2022", 9 pgs.

* cited by examiner

SET EZ (OUTPUT PER CONSTELLATION)

*DISABLE DIFFERENT FREQUENCY IN DIFFERENT SPOTBEAMS*

| SVn.ID.NAME | SVn.SPOT1.TOGGLE | SVn.SPOTn.TOGGLE | | | |
|---|---|---|---|---|---|
| | | | SVn.SPOTn.FREQn.TOGGLE | | |
| | | | SVn.SPOT1.FREQ1 | SVn.SPOT1.FREQ2 | SVn.SPOT1.FREQ3 |
| SV1 | ENABLE | | ENABLE | ENABLE | ENABLE |
| SV2 | ENABLE | | ENABLE | ENABLE | ENABLE |
| SV3 | ENABLE | | ENABLE | ENABLE | ENABLE |
| SV4 | ENABLE | | ENABLE | ENABLE | ENABLE |
| SV5 | ENABLE | | ENABLE | ENABLE | ENABLE |
| SV6 | ENABLE | | ENABLE | ENABLE | ENABLE |
| SV7 | ENABLE | | ENABLE | VALUE1 | ENABLE |
| SV8 | ENABLE | | ENABLE | ENABLE | ENABLE |
| SV9 | ENABLE | | ENABLE | ENABLE | ENABLE |
| ... | ... | | ... | ... | ... |

1510A

VALUE 1:
SV7.SPOT1.FREQ2.DISABLE
START 2021-03-03 21:43:56;
STOP 2021-03-03 21:45:06;

SET EZ (OUTPUT PER CONSTELLATION)

1510B — DISABLE ALL FREQUENCIES OF SPOTBEAMS

| SVn.ID.NAME | | SVn.SPOT2.TOGGLE | SVn.SPOTn.FREQn.TOGGLE | | |
|---|---|---|---|---|---|
| | | | SVn.SPOT2.FREQ1 | SVn.SPOT2.FREQ2 | SVn.SPOT2.FREQ3 |
| SV1 | | | ENABLE | ENABLE | ENABLE |
| SV2 | | | ENABLE | ENABLE | ENABLE |
| SV3 | | | ENABLE | ENABLE | ENABLE |
| SV4 | | | ENABLE | ENABLE | ENABLE |
| ... | | | ... | ... | ... |
| SV12 | | | ENABLE | ENABLE | ENABLE |
| SV13 | | | VALUE2 | VALUE2 | VALUE2 |
| SV14 | | | ENABLE | ENABLE | ENABLE |
| SV15 | | | ENABLE | ENABLE | ENABLE |
| ... | | | ... | ... | |

1520B — VALUE 2:
SV13.SPOT2.DISABLE
START 2021-05-04 22:43:56;
STOP 2021-05-04 22:46:06;

*FIG. 15B*

SET EZ (OUTPUT PER CONSTELLATION)

1510C — *DISABLE INTER-SATELLITE LINKS PER DIRECTION*

| SVn.ID.NAME | ... | SVn.ISL.FORE | SVn.ISL.AFT | SVn.ISL.RIGHT | SVn.ISL.LEFT |
|---|---|---|---|---|---|
| SV1 | | ENABLE | ENABLE | ENABLE | ENABLE |
| ... | | ... | ... | ... | ... |
| SV15 | | ENABLE | ENABLE | ENABLE | ENABLE |
| SV16 | | ENABLE | VALUE5 | ENABLE | ENABLE |
| SV17 | | ENABLE | ENABLE | VALUE6 | ENABLE |
| SV18 | | ENABLE | ENABLE | ENABLE | VALUE8 |
| SV19 | | VALUE3 | ENABLE | VALUE7 | ENABLE |
| SV20 | | ENABLE | ENABLE | ENABLE | ENABLE |
| SV21 | | VALUE4 | VALUE4 | VALUE4 | VALUE4 |
| SV22 | | ENABLE | ENABLE | ENABLE | ENABLE |
| ... | | ... | ... | ... | ... |

1520C — VALUE 3:
SV19.ISL.FORE.DISABLE
START 2021-05-04 22:43:56;
STOP 2021-05-04 22:46:06;

1520D — VALUE 4:
SV21.ISL.{FORE, AFT, RIGHT, LEFT}.DISABLE
START 2021-05-04 22:43:56;
STOP 2021-05-04 22:46:06;

1520E — VALUE 5:
SV16.ISL.AFT.DISABLE
START 2021-05-04 22:43:56;
STOP 2021-05-04 22:46:06;

1520F — VALUE 6:
SV17.ISL.RIGHT.DISABLE
START 2021-05-04 22:43:56;
STOP 2021-05-04 22:46:06;

1520G — VALUE 7:
SV19.ISL.RIGHT.DISABLE
START 2021-05-04 22:43:56;
STOP 2021-05-04 22:46:06;

1520H — VALUE 8:
SV18.ISL.LEFT.DISABLE
START 2021-05-04 22:43:56;
STOP 2021-05-04 22:46:06;

*FIG. 15C*

SET EZ (OUTPUT PER CONSTELLATION)

*1510D   ENABLE SUN SHADE*

| SVn.ID.NAME | ... | |
|---|---|---|
| | | |
| | | |
| | | SVn.SHADE |
| SV1 | | DISABLE |
| .. | | ... |
| SV16 | | DISABLE |
| SV17 | | DISABLE |
| SV18 | | DISABLE |
| SV19 | | DISABLE |
| SV20 | | DISABLE |
| SV21 | | DISABLE |
| SV22 | | VALUE9 |
| SV23 | | DISABLE |
| ... | | ... |

*1520J*
VALUE 9:
SV22.SHADE ENABLED
START 2021-05-04 22:43:56;
STOP 2021-05-04 22:46:06;

FIG. 15D

SPOT BEAM FREQ EZ

☑ KEEP Inter-Satellite Links (ISLs)
☒ BLOCK SPOT/FREQ Signal(s)
☑ KEEP Light Reflections OK Prevent NGOS Interference w/Terrestrial
*POWER FLUX DENSITY LIMITS- I 22.2, M.1583*

SPOT BEAM EZ

☑ KEEP Inter-Satellite Links (ISLs)
☒ BLOCK SPOT/FREQ Signal(s)
☑ KEEP Light Reflections OK Prevent NGOS Interference w/Terrestrial
*POWER FLUX DENSITY LIMITS- I 22.2, M.1583*

Light Pollution EZ

☑ KEEP Inter-Satellite Links (ISLs)
☑ KEEP SPOT/FREQ Downlinks(s)
☒ BLOCK Light Reflections (SV Sunshade)

Prevent NGOS Light Pollution
FCC / ASTRONOMY / ITU-R RA.769

Inter-Satellite Link EZ

☒ BLOCK Inter-Satellite Links (ISLs)
☑ KEEP SPOT/FREQ Downlinks(s)
☑ KEEP Light Reflections OK Prevent NGOS ISL Interference w/GEO
ITU-R S.1591 AND WRC-97

*1810*

| SVn.ID.NAME | | | | | | | | | |
|---|---|---|---|---|---|---|---|---|---|
| | SVn.SPOTn.FREQ*n* | | | | | | | | |
| | | SVn.SPOT1.FREQ*n* | | | ISL.*DIRECTION* | | | | |
| | | | | | | | | | |
| | | | | | | | | | |
| SV1 | | | | | | | | | |
| SV2 | | (Frequency/ Spot Beam Enable and Fast Path Definition) (FIG. 19A / 19C) | | | (ISL Link Enable and Fast Path Definition) (FIG. 19B / 19D) | | | | |
| SV3 | | | | | | | | | |
| SV4 | | | | | | | | | |
| SV5 | | | | | | | | | |
| SV6 | | | | | | | | | |
| SV7 | | | | | | | | | |
| SV8 | | | | | | | | | |
| ... | | | | | | | | | |
| SV25 | | | | | | | | | |

FIG. 18

SET FP (OUTPUT PER CONSTELLATION)

DEFINE FASTPATH FOR ROUTING IN CONSTELLATION

*Note: SV7 is Initial SV that intercepts FP.START.TIME < FP.STOP.TIME.LIMIT;*

| SVn.ID.NAME | SVn.SPOTn. | SVn.SPOT1 | | | | |
|---|---|---|---|---|---|---|
| | | SVn.SPOT1.FREQ1 | SVn.SPOT1.FREQ2 | SVn.SPOT1.FREQ3 | | SVn.SPOTn.FREQn |
| SV1 | | ENABLE | ENABLE | ENABLE | | |
| SV2 | | ENABLE | ENABLE | ENABLE | | |
| SV3 | | ENABLE | ENABLE | ENABLE | | |
| SV4 | | ENABLE | ENABLE | ENABLE | | |
| SV5 | | ENABLE | ENABLE | ENABLE | | |
| SV6 | | ENABLE | ENABLE | ENABLE | | |
| SV7 | | FP1.a | ENABLE | ENABLE | | |
| ... | | ... | ENABLE | ENABLE | | |
| SV17 | | FP1.? | ENABLE | ENABLE | | |
| ... | | ... | ... | ... | | |

SET FP (OUTPUT PER CONSTELLATION)

*1910B* *DEFINE FASTPATH FOR ROUTING IN CONSTELLATION*

| SVn.ID.NAME | | | | |
|---|---|---|---|---|
| | | | | |
| | | | | |
| | SVn.SPOTn.FREQn.TOGGLE | | | |
| | SVn.ISL.FORE | SVn.ISL.AFT | SVn.ISL.RIGHT | SVn.ISL.LEFT |
| SV1 | ENABLE | ENABLE | ENABLE | ENABLE |
| SV2 | ENABLE | ENABLE | ENABLE | ENABLE |
| SV3 | ENABLE | ENABLE | FP1.d | FP1.c |
| SV4 | ENABLE | ENABLE | ENABLE | ENABLE |
| SV5 | ENABLE | ENABLE | ENABLE | ENABLE |
| SV6 | ENABLE | ENABLE | ENABLE | ENABLE |
| SV7 | FP1.b | ENABLE | FP1.b | ENABLE |
| SV8 | ENABLE | ENABLE | ENABLE | ENABLE |
| SV9 | ENABLE | ENABLE | ENABLE | ENABLE |
| ... | ... | ... | ... | ... |
| SV14 | ENABLE | ENABLE | ENABLE | ENABLE |
| SV15 | ENABLE | ENABLE | ENABLE | ENABLE |
| SV16 | ENABLE | ENABLE | FP1.f | FP1.e |
| SV17 | ENABLE | ENABLE | ENABLE | ENABLE |
| SV18 | FP1.h | ENABLE | ENABLE | FP1.g |
| SV19 | ENABLE | ENABLE | ENABLE | ENABLE |
| SV20 | ENABLE | ENABLE | ENABLE | ENABLE |
| SV21 | ENABLE | ENABLE | ENABLE | ENABLE |
| SV22 | ENABLE | ENABLE | ENABLE | ENABLE |
| ... | ... | ... | ... | ... |

FIG. 19B

1910C SET FP (OUTPUT PER CONSTELLATION)
DEFINE FASTPATH FOR ROUTING IN CONSTELLATION – USING MULTIPLE ORBITAL PLANES

| Ground Station (Cloud/Edge) | SVn.ID.NAME | Orbital Plane # | | SVn.SPOT1.FREQ1 | SVn.SPOT1.FREQ2 | SVn.SPOT1.FREQ3 | SVn.SPOTn.FREQn |
|---|---|---|---|---|---|---|---|
| Cloud GS #45 | SV56 | LOW#2 | | FP3 | ENABLE | ENABLE | |
| | ... | | | | | | |
| | SV77 | LOW#2 | | ENABLE | ENABLE | ENABLE | |
| | ... | | | | | | |
| | SV47 | HIGH#1 | | ENABLE | ENABLE | ENABLE | |
| | ... | | | | | | |
| | SV87 | HIGH#1 | | ENABLE | ENABLE | ENABLE | |
| | ... | | | | | | |
| | SV25 | HIGH#1 | | ENABLE | ENABLE | ENABLE | |
| | ... | | | | | | |
| | SV8 | HIGH#1 | | ENABLE | ENABLE | ENABLE | |
| | ... | | | | | | |
| | SV38 | HIGH#1 | | ENABLE | ENABLE | ENABLE | |
| | ... | | | | | | |
| | SV5 | HIGH#1 | | ENABLE | ENABLE | ENABLE | |
| | ... | | | | | | |
| Cloud GS #45 | SV70 | HIGH#1 | | ENABLE | ENABLE | ENABLE | |

Note: SV56 is the START Contact SV that intercepts FP.START.TIME < FP.STOP.TIME.LIMIT;

SV70 is the END Contact SV that intercepts FP.START.TIME < FP.STOP.TIME.LIMIT;

*FIG. 19C*

SET FP (OUTPUT PER CONSTELLATION)
DEFINE FASTPATH FOR ROUTING IN CONSTELLATION – USING MULTIPLE ORBITAL PLANES

1910D

| Ground Station (Cloud/Edge) | SVn.ID.NAME | Orbital Plane # | SVn.SPOTn.FREQn.TOGGLE / SVn.ISL.FORE | SVn.ISL.AFT | SVn.ISL.RIGHT | SVn.ISL.LEFT |
|---|---|---|---|---|---|---|
| Cloud GS #45 | SV56 | LOW#2 | FP3 | ENABLE | ENABLE | ENABLE |
| | SV77 | LOW#2 | ENABLE | FP3 | FP3 | ENABLE |
| ... | SV47 | HIGH#1 | ENABLE | ENABLE | ENABLE | ENABLE |
| | SV87 | HIGH#1 | ENABLE | FP3 | FP3 | FP3 |
| ... | SV25 | HIGH#1 | ENABLE | ENABLE | FP3 | ENABLE |
| ... | SV8 | HIGH#1 | ENABLE | ENABLE | FP3 | FP3 |
| ... | SV38 | HIGH#1 | ENABLE | ENABLE | FP3 | ENABLE |
| ... | SV5 | HIGH#1 | ENABLE | ENABLE | ENABLE | FP3 |
| Cloud GS #45 | SV70 | HIGH#1 | ENABLE | FP3 | ENABLE | FP3 |

*FIG. 19D*

ULTRA-LOW LATENCY INTER-SATELLITE COMMUNICATION LINKS

PRIORITY CLAIM

This application claims the benefit of priority to U.S. Provisional Patent Application No. 63/217,000, filed Jun. 30, 2021, and titled "ULTRA-LOW LATENCY INTER-SATELLITE COMMUNICATION LINKS", which is incorporated herein by reference in its entirety.

TECHNICAL FIELD

Embodiments described herein generally relate to data processing and network communication scenarios involved with satellite-based networking, such as with the use of inter-satellite communications and communication paths via low earth orbit satellite deployments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 14, 15A, 15B, 15C, and 15D illustrate tables of settings for establishing exclusion zones in a non-terrestrial communication network, according to an example;

FIGS. 18, 19A, 19B, 19C, and 19D illustrates tables of settings for establishing ultra-low latency fast path connections within inter-satellite links, according to an example;

OVERVIEW

Figure 1:
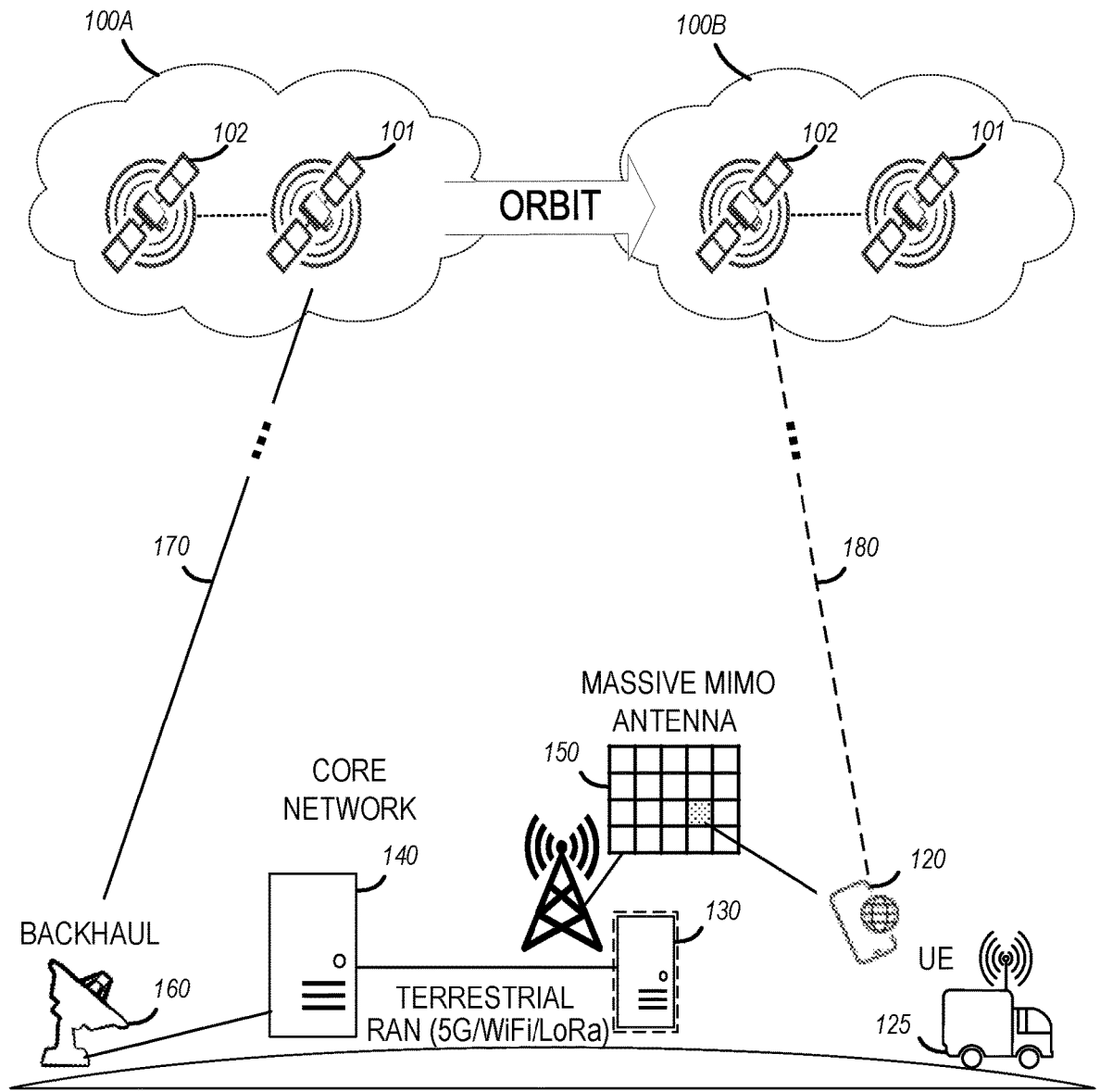
FIG. 1 illustrates network connectivity in non-terrestrial (satellite) and terrestrial (e.g., mobile cellular network) settings, according to an example.

The following disclosure addresses controls provided for non-terrestrial network communications (e.g., for networks in low earth orbit (LEO), generally referring to satellite constellation orbits with altitudes of 450-2,000 km, or very low earth orbit (VLEO), generally referring to satellite constellation orbits with altitudes between 250-450 km). In one set of examples, this is provided through the adaptation of satellite vehicle (SV)-based exclusion zones, implemented at the satellite constellation, which disable, reduce, or change satellite spot beams (signals that are concentrated in power) used to provide network connectivity. As will be understood, a satellite-implemented exclusion zone caused from spot-beam enable/disable is broad and has large implications to enable or disable connectivity to many devices in a large geographic areas. This may have unintended consequences in scenarios where communications must still occur (e.g., in emergency scenarios). With the following techniques, characteristics may be defined and used to establish an "inclusion zone" or "exclusion-override" where the satellite connectivity is offered even despite the exclusion zone.

Additionally, the following techniques enable the definition and use of an ultra-low latency satellite-based communications "fast path", that may even be faster (lower latency) than using terrestrial fiber. As will be understood, light travels up to 30 percent faster in space vacuum than in fiber,
} and therefore lower latencies are possible by leveraging communication pathways within a satellite-based constellation (or among multiple satellite constellations) using light/laser-based inter-satellite links.

In an example, pre-determined fast-path (FP) pathways are scheduled or reserved by a service provider. Satellite constellation orbital information and telemetry heuristics are used together to identify and establish the FP pathways within routing tables used for routing satellite communications. The routing tables with the FPs are generated (e.g., generated on earth, based on planned orbital paths of the LEO or VLEO constellation), and then uploaded into the satellite LEO or VLEO constellation to support the contact payload specified at the time the FP is scheduled.

In various examples, the FP pathways may include use of a satellite spot beam or frequencies within that spot beam for a start and stop time. A contact for the FP can be either a UE or a Ground Station capable of a LEO or VELO connection. Once the FP is originated, the payload travels within the predetermined routes for the specified contact time, and the payload uses several space vehicles with optical/laser inter-satellite links to support data transmission.

In the following, the FP pathways (including, FP contacts along the pathways) may be configured to intercept multiple terrestrial network/non-terrestrial network constellations with roaming agreements. In particular, once a FP contact is established along this pathway, the FP contact turns into a reserved "exclusion zone" to protect integrity of the FP contact resource (so the FP contact resources do not get overscheduled).

The resulting transmission using a FP is less latent (faster) then would be otherwise possible using fiber because of space vacuum efficiencies. As will be understood, a variety of processing actions may occur at terrestrial (ground) processing systems or at non-terrestrial (satellite) processing systems to identify, provision, configure, operate, re-configure, and discontinue such FPs. The many types of processing operations that are associated with such FP actions are discussed in detail in the following.

Overview of Non-Terrestrial Network Configurations

FIG. 1 illustrates network connectivity in non-terrestrial (satellite) and terrestrial (e.g., mobile cellular network) settings, according to an example. As shown, a satellite constellation 100 (the constellation depicted in FIG. 1 at orbital positions 100A and 100B) may include multiple satellite vehicles (SVs) 101, 102, which are connected to each other and to one or more terrestrial networks. The individual satellites in the constellation 100 (each, an SV) conduct an orbit around the earth, at an orbit speed that increases as the SV is closer to earth. LEO constellations are generally considered to include SVs that orbit at an altitude between 160 and 1000 km; at this altitude, each SV orbits the earth about every 90 to 120 minutes.

The constellation 100 includes individual SVs 101, 102 (and numerous other SVs not shown), and uses multiple SVs to provide communications coverage to a geographic area on earth. The constellation 100 may also coordinate with other satellite constellations (not shown), and with terrestrial-based networks, to selectively provide connectivity and services for individual devices (user equipment) or terrestrial network systems (network equipment).

In this example, the satellite constellation 100 is connected via a satellite link 170 to a backhaul network 160, which is in turn connected to a 5G core network 140. The 5G core network 140 is used to support 5G communication operations with the satellite network and at a terrestrial 5G radio access network (RAN) 130. For instance, the 5G core network 140 may be located in a remote location, and use the satellite constellation 100 as the exclusive mechanism to reach wide area networks and the Internet. In other scenarios, the 5G core network 140 may use the satellite constellation 100 as a redundant link to access the wide area networks and the Internet; in still other scenarios, the 5G core network 140 may use the satellite constellation 100 as an alternate path to access the wide area networks and the Internet (e.g., to communicate with networks on other continents).

FIG. 1 additionally depicts the use of the terrestrial 5G RAN 130, to provide radio connectivity to a user equipment (UE) such as user device 120 or vehicle 125 on-ground via a massive MIMO antenna 150. It will be understood that a variety of 5G and other network communication components and units are not depicted in FIG. 1 for purposes of simplicity. In some examples, each UE 120 or 125 also may have its own satellite connectivity hardware (e.g., receiver circuitry and antenna), to directly connect with the satellite constellation 100 via satellite link 180. Although a 5G network setting is depicted and discussed at length in the following sections, it will be apparent that other variations of 3GPP, O-RAN, and other network specifications may also be applicable.

Other permutations (not shown) may involve a direct connection of the 5G RAN 130 to the satellite constellation 100 (e.g., with the 5G core network 140 accessible over a satellite link); coordination with other wired (e.g., fiber), laser or optical, and wireless links and backhaul; multi-access radios among the UE, the RAN, and other UEs; and other permutations of terrestrial and non-terrestrial connectivity. Satellite network connections may be coordinated with 5G network equipment and user equipment based on satellite orbit coverage, available network services and equipment, cost and security, and geographic or geopolitical considerations, and the like. With these basic entities in mind, and with the changing compositions of mobile users and in-orbit satellites, the following techniques describe ways in which terrestrial and satellite networks can be extended for various edge computing scenarios.

Figure 2:
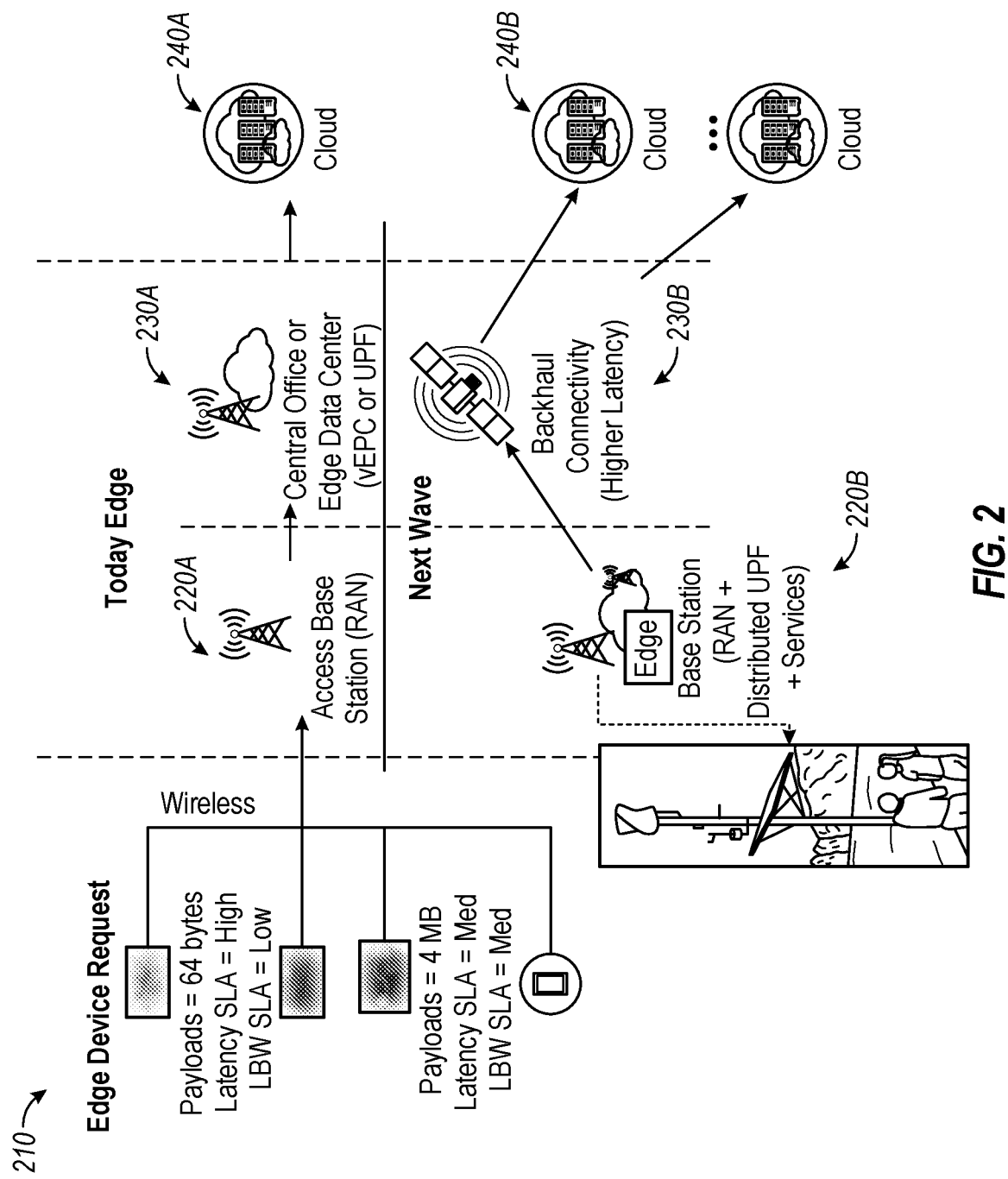
FIG. 2 illustrates terrestrial and non-terrestrial edge connectivity architectures, according to an example.

FIG. 2 illustrates terrestrial and non-terrestrial edge connectivity architectures, extended with the present techniques. Edge cloud computing has already been established as one of the next evolutions in the context of distributed computing and democratization of compute. Current edge deployments typically involve a set of devices 210 or users connected to access data points 220A (base stations, small cells, wireless or wired connectivity) that provide access to a set of services (hosted locally on the access points or other points of aggregations) via different type of network functions 230A (e.g., virtual Evolved Packet Cores (vEPCs), User Plane Function (UPF), virtual Broadband Network Gateway (vBNG), Control Plane and User Plane Separation (CUPS), Multiprotocol Label Switching (MPLS), Ethernet etc.). Multiple constellation of satellites that act as different organizations have a significant need to work together, share resources, and offer features such as geographic exclusion zones, quality of service (QoS), and low-latency content and service delivery.

In the architecture of FIG. 2, devices 210 are connected to a new type of edge location at a base station 220B, that implements access capabilities (such as Radio Antenna Network), network functions (e.g., vEPC with CUPS/UPF, etc.), and a first level of edge services (such as a content delivery network (CDN)). Such services conventionally required connectivity to the cloud 240A or the core of the network. Here, in a satellite connectivity setting, such content and compute operations may be coordinated at a base station 220B offering RAN and distributed functions and services. The base station 220B in turn may obtain content or offload processing to a cloud 240B or other service via backhaul connectivity 230B, via satellite communication (for example, in a scenario where a CDN located at the base station 220B needs to obtain uncached content). RAN functions can be split further into wireless and wired processing such as RAN-Distributed Unit (DU) L1/L2 processing and RAN-Centralized Unit (CU) L3 and higher processing.

Figure 3:
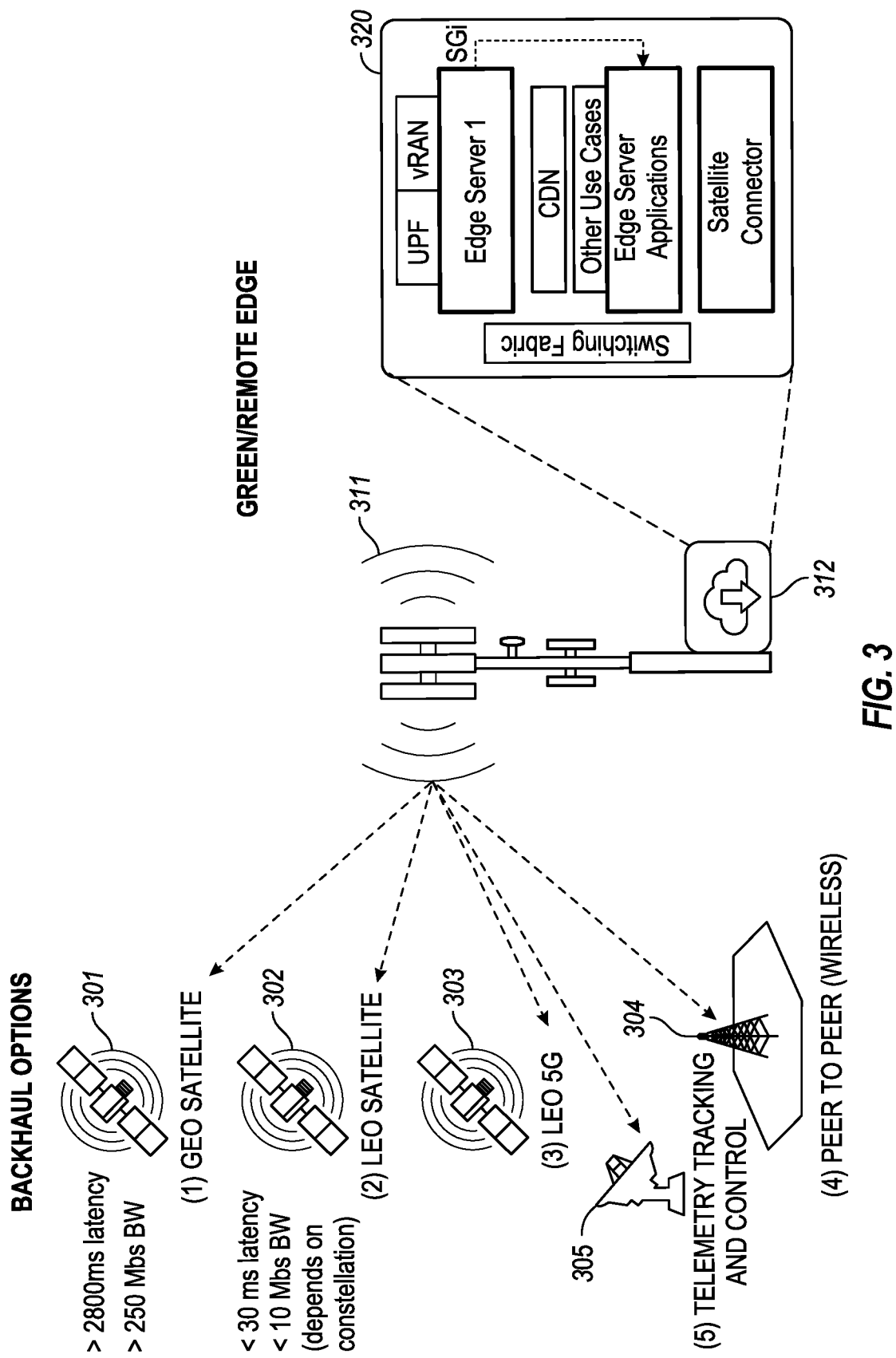
FIG. 3 illustrates multiple types of satellite communication networks, according to an example.

FIG. 3 illustrates multiple types of satellite communication networks. Here, multiple types of backhaul options are illustrated, including a geosynchronous (GEO) satellite network 301 (discussed below with reference to FIG. 4), a low earth orbit (LEO) satellite network 302 (discussed below with reference to FIG. 5A), and a low earth orbit 5G (LEO 5G) satellite network 303 (discussed below with reference to FIG. 5B). In each of these cases, a remote edge RAN access point 311, connected to a 5G core network, uses one or more of the satellite networks 301, 302, 303 to provide backhaul connectivity to a larger communications network (e.g., the Internet). The use of satellite backhaul may be in addition to other types of wired or wireless backhauls, including terrestrial backhaul to other 5G RAN wireless networks (e.g., peer-to-peer to wireless network 304), or control information communicated or obtained via telemetry tracking and control (TTAC) network 305. For example, the TTAC network 305 may be used for operation and maintenance traffic, using a separate link for system control backhaul (e.g., on a separate satellite communications band).

At the access point 311, various edge computing services 312 may be provided based on an edge computing architecture 320, such as that included within a server or compute node. This edge computing architecture 320 may include: UPF/vRAN functions; one or more Edge Servers configured to provide content data network (CDN) Functions, Services, Applications, and other use cases; and a Satellite Connector (hosted in the edge computing architecture 320). This architecture 320 may be connected by a high speed switching fabric.

Figure 4:
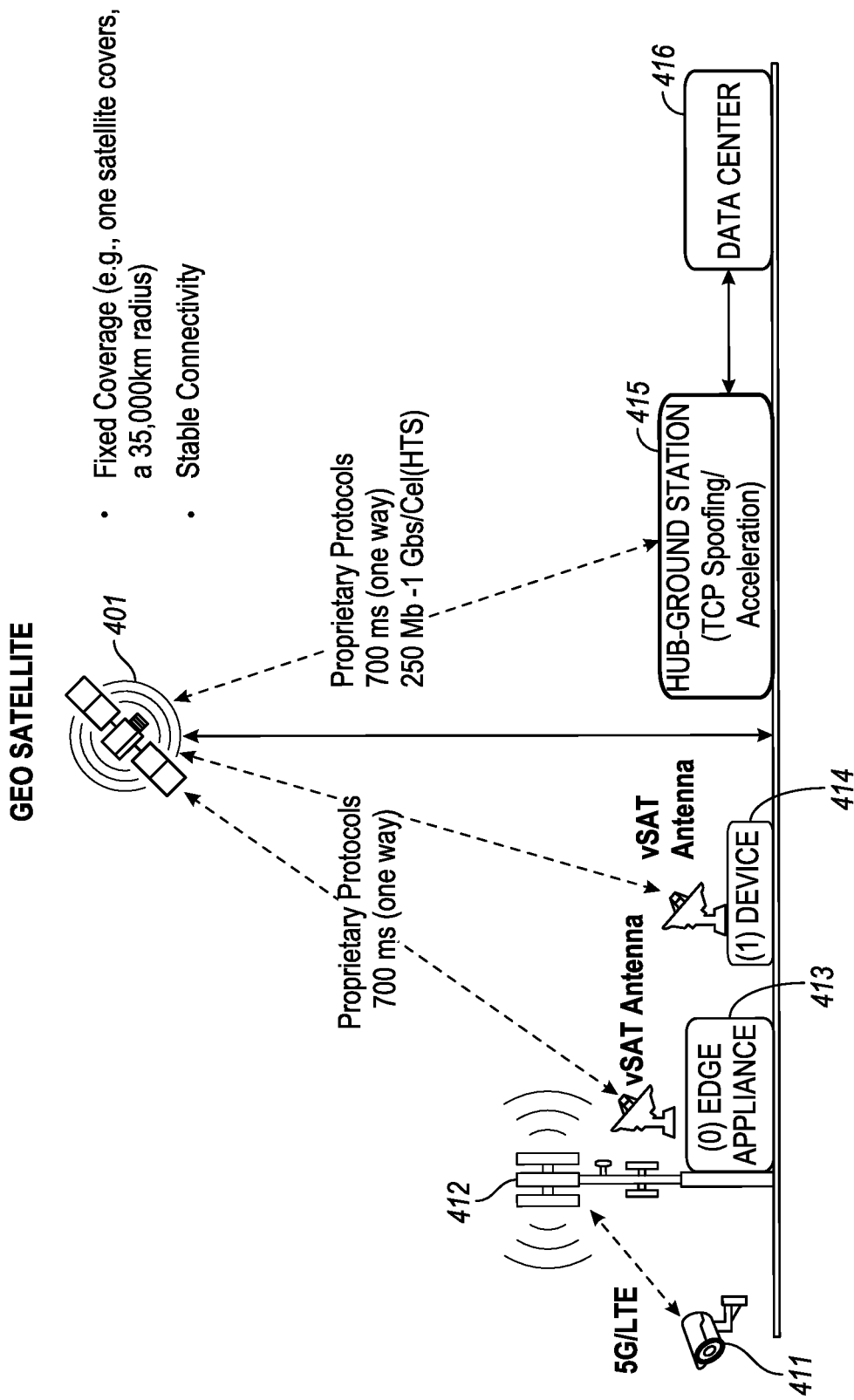
FIG. 4 illustrates terrestrial communication and architecture details in a geosynchronous satellite communication network, according to an example.

FIG. 4 illustrates terrestrial communication and architecture details in a geosynchronous satellite communication network. Here, an example IoT device 411 uses a 5G/LTE connection to a terrestrial RAN 412, which hosts an edge appliance 413 (e.g., for initial edge compute processing). The RAN 412 and edge appliance 413 are connected to a geosynchronous satellite 401, using a satellite link via a very-small-aperture terminal (vSAT) antenna. The geosynchronous satellite 401 may also provide direct connectivity to other satellite connected devices, such as a device 414. The use of existing 5G and geosynchronous satellite technology makes this solution readily deployable in a variety of settings.

In an example, 5G connectivity is provided in the geosynchronous satellite communication scenario using a distributed UPF (e.g., connected via the satellite) or a standalone core (e.g., located at a satellite-connected hub/ground station 415) or directly at the edge appliance 413. In any case, edge compute processing may be performed and distributed among the edge appliance 413, the ground station 415, or a connected data center 416.

Figure 5A:
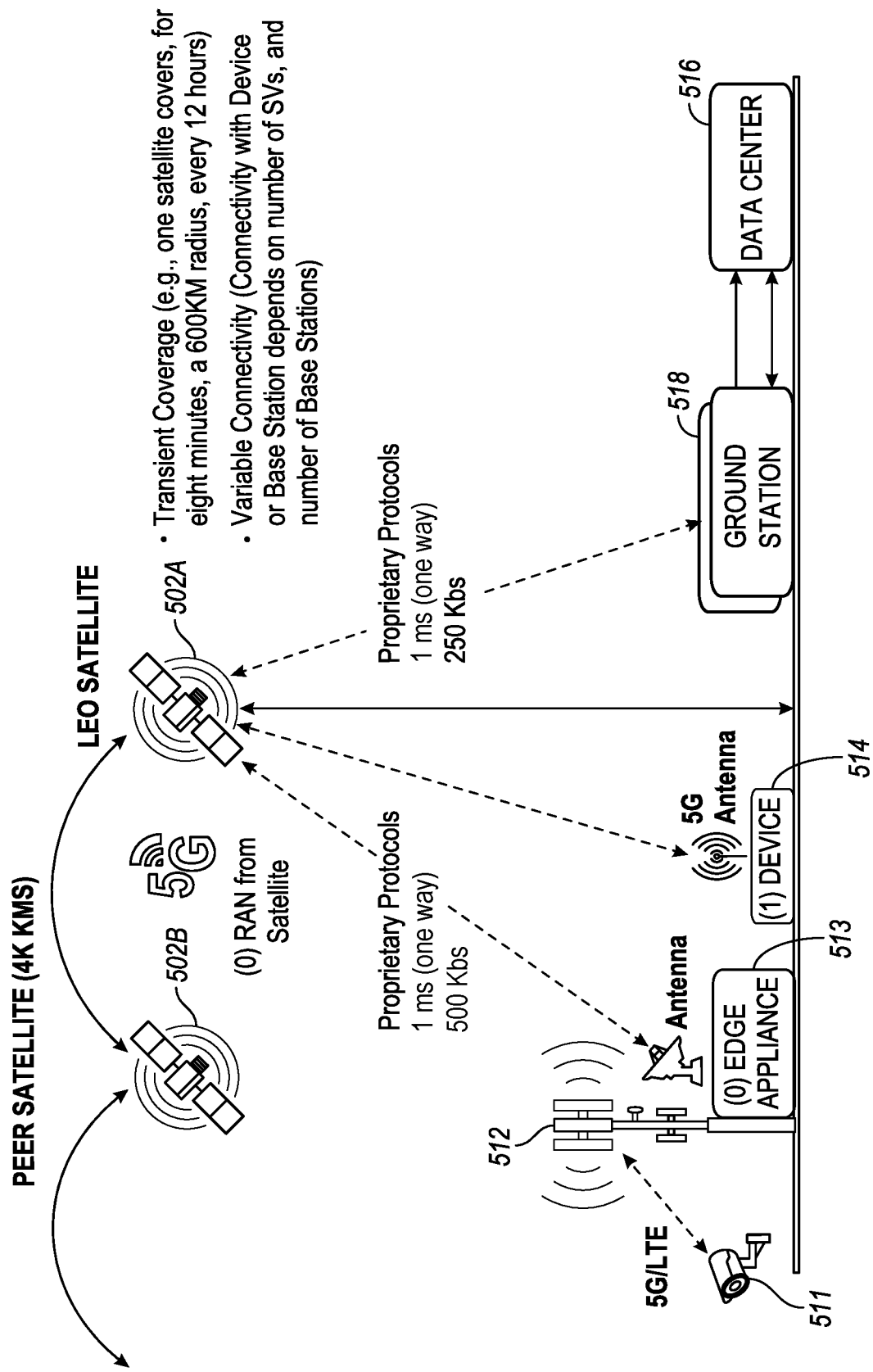
FIGS. 5A and 5B illustrate terrestrial communication and architecture details in a low earth orbit (LEO) satellite communication network, according to an example.
Figure 5B:
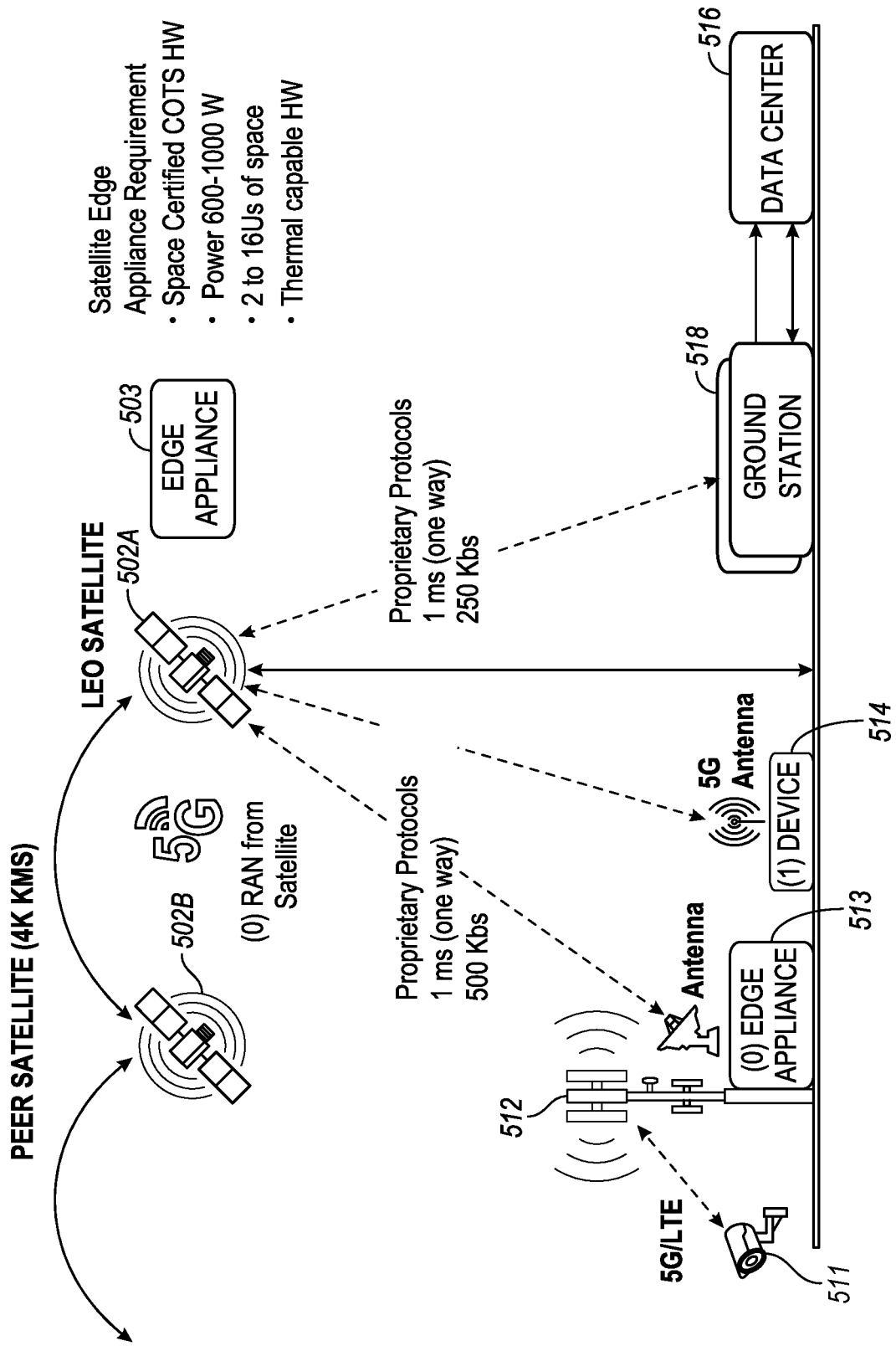

FIGS. 5A and 5B illustrate terrestrial communication and architecture details in a low earth orbit satellite communication network, provided by SVs 502A, 502B in constellation 502. These drawings depict similar devices and edge systems as FIG. 4, with an IoT device 511, an edge appliance 513, and a device 514. However, the provision of a 5G RAN from SVs 502A, 502B, and the significantly reduced latency from low earth orbit vehicles, enables much more robust use cases, including the direct connection of devices (device 514) using 5G satellite antennas at the device 514, and communication between the edge appliance 513 and the satellite constellation 502 using proprietary protocols.

As an example, in some LEO settings, one 5G LEO satellite can cover a 500 KM radius for approximately 8 minutes, every 12 hours. Connectivity latency to LEO satellites may be as small as one millisecond. Further, connectivity between the satellite constellation and the device 514 or the base station 512 depends on the number and capability of satellite ground stations. In this example, the satellite 501 communicates with a ground station 518 which may host edge computing processing capabilities. The ground station 518 in turn may be connected to a data center 516 for additional processing. With the low latency offered by 5G communications, data processing, compute, and storage may be located at any number of locations (at edge, in satellite, on ground, at core network, at low-latency data center).

FIG. 5B includes the addition of an edge appliance 503 located at the SV 502A. Here, some of the edge compute operations may be directly performed using hardware located at the SV, reducing the latency and transmission time that would have been otherwise needed to communicate with the ground station 518 or data center 516. Likewise, in these scenarios, edge compute may be implemented or coordinated among specialized processing circuitry (e.g., FPGAs) or general purpose processing circuitry (e.g., x86 CPUs) located at the satellite 501, the ground station 518, the devices 514 connected to the edge appliance 513, the edge appliance 513 itself, and combinations thereof.

Although not shown in FIGS. 5A to 5B, other types of orbit-based connectivity and edge computing may be involved with these architectures. These include connectivity and compute provided via balloons, drones, dirigibles, and similar types of non-terrestrial elements. Such systems encounter similar temporal limitations and connectivity challenges (like those encountered in a satellite orbit).

Figure 6:
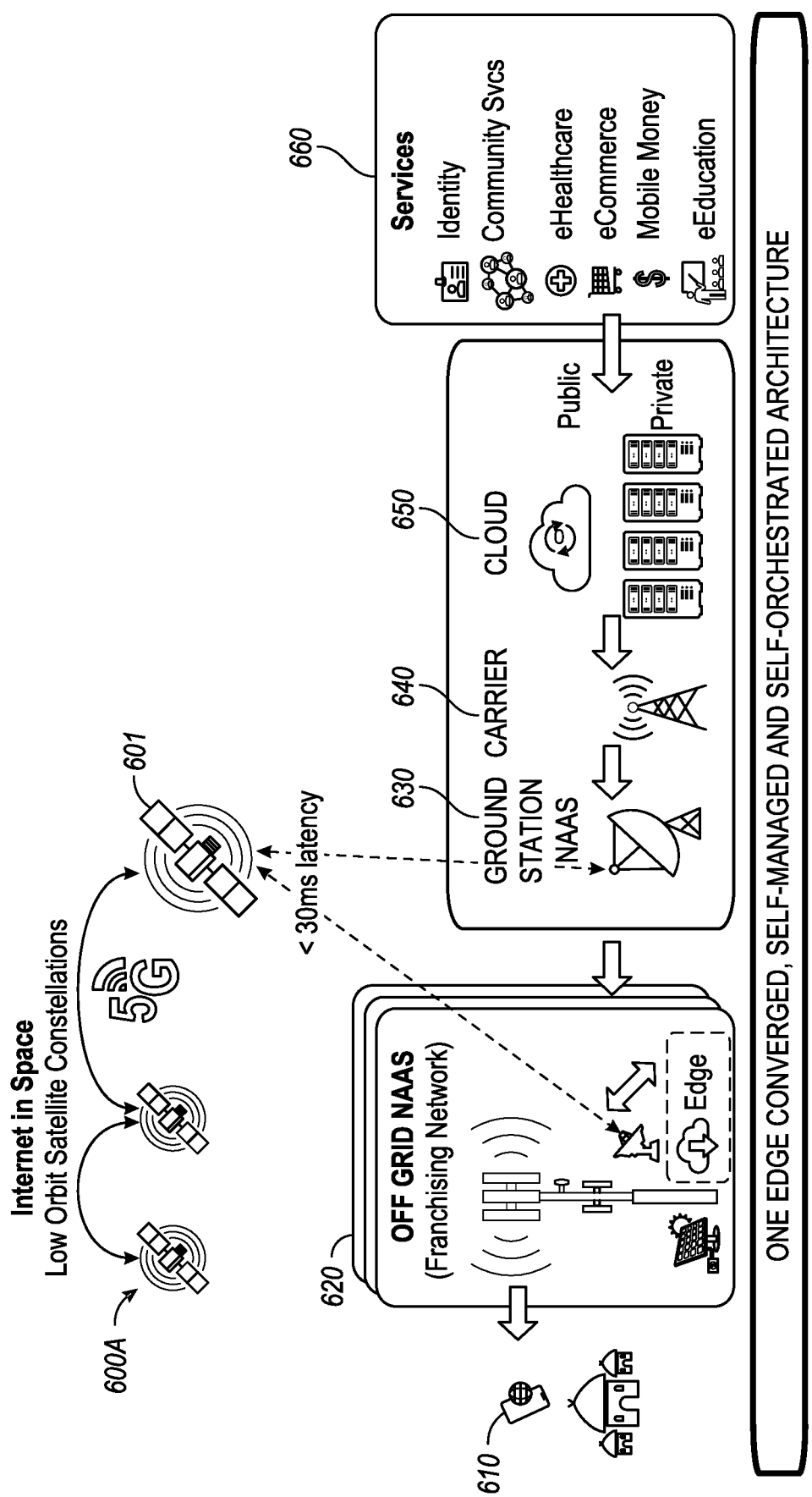
FIG. 6 illustrates a network connectivity ecosystem implementing a LEO satellite communication network, according to an example.

FIG. 6 illustrates a network connectivity ecosystem implementing a satellite communication network. Here, a satellite 601, part of satellite constellation 600A, provides coverage to an "off-grid" wireless network 620 (such as a geographically isolated network without wired backhaul). This wireless network 620 in turn provides coverage to individual user equipment 610. Via the satellite connection, a variety of other connections can be made to broader networks and services. These connections include connection to a carrier 640 or to a cloud service 650 via a satellite ground station 630. At the cloud service 650, a variety of public or private services 660 may be hosted. Additionally, with the deployment of edge computing architectures, these services can be moved much closer to the user equipment 610, based on coordination of operations at the network 620, the satellite constellation 600A, the ground station 630, or the carrier 640. Such configurations are particularly useful for the connection of industry IoT devices, mobility devices (such as robotaxis, autonomous vehicles), and the overall concept of offering connectivity for "anyone" and "anything".

Figure 7:
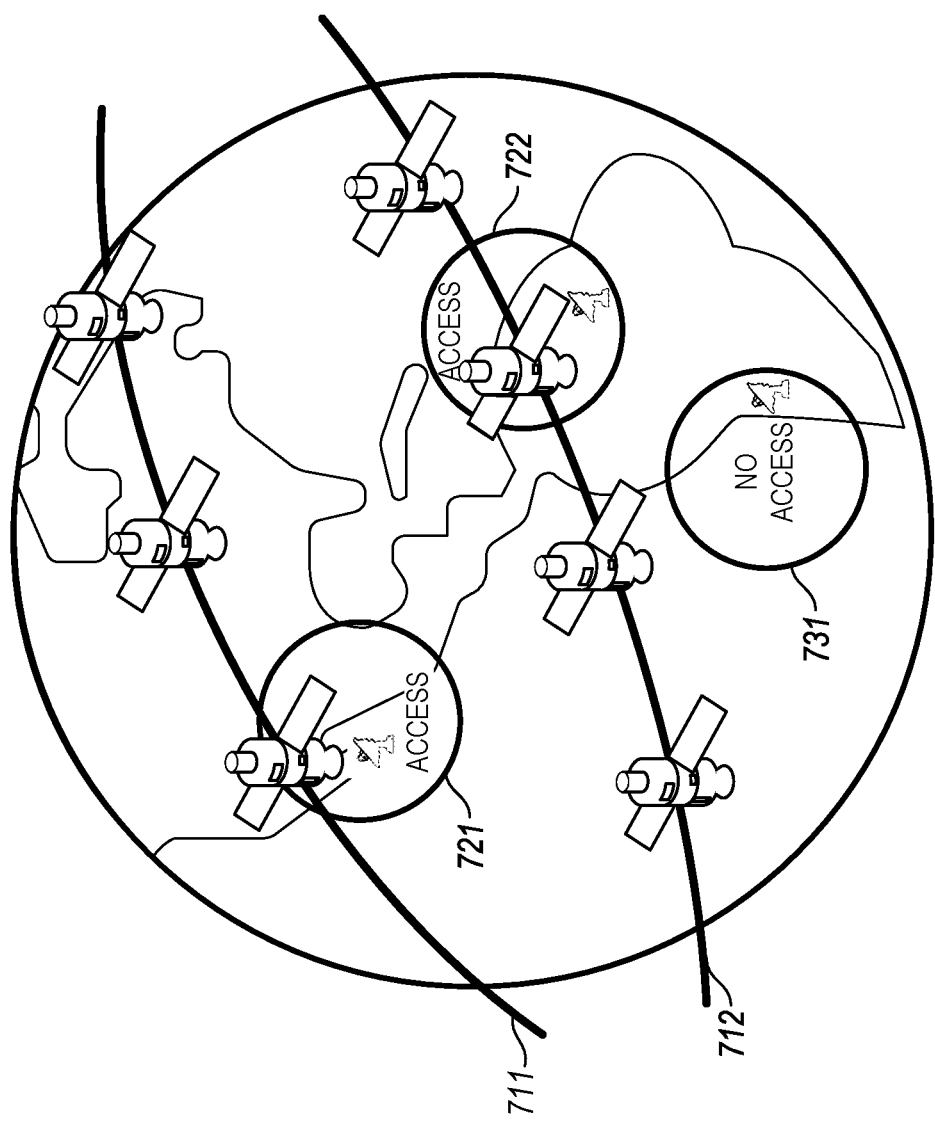
FIG. 7 illustrates an overview of terrestrial-based, LEO satellite-enabled edge processing, according to an example.

FIG. 7 illustrates an example, simplified scenario of geographic satellite connectivity from multiple LEO satellite communication networks, which depicts the movement of the relevant LEO SVs relative to geographic areas. Here, the orbits 711, 712 of respective satellite constellations operate to provide network coverage in limited geographic areas 721, 722. In contrast, there is no access provided in area 731. It will be understood that the geographic positions of relevant satellite coverage areas may play an important part in determining service characteristics, exclusion zones, and coordination of satellite-ground processing. Such geographic positions also play a role in the coordination and configuration of an inter-satellite fast path as discussed herein.

Figure 8:
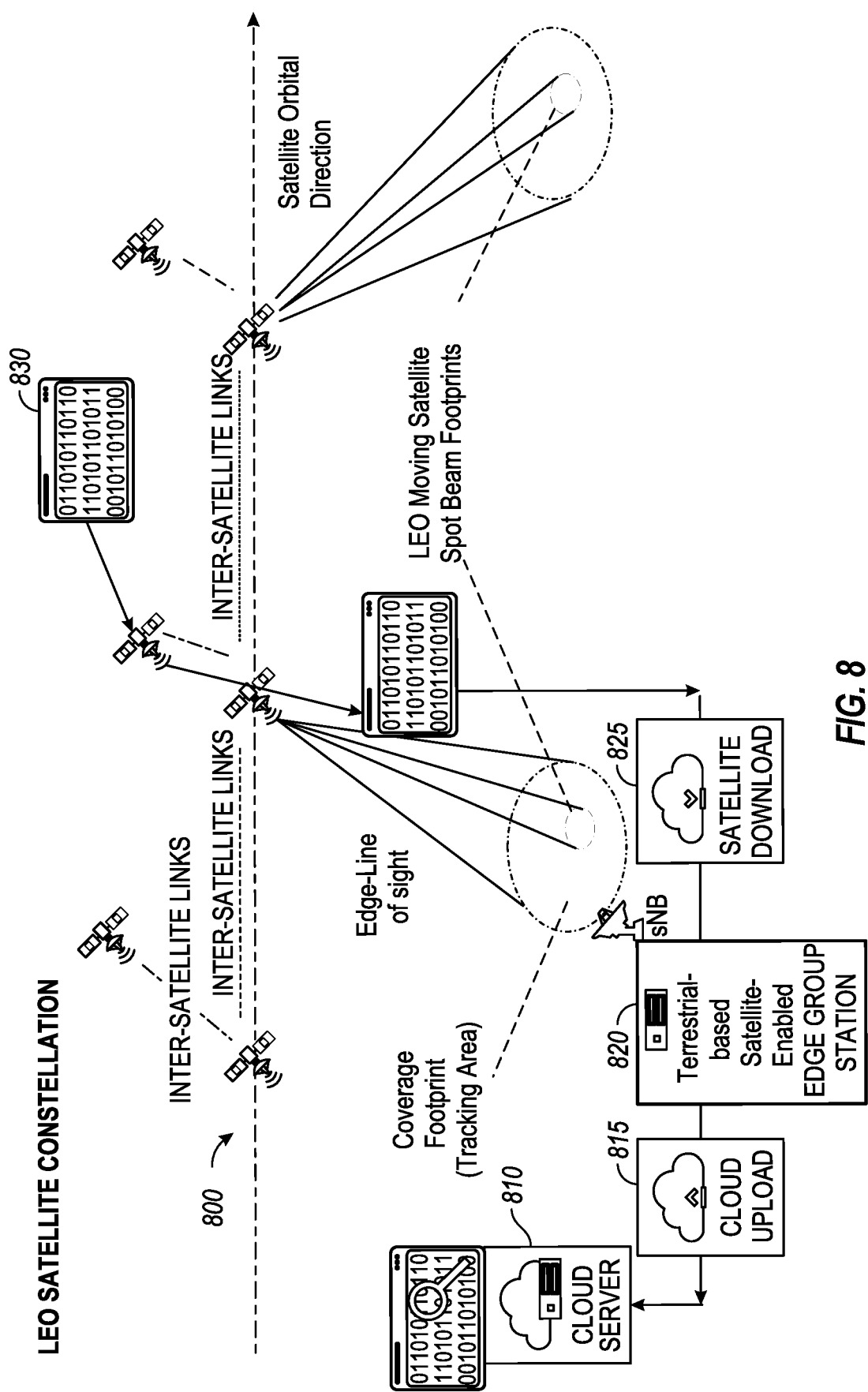
FIG. 8 illustrates a scenario of geographic satellite connectivity from LEO satellite communication networks, according to an example.

FIG. 8 illustrates an overview of terrestrial-based, satellite-enabled edge processing. As shown, a terrestrial-based, satellite enabled EDGE ground station (satellite nodeB, sNB) 820 obtains coverage from a satellite constellation 800, and downloads a data set 830. The constellation 800 may coordinate operations to handoff the download using inter-satellite links (such as in a scenario where the data set 830 is streamed, or cannot be fully downloaded before the satellite footprint moves).

The satellite download 825 is provided to the sNB 820 for processing, such as with a cloud upload 815 to a server 810 (e.g., a CDN located at or near the sNB 820). Accordingly, once downloaded to the sNB 820 (and uploaded to the server 810), the user devices located within the terrestrial coverage area (e.g., 5G coverage area) of the sNB 820 now may access the data from the server 810.

Figure 9A:
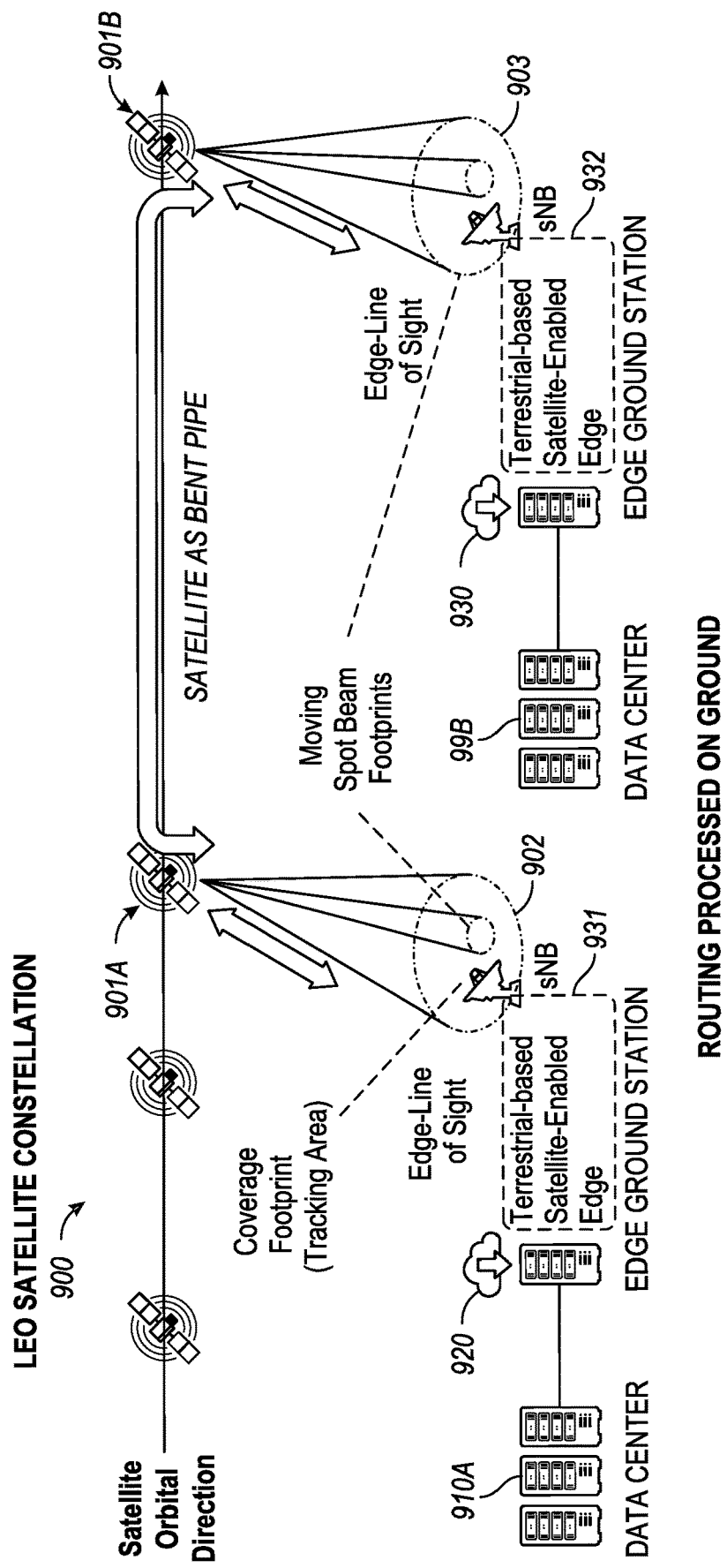
FIGS. 9A and 9B illustrate terrestrial-based, LEO satellite-enabled edge processing arrangements, according to an example.

FIG. 9A illustrates a terrestrial-based, satellite-enabled edge processing arrangement, where routing is performed "on-ground" and the satellite is used as a "bent pipe" between edge processing locations. Here, the term "bent pipe" refers to the use of a satellite or satellite constellation as a connection relay, to simply communicate data from one terrestrial location to another terrestrial location. As shown in this figure, a satellite 900 in a constellation has an orbital path, moving from position 901A to 901B, providing separate coverage areas 902 and 903 for connectivity at respective times.

Here, when a satellite-enabled edge computing node 931 (sNB) is in the coverage area 902, it obtains connectivity via the satellite 900 (at position 901A), to communicate with a wider area network. Additionally, this edge computing node sNB 931 may be located at an edge ground station 920 which is also in further communication with a data center 910A, for performing computing operations at a terrestrial location.

Likewise, when a satellite-enabled edge computing node 932 (sNB) is in the coverage area 903, it obtains connectivity via the satellite 900 (at position 901B), to communicate with a wider area network. Again, computing operations (e.g., services, applications, etc.) are processed at a terrestrial location such as edge ground station 930 and data center 910B.

Figure 9B:
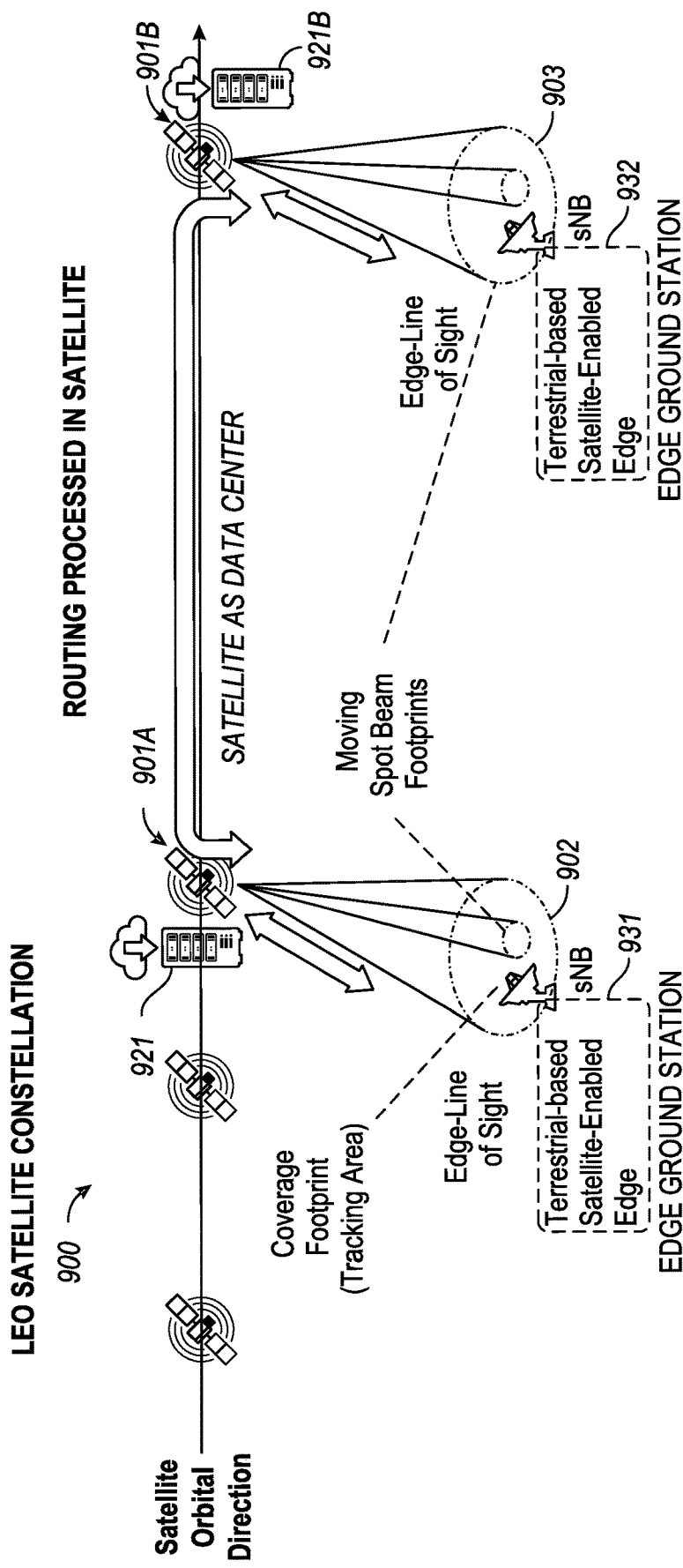

FIG. 9B illustrates another terrestrial-based, satellite-enabled edge processing arrangement. Similar to the arrangement depicted in FIG. 9A, this shows the satellite 900 in a constellation along an orbital path, moving from position 901A to 901B, providing separate coverage areas 902 and 903 at respective times. However, in this example, the satellite is used as a data center, to perform edge computing operations (e.g., serve data, compute data, relay data, etc.).

Specifically, at the satellite vehicle, edge computing hardware 921 is located to process computing or data requests received from the ground station sNBs 931, 932 in the coverage areas 902, 903. This may have the benefit of removing the communication latency involved with another location at the wide area network. However, due to processing and storage constraints, the amount of computation power may be limited at the satellite 900 and thus some requests or operations may be moved to the ground stations 931, 932.

As will be understood, edge computing and edge network connectivity may include various aspects of RAN and software defined networking processing. Specifically, in many of these scenarios, wireless termination may be moved between ground and satellite, depending on available processing resources. Further, in these scenarios, URLCC (ultra-reliable low latency connections) processing may be enabled, based on the configuration of inter-satellite communication links as discussed below.

Types and Scenarios of Exclusion Zones

Figure 10:
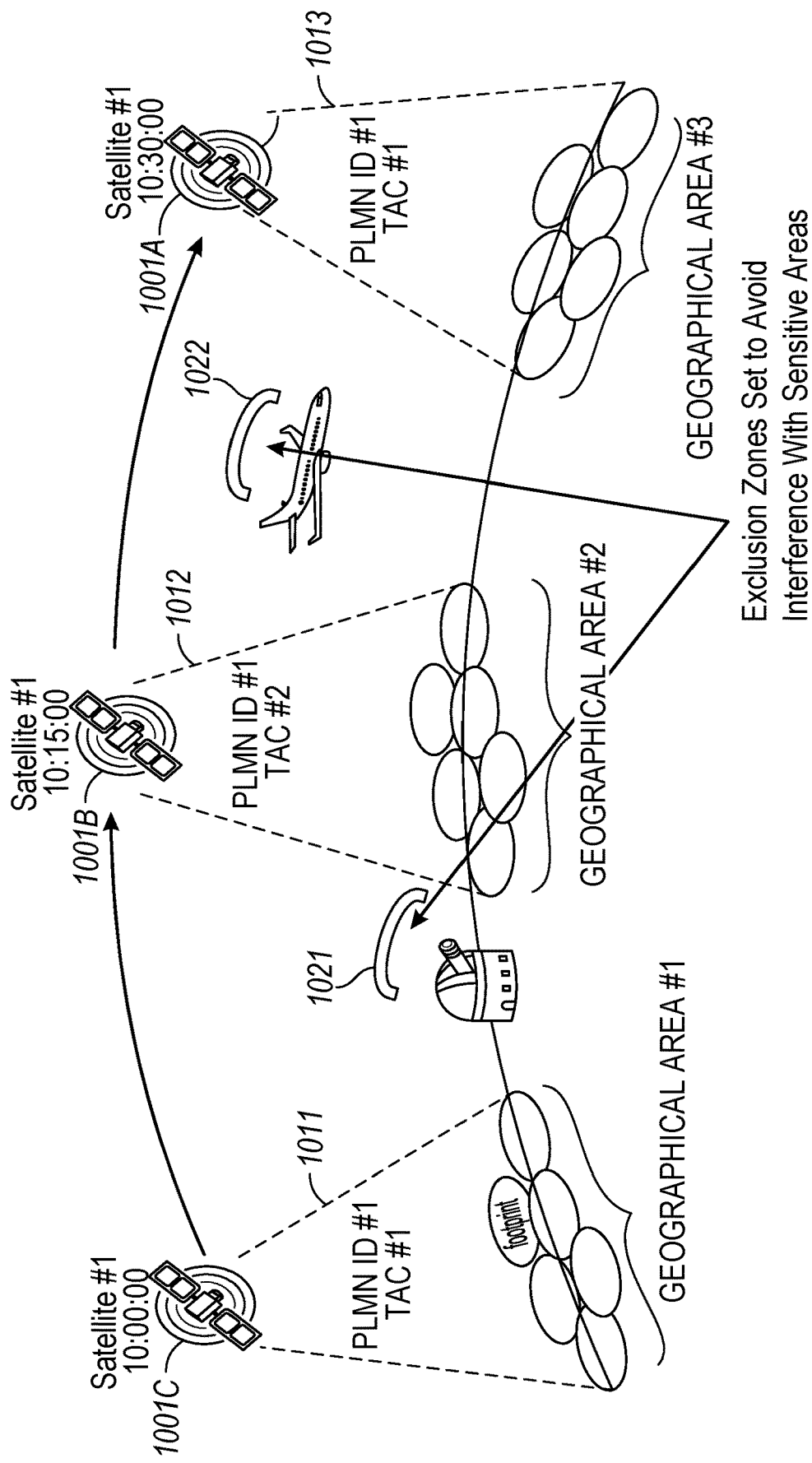
FIG. 10 illustrates an implementation of exclusion zones for a non-terrestrial communication network, according to an example.

FIG. 10 illustrates an implementation of SV-based exclusion zones for a non-terrestrial communication network, according to an example. This drawing provides additional detail on an example deployment of exclusion zones, over time, relative to a satellite 1001 at orbit positions 1001A, 1001B, 1001C. At position 1001A, the satellite 1001 provides coverage of its spot beam(s) in a first geographic area 1011; at position 1001B, the satellite 1001 provides coverage of its spot beam(s) in a second geographic area 1012; at position 1001C, the satellite 1001 provides coverage of its spot beam(s) in a third geographic area 1013.

FIG. 10 shows the implementation of a first exclusion zone 1021, which is a fixed geographic exclusion area. A fixed geographic exclusion area may be appropriate for preventing overlap with terrestrial networks which would conflict (e.g., cells established from a 4G/5G mobile network), or a fixed areas which is designated to instructed to be avoided (e.g., other countries, radio silence areas, sensitive monitoring equipment such as radio telescopes). FIG. 10 further shows the implementation of a second exclusion zone 1022, which is a mobile geographic exclusion area. A mobile geographic area may be appropriate for objects or areas which are in motion, moveable, or whose position is not necessarily fixed in a specific geographic area (e.g., airplanes, drones, other satellites), or for an area that has an irregular or changing shape. The implementation of either type of exclusion zone prevents the satellite from beaming on the area of conflict or restriction.

Figure 11:
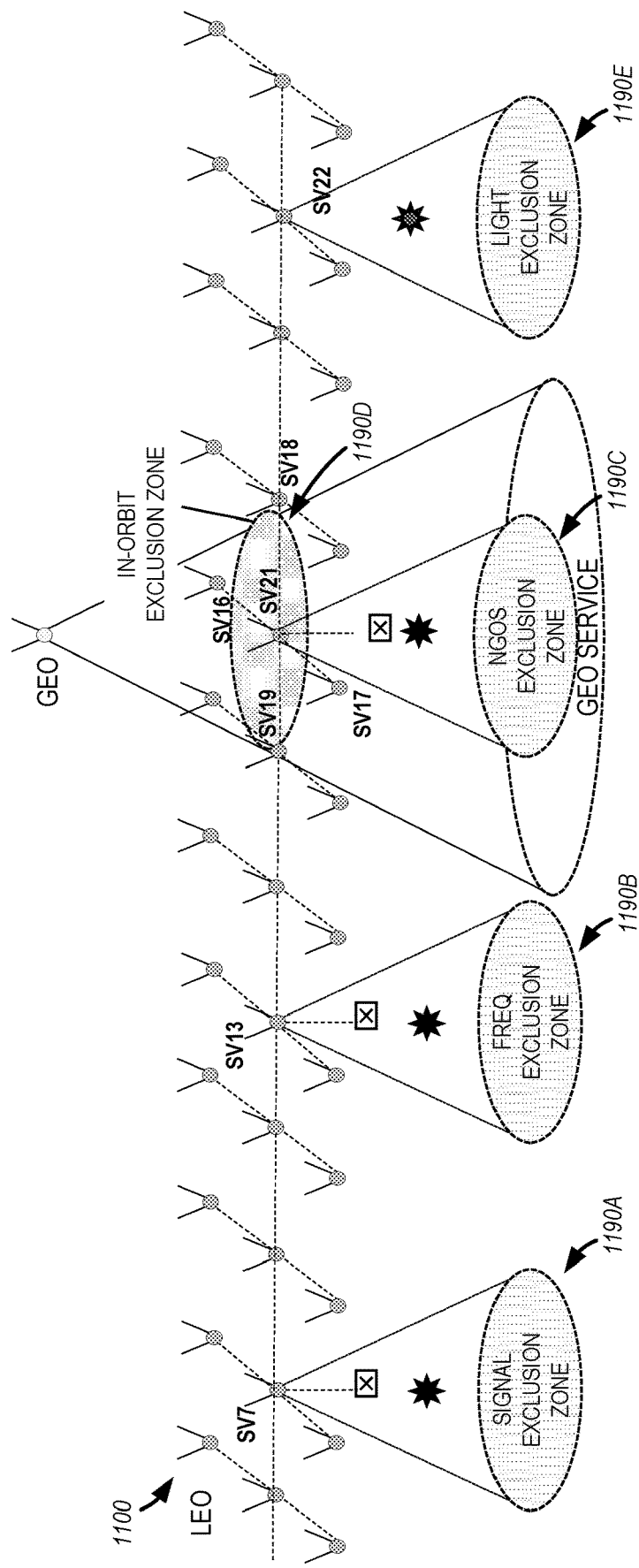
FIG. 11 illustrates various types of exclusion zones implemented for a non-terrestrial communication network, according to an example.

FIG. 11 illustrates further scenarios of network connectivity from an expanded view of a satellite constellation 1100, with the constellation comprising dozens of LEO satellites that provide connectivity to ground UEs (not shown). Within this scenario, a number of different exclusion zones are shown for deployment: a signal exclusion zone 1190A which blocks all signals from reaching a geographic area; a frequency exclusion zone 1190B which blocks certain frequency signals from reaching a geographic area; an non-geostationary orbit satellite (NGOS) exclusion zone 1190C which restricts signals from reaching a certain area which overlaps geostationary satellite service; an in-orbit exclusion zone 1190D which restricts inter-satellite communications which occur in an overlap of geostationary satellite service; and a light pollution exclusion zone 1190E which restricts reflection or causes some light reflection mitigation effect relative to an geographic area. Such exclusion zones 1190A-E may be separately or concurrently deployed with one another.

In the context of FIGS. 10 and 11, exclusion zones and associated fast path contact scheduling (discussed in more detail below) can apply to multiple constellations serviced by separate providers. For instance, different constellations may have separate GMSS identifiers (i.e., satellite equivalent of PLMN). Exclusion zones may intercept all applicable constellations, since EZs are typically "fixed" and are independent of the constellation ownership and/or providers.

Pre-determined LEO routing is used to maintain orbit and ISL connectivity alignment, and may be required to be communicated to the LEO vehicles on a frequent basis, such as each day. Exclusion zones among ISLs may be implemented to be coordinated with planned network routing calculations and communications that already occur among ground and space nodes of the LEO network. For instance, the regular communication of routing information that is provided to LEO vehicles may also be used to provide a specification of multiple EZs at the same time (including, exclusion zones defined between SV-to-SV (to enable or disable ISLs) or between SV-Earth (to enable or disable geographic coverage)). The definition of exclusion zones with routing information increases efficiency of constellation, especially for form-flying constellations (e.g., similar to Iridium, Starlink, and the like).

In an example, exclusion zones can be calculated and provided with orbit and ISL connectivity alignment information. Thus, LEO SVs can be instructed to implement exclusion zones, when receiving instructions to adjust orbital position. Such instructions may include turning various ISL connections on and off, adjusting right, left, fore and aft antennas (regardless or implementation type), if a scenario is projected where an ISL is interfering with a higher-orbit satellite communication (or vice versa). Other considerations established with these exclusion zones may include routing that considers ground and space nodes, including EZs implemented at the same time (whether SV-to-SV or SV-earth exclusion zones), while increasing the efficiency of a constellation. These EZs may also consider that form-flying ISLs antennas often require (1) beam steering, (2) high directivity, and (3) longer ranges and larger apertures than free flying swarm constellations.

Figure 12:
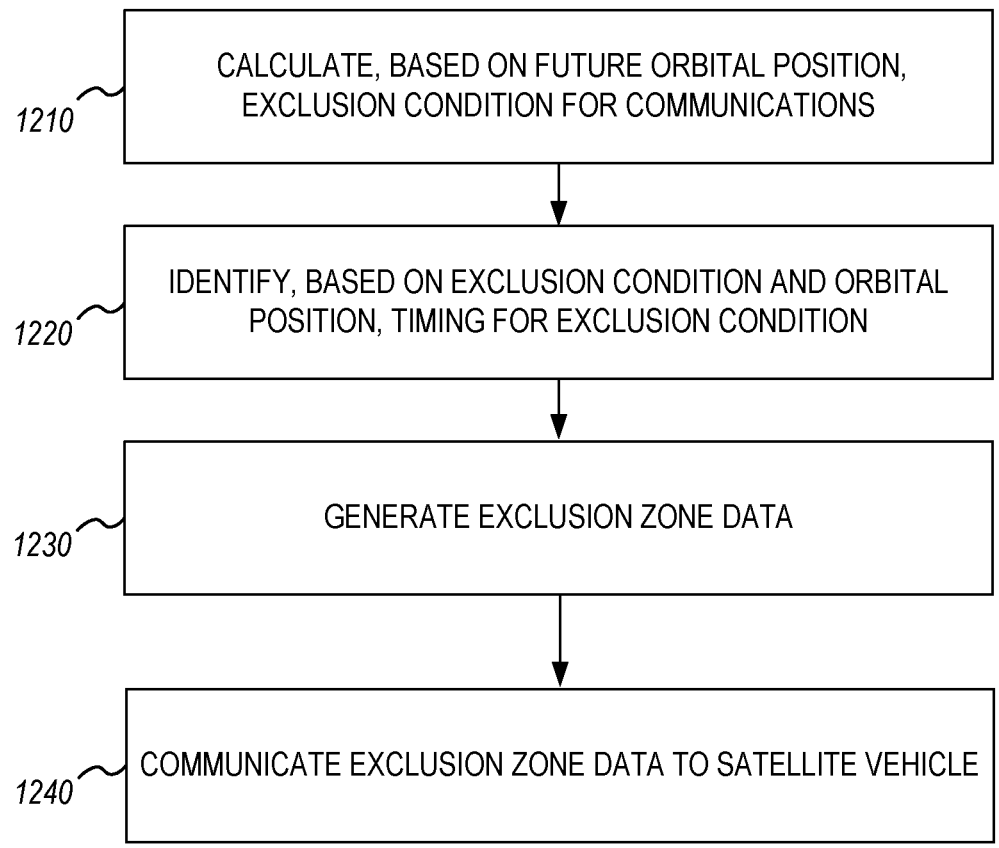
FIG. 12 illustrates a flowchart of an example method of implementing exclusion zones for inter-satellite communications in a non-terrestrial communication network, according to an example.

FIG. 12 illustrates a flowchart of an example method 1200 of defining and communicating exclusion zones.

The method begins, at operation 1210, to calculate, based on a future orbital position of a low-earth orbit satellite vehicle, an exclusion condition for communications from the satellite vehicle.

The method continues, at operation 1220, to identify, based on the exclusion condition and the future orbital position, a timing for implementing the exclusion condition for the communications from the satellite vehicle.

The method continues, at operation 1230, to generate exclusion zone data for use by the satellite vehicle. In an example, the exclusion zone data indicates the timing for implementing the exclusion condition for the communications from the satellite vehicle.

The method completes, at operation 1240, to cause communication of the exclusion zone data to the satellite vehicle. In an example, the operations of the method 1230 are performed by a ground-based data processing server at a regular interval, and this communication occurs from the ground-based data processing server to the satellite vehicle. In further examples, the operations of the method 1200 are performed at least in part using computing hardware of the satellite vehicle.

In an example, the exclusion condition of method 1200 is an exclusion of use of a communication frequency onto a terrestrial geographic area. For instance, the exclusion zone data may further identify the communication frequency, and implementation of the exclusion zone data at the satellite vehicle causes the satellite vehicle to discontinue use of the communication frequency while in communication range over the terrestrial geographic area.

In an example, the exclusion condition of method 1200 is an exclusion of use of a spot beam onto a terrestrial geographic area, and the exclusion zone data further identifies the spot beam of the satellite vehicle, as implementation of the exclusion zone data at the satellite vehicle causes the satellite vehicle to discontinue use of the spot beam while in communication range over the terrestrial geographic area.

In an example, the exclusion condition of method 1200 is an exclusion of use of an inter-satellite link from the satellite vehicle, and the exclusion condition is based on the future orbital position overlapping with communications from another satellite vehicle. For instance, the inter-satellite link may be defined based on a fore, aft, right, or left direction from the satellite vehicle.

In an example, the exclusion condition of method 1200 is an exclusion of use of a cellular network coverage at a geographic area, and implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In an example, the exclusion zone data of method 1200 is communicated to the satellite vehicle with a routing table, as the routing table operates to control the future orbital position of the satellite vehicle. In other examples, aspects of a routing protocol, routing protocol data, routing data, or configuration data (e.g., in a particular format) for routing and routing settings may be communicated. In a further example, the exclusion zone data includes attestation or authentication information for verification by the satellite vehicle. Additionally, in a further example, the exclusion zone data may be designated and used by a plurality of satellite vehicles in a constellation including the satellite vehicle.

Figure 13A:
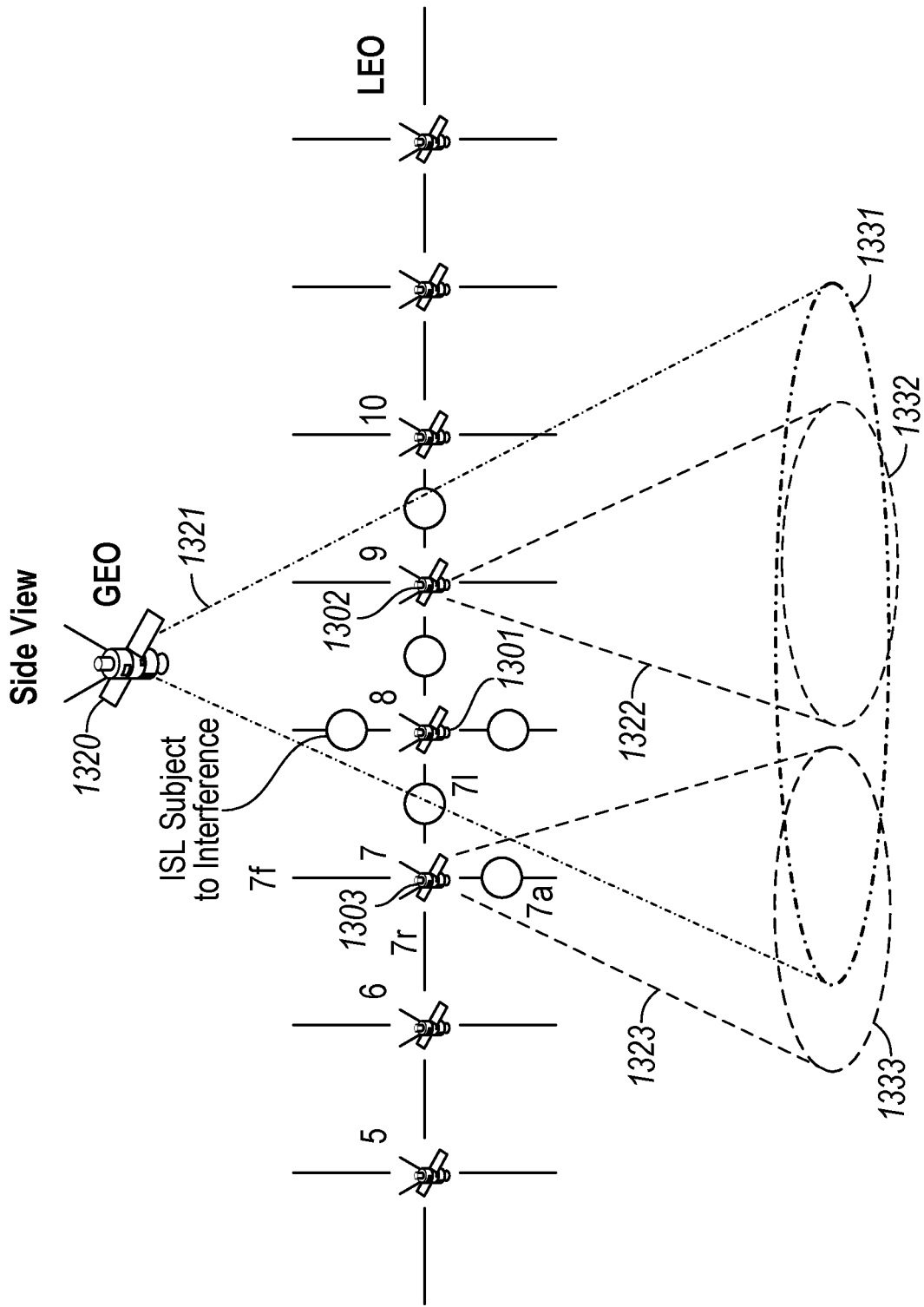
FIGS. 13A and 13B illustrate views of an example interference scenario in inter-satellite communications of a non-terrestrial communication network according to an example.
Figure 13B:
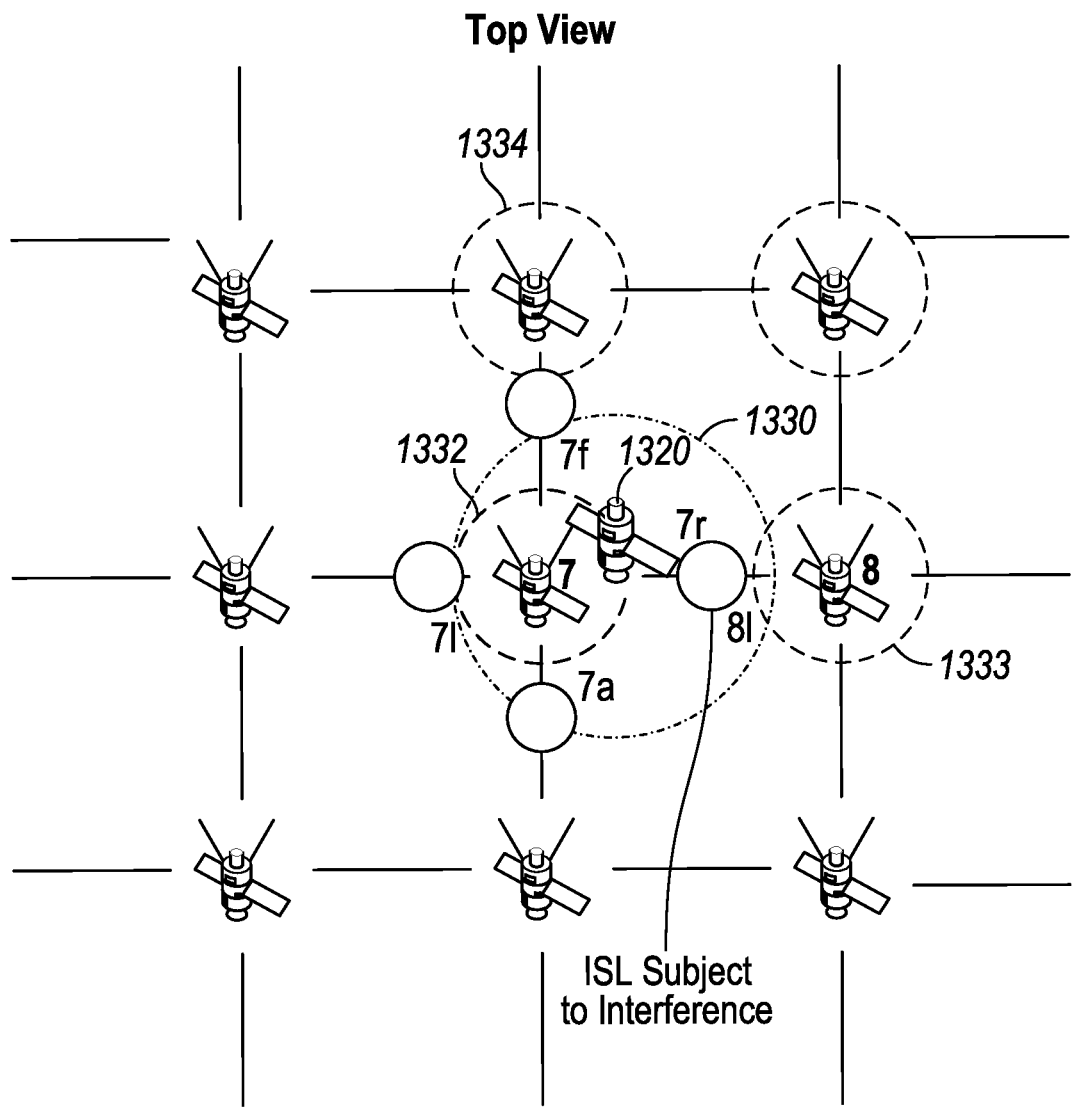

FIGS. 13A and 13B illustrate side and top views, respectively, of an example interference scenario in inter-satellite communications of a non-terrestrial communication network. As shown, a GEO satellite 1320 provides a beam coverage 1321 at a geographic area 1331. LEO satellites 7 (1303), 8 (1301), and 9 (1302) provide coverage that overlaps the geographic area at least in part, shown with LEO spot beam 1323 from satellite 7 1303, and LEO spot beam 1322 from satellite 9 1302.

Among LEO satellites 1301, 1302, 1303, a number of inter-satellite connections (ISLs) exist, in right, left, fore, aft directions. This is demonstrated from a top view in FIG. 13B, where satellite 7 1303 and satellite 8 1301 use ISLs to communicate with each other and a number of other satellites in the constellation. In response to determining that the GEO satellite 1320 will encounter interference with inter-satellite links within the coverage of its beam 1330 (at the LEO altitude), relevant ISLs which potentially interfere with the beam can be disabled.

A designation of beams, or specific frequency in links, to disable is shown in FIG. 13B, where all ISLs with satellite 7 1302 are turned off (due to satellite 7 1302 being located entirely within the coverage of area 1330), in the fore, aft, left, right locations; whereas only the left communication between satellite 7 1302 and satellite 8 1301 is disabled.

The use of exclusion zones can be implemented in simple or complex terms, including simple methods to turn the antennas (and communication paths) off to reduce interference. This provides a method of imposing organic exclusion zones for constellation routing, and reduces wear and tear on network and network processing.

In an example, a service provider can initiate an ISL interference mitigation exclusion zone, by communicating relevant parameters discussed in the examples below (e.g., EZ.id, EZ.name, EZ.ground, EZ.ground.radius, EZ.ground.lat, EZ.ground.long, EZ.ground.IP, EZ.ground.GPS, EZ.min.intensity). For example, such parameters may specify ID GEOsatelliten, and the characteristics of when an ISL exclusion zone should be in operation (e.g., when operating over a ground latitude and longitude at 111 degrees meridian west). A system implementing an ISV exclusion zone also may obtain future SV (fly-over) positions relative to a ground location. The response provided from a footprint command (e.g., Get SV Footprint, discussed below), may provide information to determine an expected response from fly-over telemetry (readily available via NORAD or from a constellation provider).

To prevent interference, a calculation of the exclusion zone may evaluate: (1) Does SV.n.fly-over overlap/intercept with EZ.n.area? (2) If there is overlap of the area, does SV.min intensity>EZ.min intensity? (3) If Yes, then prepare to turn-off (or, lower intensity in accordance with a service provider agreement) the SV beams, links, or specific frequencies within beams or links by using an appropriate command (e.g., Set SV EZ command).

In an example, a Set SV EZ command is defined to include the following parameters to control inter-satellite communication links:

TABLE 1

| Parameter | Type | Comments |
|---|---|---|
| SV.EZ.fore | Int | On/off based on interference |
| SV.EZ.aft | Int | On/off based on interference |
| SV.EZ.right | Int | On/off based on interference |
| SV.EZ.left | Int | On/off based on interference |

In an example, with no interference, SV.EZ.fore, SV.EZ.aft, SV.EZ.right, and SV.EZ.left, are set to "on". In an example, with calculated interference from other satellites, one or more of these values (e.g., SV.EZ.aft, SV.EZ.right, SV.EZ.left) are set to "off", while zero or more of the values (e.g., "SV.EZ.fore") are set to "on". Thus, in scenarios where GEO and LEO deployments are overlapping via the LEO ISLs, the capability of turning on and off a link in a particular direction may immediately remedy any possible interference.

ISL EZs can also be defined to address potential interference concerns related to potential competitive LEO constellations or even for the same constellation in the different orbital planes. Thus, an exclusion zone may be defined to apply to particular frequency bands, or whatever frequency (e.g., to disable all ISLs of LEOs that fly under the GEO, or that have a potential of disruption based on other GEO, MEO, or LEOs).

In further examples, the consideration of interference or possible disruption, and the use of ISL EZs, may be based on a service provider policy. For example, a LEO provider which operates a premium service using ISLs, may disable or adapt aspects of the ISLs based on any possibility of disruption or interference (e.g., relying on ISL routing through other paths).

Accordingly, any of the examples of ISL EZs may be implemented and determined based on inter-constellation interference or disruption (e.g., within the same constellation), from other satellites or constellations (e.g., within different satellite altitudes) in the same or different orbital plane, or for policy considerations (e.g., to guarantee premium routing services do not encounter disruption). Other variation for the control, definition, and use of exclusion zones (and controls of frequency bands or types of communications within an exclusion zone) may also be provided.

Comparison of Exclusion Zone Commands and Techniques

As will be understood, standard EZ Descriptions (and Language) can be shared across Terrestrial/Non-Terrestrial Service Providers for consistency and coordination among multiple-5G Terrestrial and geostationary/non-geostationary orbit (NGO) solutions. Implementations of EZs within separate Constellation Providers may vary but EZ Descriptions for ground-based keep-out areas may be sharable across Service Providers, including Cloud and Telecommunication Service Providers. In general, standard "fixed" EZs descriptions can be used to formulate and influence routing and switching payloads to help Service Providers coordinate as the number of NGO satellites and systems increase.

In an example, various commands for exclusion zones may include commands to: Define EZ (to define exclusion zones), Get SV (to obtain SV orbital fly-by information), and Set EZ (to implement an EZ within a constellation). Such commands may be extended for use with constellations, with the following definitions (with "EZn" referring to an identifier of an nth EZ):

Define EZ (Define Exclusion Zone):

TABLE 2

| Parameter | Type | Description |
|---|---|---|
| EZn.ID | INT | EZ Unique ID |
| EZn.NAME | STRING | EZ Name |
| EZn.RADIUS | FLOAT | EZ Radius for KEEP OUT AREA |
| EZn.LAT.PT | FLOAT | EZ Latitude Ground/Sky Center Point for KEEP OUT AREA |
| EZn.LONG.PT | FLOAT | EZ Longitude Ground/Sky Center Point for KEEP OUT AREA |
| EZn.IP.PT | FLOAT | EZ IP Address Ground/Sky Center Point for KEEP OUT AREA |
| EZn.GPS.PT | FLOAT | EZ GPS Ground/Sky Center Point for KEEP OUT AREA |
| EZn.MIN.INTENSITY.THRESHOLD | FLOAT | EZ Min Ground/Sky Center Point Spot Beam/Freq Intensity Threshold |
| EZn.MAX.INTENSITY.THRESHOLD | FLOAT | EZ Max Ground/Sky Center Point Spot Beam/Freq Intensity Threshold |
| EZn.ISL.TOGGLE | ON/OFF | EZ Intersatellite Link (ISL) ON or OFF |
| EZn.LRM.TOGGLE | ON/OFF | EZ Light Reflection Mitigation (LRM) ON or OFF |
| EZn.SPOT.TOGGLE | ON/OFF | EZ Spot Beam (SPOT) ON or OFF |

Get SV (Get SV Orbital "Fly-By" Information):

TABLE 3

| Parameter | Type | Description |
| --- | --- | --- |
| SVn.ID.International | STRING | International Designator |
| SVn.ID.NORAD | INT | NORAD Catalog Number |
| SVn.ID.NAME | STRING | SV Name |
| SVn.GND.lat | FLOAT | Ground location latitude for SV fly-over |
| SVn.GND.long | FLOAT | Ground location longitude for SV fly-over |
| SVn.GND.alt | FLOAT | Ground location altitude % for intensity threshold calculations |
| SVn.GND.time | INT | Amount of time to obtain SV flyover(s) |
| SVn.Period | Minutes | Location Minutes |
| SVn.Inclination | Degrees | Location Inclination |
| SVn.Apogee.Height | KM | Location Apogee |
| SVn.Perigee.Height | KM | Location Perigee |
| SVn.Eccentricity | FLOAT | Location Eccentricity |

Set EZ (Implement EZ within Constellation):

TABLE 4

| Parameter | Type | Description |
| --- | --- | --- |
| SVn.ID.International | STRING | International Designator |
| SVn.ID.NORAD | INT | NORAD Catalog Number |
| SVn.ID.NAME | STRING | SV Name |
| SVn.SPOTn.TOGGLE | ON/OFF | SV Spot Beam n Downlink UTC TIME START/STOP |
| SVn.SPOTn.FREQn.TOGGLE | ON/OFF | SV Spot Beam n Frequency n Downlink UTC TIME START/STOP |
| SVn.ISL.FORE.TOGGLE | ON/OFF | SV Intersatellite Link UTC TIME START/STOP |
| SVn.ISL.AFT.TOGGLE | ON/OFF | SV Intersatellite Link UTC TIME START/STOP |
| SVn.ISL.RIGHT.TOGGLE | ON/OFF | SV Intersatellite Link UTC TIME START/STOP |
| SVn.ISL.LEFT.TOGGLE | ON/OFF | SV Intersatellite Link UTC TIME START/STOP |
| SVn.SHADE.TOGGLE | ON/OFF | SV Reflection Shade UTC TIME START/STOP |
| SV.EZ.method | INT | ON/OFF or Intensity reduction (e.g., based on service provider SLA) |

Figure 14:
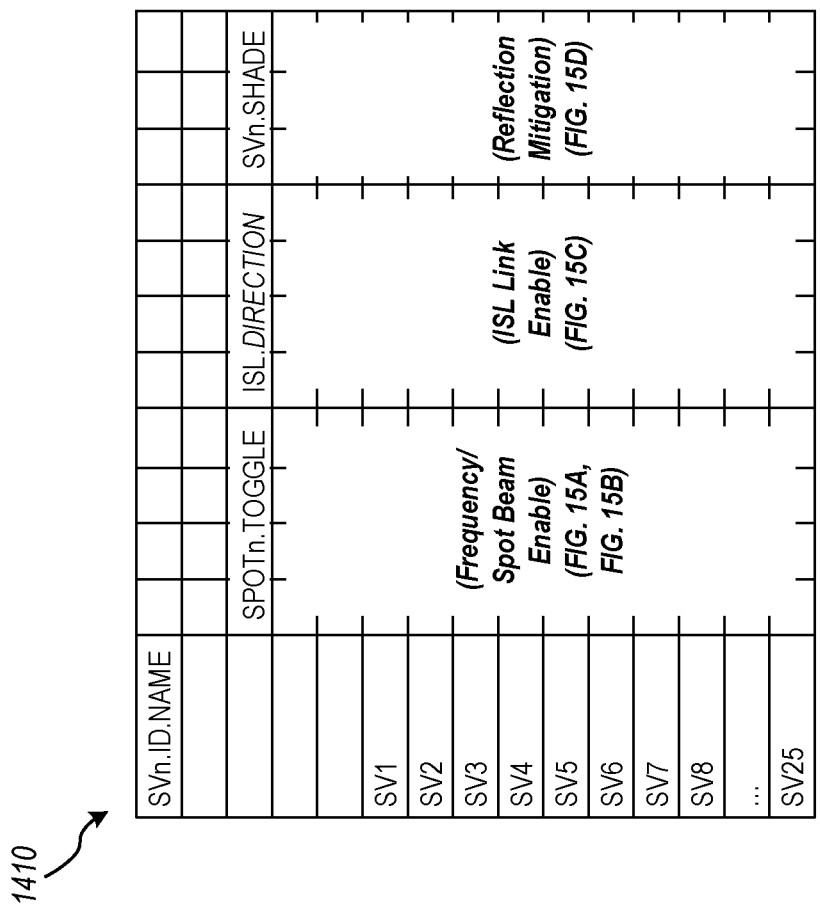

One configuration of an exclusion zone definition for multiple satellites of a constellation is depicted in a table 1410 of FIG. 14. Here, this drawing illustrates how different portions of a table or grid of data may allow definition of different values for different vehicles, on the basis of multiple exclusion zone types or characteristics. For example, a portion of this table 1410 may be used to define a toggle (disable/enable) value for a spot beam or a frequency within a spot beam, as described below with reference to FIGS. 16A and 16B and defined within the tables of FIGS. 15A and 15B. Another portion of this table 1410 may be used to define a toggle (disable/enable) value for inter-satellite links, including different communication directions for the links, as described below with reference to FIG. 16C and defined within the table of FIG. 15C. Finally, another portion of this table 1410 may be used to define a reflection mitigation control, as described below with reference to FIG. 16D and defined within the table of FIG. 15D. This data format and table format is provided only for purposes of illustration; many other data representations, definitions, and formats may be used to communicate or represent exclusion zone data.

Figure 16A:
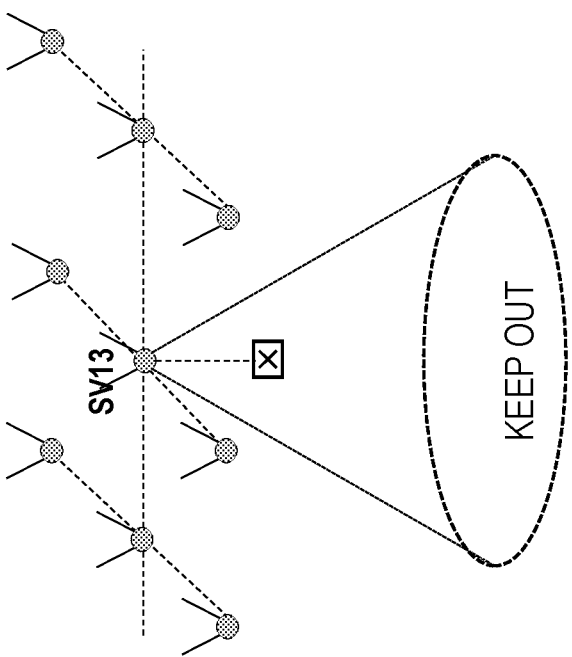
FIGS. 16A, 16B, 16C, and 16D illustrate further views of exclusion zones implemented by a non-terrestrial communication network, according to an example.

FIG. 16A illustrates further views of an example interference scenario 1610A over a geographic area, and the use of spot beam frequency exclusion zones to implement a keep-out area from SV7. Here, the intent of the EZ is to block specific signals from radiating on the ground, such as where different countries or geographical areas impose different intensity limits. For instance, to implement this exclusion zone based on frequency, values such as the following may be established via the following Define EZ (TABLE 5), Get SV (TABLE 6), and Set EZ (TABLE 7) commands

TABLE 5

| Define EZ (Input) | |
| --- | --- |
| Parameter | Value |
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 6

Get SV (input)

| Parameter | Value |
|---|---|
| SVn.ID.International | 2019-029BD |
| SVn.ID.NORAD | 44286 |
| SVn.ID.NAME | SV7 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 7

Set EZ (Output per SV)
(Disable different frequencies in respective spotbeams)

| Parameter | Value |
|---|---|
| SVn.ID.International | 2019-029BD |
| SVn.ID.NORAD | 44286 |
| SVn.ID.NAME | SV7 |
| SVn.SPOTn.TOGGLE | ON |
| SVn.SPOTn.FREQn.TOGGLE | SV7.SPOT1.FREQ2.DISABLE START 2021-03-03 21:43:56; STOP 2021-03-03 21:45:06; |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | ON >15% |

TABLE 9

Get SV (input)

| Parameter | Value |
|---|---|
| SVn.ID.International | 2019-029BD |
| SVn.ID.NORAD | 44286 |
| SVn.ID.NAME | SV13 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 10

Set EZ (Output per SV)
(Disable respective spotbeams)

| Parameter | Value |
|---|---|
| SVn.ID.International | 2019-029BD |
| SVn.ID.NORAD | 44286 |
| SVn.ID.NAME | SV13 |
| SVn.SPOTn.TOGGLE | SV13.SPOT2.DISABLE START 2021-05-04 22:43:56; STOP 2021-05-04 22:46:06; |
| SVn.SPOTn.FREQn.TOGGLE | OFF |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | OFF |

A detailed charting of a subset of SET EZ values to disable a particular spot beam frequency is shown in table 1510A of FIG. 15A, where a value 1520A to disable a particular spot beam of a particular satellite vehicle at a particular time (and for a particular duration) is communicated.

Figure 16B:
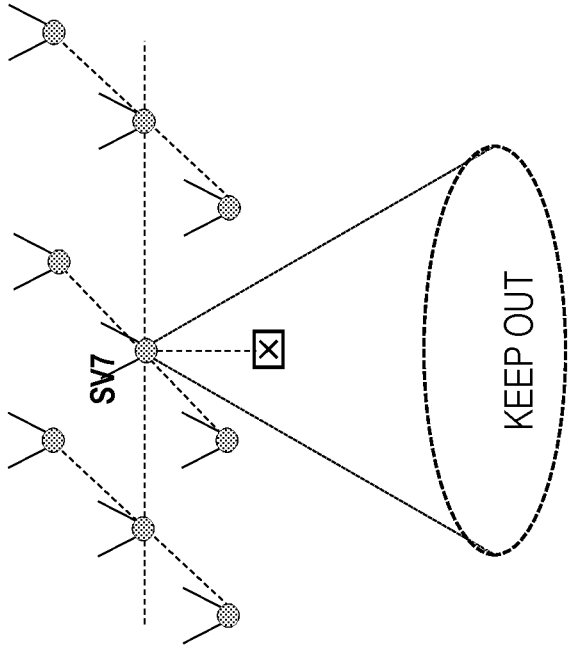

FIG. 16B illustrates further views of an example interference scenario 1610B over a geographic area, and the use of combined spot beam frequency exclusion zones to implement a keep-out area of all frequencies from a spot beam of SV13. For instance, to implement this exclusion zone for an entire spot beam, values such as the following may be established via the following Define EZ (TABLE 8), Get SV (TABLE 9), and Set EZ (TABLE 10) commands

TABLE 8

Define EZ (Input)

| Parameter | Value |
|---|---|
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

A detailed charting of a subset of SET EZ values to disable an entire spot beam is shown in table 1510B of FIG. 15B, where a value 1520B to disable a particular spot beam of a particular satellite vehicle at a particular time (and for a particular duration) is communicated.

It will be understood that other variations to the approaches of FIGS. 16A and 16B may be implemented with EZs to block transmissions onto defined areas. For instance, such exclusion zones may provide permutations of a spot beam block, a frequency block within a beam, or an "ignore" setting when the intensity of the spot beam is below the intensity of allowance in the keep out zone.

Figure 16D:
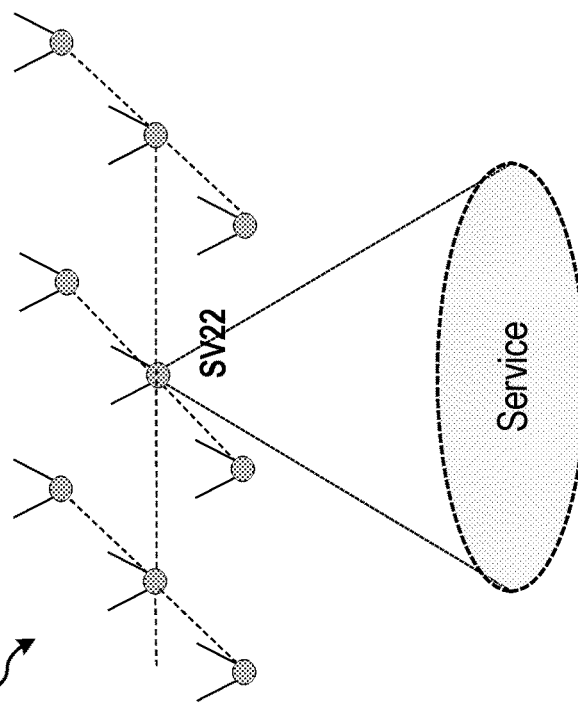
Figure 16C:
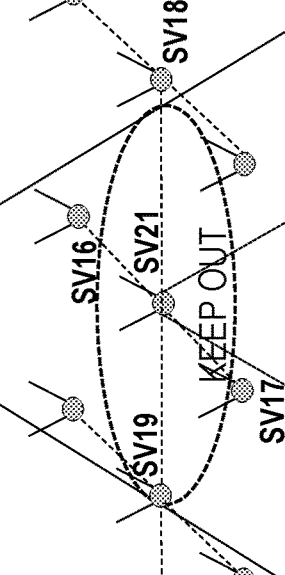

FIG. 16C illustrates further views of an example interference scenario 1610C in inter-satellite communications of a non-terrestrial communication network. Depending on orbit positions, altitude, type of interference, and other characteristics, it is possible that some directions of communications (e.g., between satellite SV21 and SV19) will be determined to interfere or experience interference, whereas communications in a different direction (e.g., between satellite SV19 and other satellites) will not interfere or experience interference with higher-altitude satellite communications.

To implement an exclusion zone for control of inter-satellite links, values such as the following may be established for an exclusion zone involving SV21 of FIG. 16C via the following Define EZ (TABLE 11), Get SV (TABLE 12), and Set EZ (TABLE 13) commands:

TABLE 11

| Define EZ (Input) | |
| --- | --- |
| Parameter | Value |
| EZn.ID | EZ22.12345 |
| EZn.NAME | EZ22.AZ_GEO_KO |
| EZn.RADIUS | 2000 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 12

| Get SV (input) | |
| --- | --- |
| Parameter | Value |
| SVn.ID.International | 2019-029BD |
| SVn.ID.NORAD | 44286 |
| SVn.ID.NAME | SV21 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 13

| Set EZ (Output per SV) (Disable impacted ISLs) | |
| --- | --- |
| Parameter | Value |
| SVn.ID.International | 2019-029BD |
| SVn.ID.NORAD | 44286 |
| SVn.ID.NAME | SV21 |
| SVn.SPOTn.TOGGLE | |
| SVn.SPOTn.FREQn.TOGGLE | |
| SVn.ISL.FORE.TOGGLE | ON |
| | SV21.ISL.FORE.DISABLE START 2021-05-04 22:43:56; STOP 2021-05-04 22:46:06; |
| SVn.ISL.AFT.TOGGLE | SV21.ISL.AFT.DISABLE START 2021-05-04 22:43:56; STOP 2021-05-04 22:46:06; |
| SVn.ISL.RIGHT.TOGGLE | SV21.ISL.RIGHT.DISABLE START 2021-05-04 22:43:56; STOP 2021-05-04 22:46:06; |

TABLE 13-continued

| Set EZ (Output per SV) (Disable impacted ISLs) | |
| --- | --- |
| Parameter | Value |
| SVn.ISL.LEFT.TOGGLE | SV21.ISL.LEFT.DISABLE START 2021-05-04 22:43:56; STOP 2021-05-04 22:46:06; |
| SVn.SHADE.TOGGLE | ON |
| SV.EZ.method | OFF |

As shown in FIG. 16C, the EZ for ISLs is defined relative to the GEO coverage area. A detailed charting of SET EZ values to disable ISLs is shown in FIG. 15C, such as value 1520D for SV21 to indicate a time and direction to disable ISLs of SV21 from FIG. 16C. To implement an exclusion zone for control of inter-satellite links for SV20, SV18, SV17, SV16, to meet the scenario shown in FIG. 16C, the Get SV (TABLE 18) SVn.ID.NAME and Set EZ (TABLE 19) SVn.ID.NAME values would substitute "SV21" with the respective "SV20", "SV18", "SV17", "SV16" values, and the Set EZ (TABLE 19) SV.ISL.FORE, .AFT, .LEFT, .. RIGHT toggle values would substitute with values relevant to the respective SVs (values 1520C, 1520E, 1520F, 1520G, 1520H in FIG. 15C).

FIG. 16D illustrates further views of an example light pollution scenario 1610D based on reflections from individual SVs of a non-terrestrial communication network. To implement an exclusion zone for control of SV mechanisms to mitigate light reflections, values such as the following may be established for an exclusion zone involving SV22 of FIG. 16D via the following Define EZ (TABLE 14), Get SV (TABLE 15), and Set EZ (TABLE 16) commands

TABLE 14

| Define EZ (Input) | |
| --- | --- |
| Parameter | Value |
| EZn.ID | EZ22.12345 |
| EZn.NAME | EZ22.AZ_ASTRO |
| EZn.RADIUS | 50 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 15

| Get SV (input) | |
| --- | --- |
| Parameter | Value |
| SVn.ID.International | 2019-029BD |
| SVn.ID.NORAD | 44333 |
| SVn.ID.NAME | SV22 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 16

Set EZ (Output per SV)
(Shade SV)

| Parameter | Value |
| --- | --- |
| SVn.ID.International | 2019-029BD |
| SVn.ID.NORAD | 44333 |
| SVn.ID.NAME | SV22 |
| SVn.SPOTn.TOGGLE | |
| SVn.SPOTn.FREQn.TOGGLE | ON |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | SV22.SHADE ENABLED START 2021-05-04 22:43:56; STOP 2021-05-04 22:46:06; |
| SV.EZ.method | OFF |

A detailed charting of a subset of SET EZ values to enable (toggle) a shade or light reflection feature is shown in table 1510D of FIG. 15D, where a value 1520J to enable a sunshade of a particular satellite vehicle at a particular time (and for a particular duration) is communicated.

Other permutations of the previously described EZs may include establishing borders or zones between different LEO constellations, such as to prevent LEO constellations from different service provides from talking with one another. Likewise, other permutations may involve cooperation between constellations to enable or restrict aspects of "roaming" or accessing services offered from other service providers, network companies, or countries.

Implementation of Inclusion Zone

In an example, an exclusion zone may be overridden for emergency or broadcast purposes. This may be accomplished through an "inclusion zone" used for purposes such as an "amber" alert, in a manner that is an exact opposite of exclusion zone. Such an inclusion zone may provide data communications to an areas, overriding defined types of communication exclusion zones (including geographic signal exclusion zones, frequency exclusion zones, inter-satellite link/in-orbit exclusion zones, NGO exclusion zone, etc.)

In an example, an inclusion zone may be defined in a similar manner as an exclusion zone as discussed above, for a limited area or a limited time, or limited to a particular satellite, constellation, set of frequencies, geographic area, etc. For instance, an inclusion zone may be used to communicate safety messages to geographic jurisdictions that would otherwise be excluded from communications, such as a safety message relating to a tsunami or other multi-jurisdiction event. Use of an inclusion zone may enable a UE to connect with a line-of-sight SV cluster (and back down again to a data center ground station) even though the UE would have otherwise been prohibited from communication.

Implementation of Ultra-Low Latency Pathway

In an example, the techniques discussed above for generating, defining, and communicating an exclusion zone may also be applicable for defining a "fast path" for ultra-low-latency communications over long geographic distances. Such a fast path may provide faster communications than a fiber optic link, due to the increased transmission speeds of light that occur in space. In some settings, the speed of light signals in fiber on ground is about 30% slower than in space. Thus, the additional latency of signal transmitted via fiber over a long cross-country or inter-continent cable run may be mitigated by a fast path established with satellite ISLs.

The use of a fast path is described in the examples below as occurring in a resource reservation setting, such as where a customer pays a premium price for scheduled, guaranteed bandwidth and latency via the fast path. However, variations to a fast path may involve the use of multiple paths, multiple orbital planes, multi-casting, and multiple paths with different routes. Likewise, dynamic use and implementation of a fast path may also be possible. Such a fast path may even be available for constellation providers that share resources, including terrestrial network/non-terrestrial network resources that are typically shared or managed by way of a "roaming" agreement.

Figure 17A:
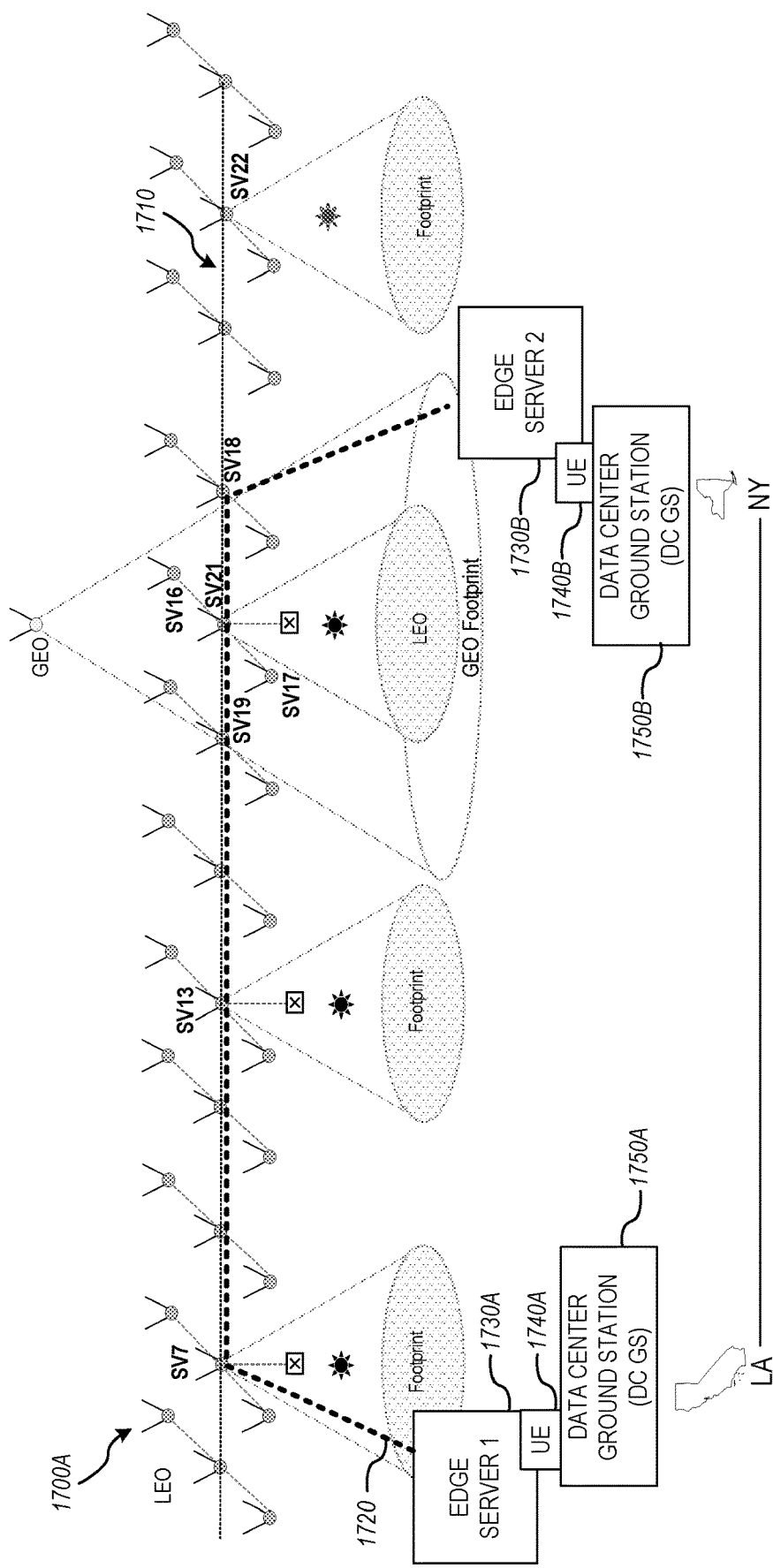
FIGS. 17A, 17B, 17C, 17D, and 17E illustrate views of pathways among inter-satellite links for ultra-low latency communications, according to an example.

For example, consider the scenario depicted in FIG. 17A, involving an Edge server 1 1730A located in Los Angeles using a satellite communication network to communicate with an Edge server 2 1730B located in New York, between the hours of 9:30 AM Eastern time and 4:00 PM Eastern time (e.g., to coincide with financial exchange trading hours). The particular START/END (e.g., between Los Angeles and New York) may involve paths between different types of cloud, ground stations, data centers (e.g., data centers 1750A, 1750B), or user devices (e.g., UEs 1740A, 1740B), and is not limited to an edge server.

Here, the fast path may involve planning communication pathways within a satellite constellation 1700A that is orbiting across North America at the same time. Because the entire constellation is in orbit, the starting point, ending point, and points in-between will change over time. Thus, a path 1720 is defined to identify which satellites are available at which times, and which ISLs (e.g., among ISLs 1710) to use and reserve communication bandwidth, to achieve a desired low-latency connection. Even in this setting, the fast path itself may be considered as "static" and always available even though the constellation is dynamic and is in motion.

Figure 17B:
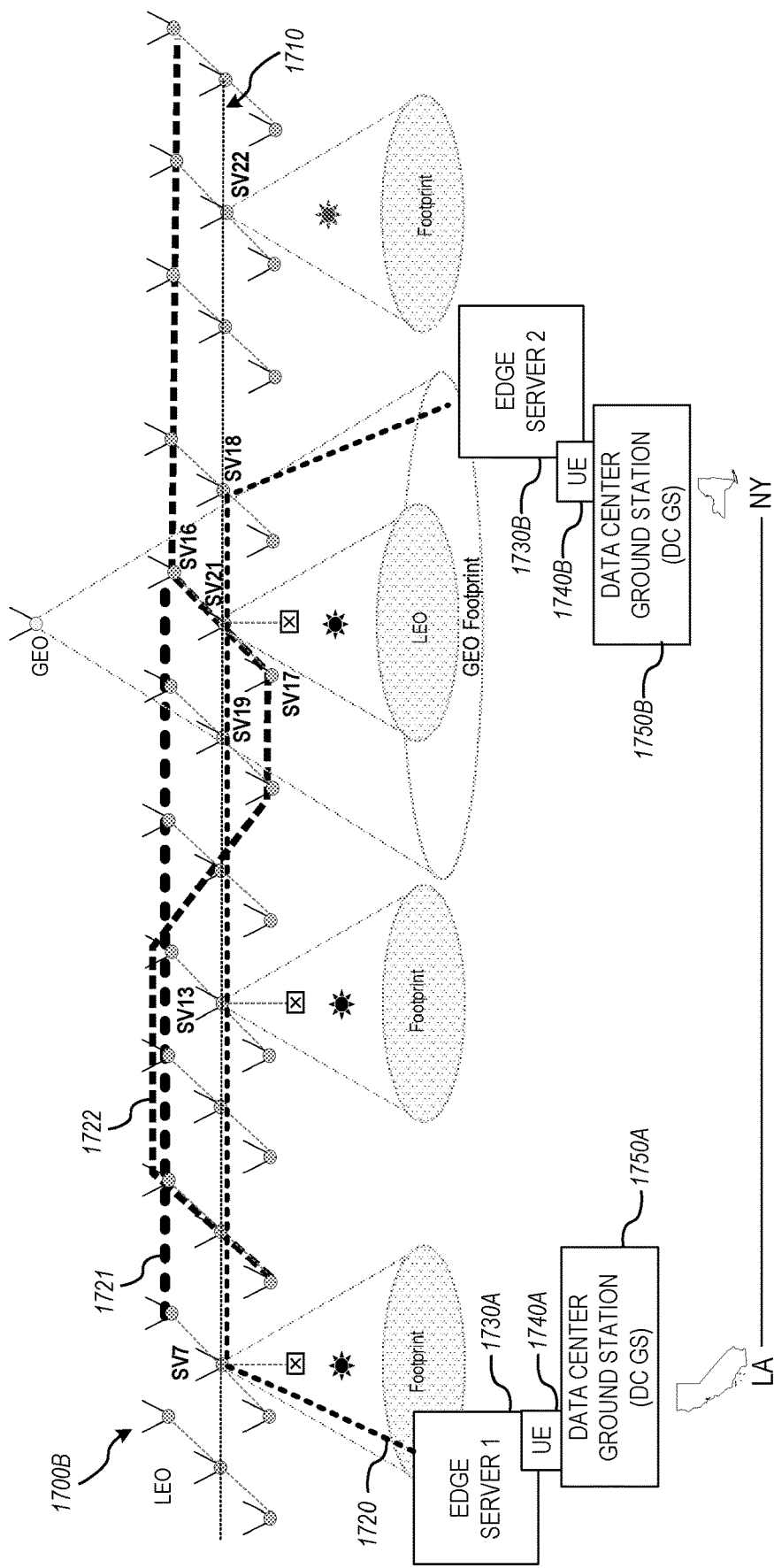

FIG. 17B provides a further illustration of how different paths (e.g., paths 1720, 1721, 1722) may be reserved and allocated, even as the constellation 1700B is in use by other users who do not utilize the fast path. The different paths that are mapped out within the constellation may provide backup, alternate, redundant, or future paths, which is relevant as communication conditions change and as the constellation continues on its orbit and continually changes its footprint. Such paths may even be coordinated with GEO footprints and coverage, which do not have a changing footprint. Thus, even as constellation capabilities change or are adapted, the fast path scheduling ensures that pathways for ultra-low-latency communications remain available during the scheduled time. In such examples, the fast path consumer "owns" the start and start time and is ensured a resource reservation among the satellite constellation.

Figure 17C:
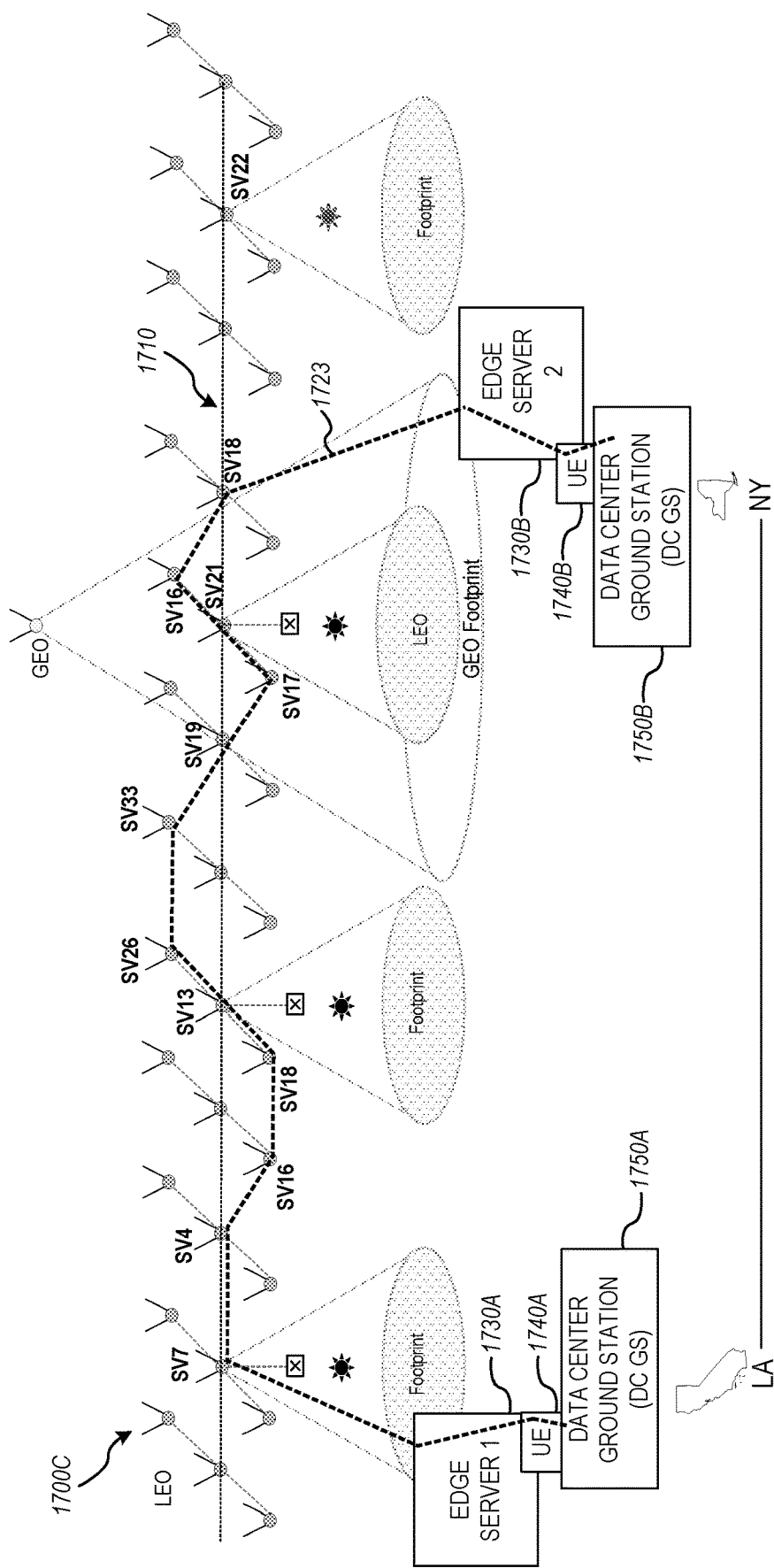

FIG. 17C continues on to illustrate how fast path connections between UEs (e.g., fast path 1723) may be reserved and need not continue in a straight path within a constellation 1700C. Rather, different directions of the satellite ISL links (fore, left, right, aft) may be used to establish a varied pathway within the constellation. In an example, the constellation orbital data is used to accommodate fast path requests, and the originating fast path start time will determine which SV will be used to initiate the connection and which other SVs are used for hand-off until the fast path stop time.

Figure 17D:
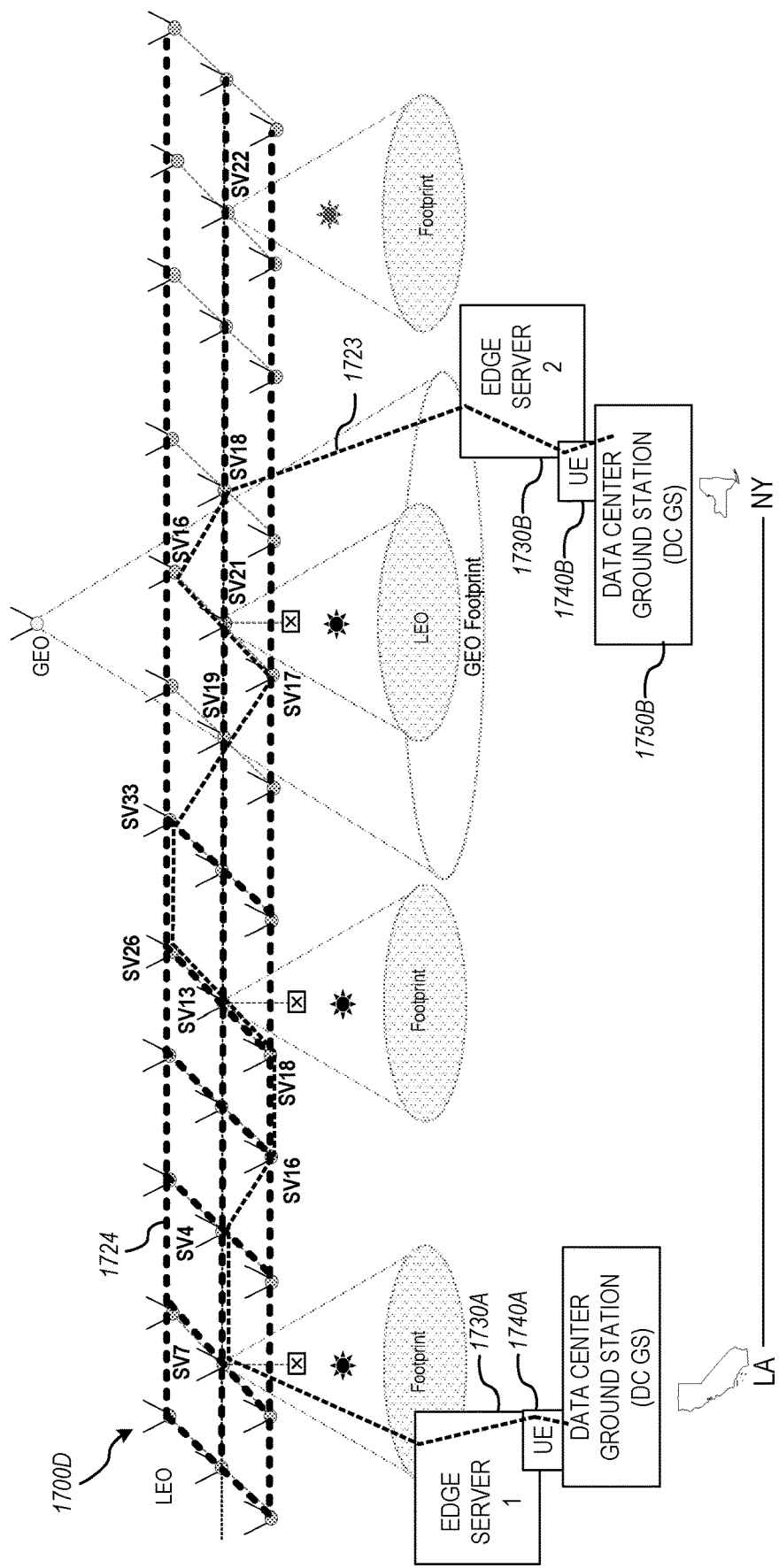

FIG. 17D continues to show how dedicated paths and ISL links (e.g., paths established among links 1724) may be dedicated among certain SVs in a constellation 1700D, although multiple different paths to such SVs may be present. Thus, fast path techniques may be used to reserve ISL resources at least at certain vehicles within the constellation, although the precise pathway for reaching such vehicles may change or be dynamic. Constellation telemetry may also be used for such purposes to support the fast path.

Figure 17E:
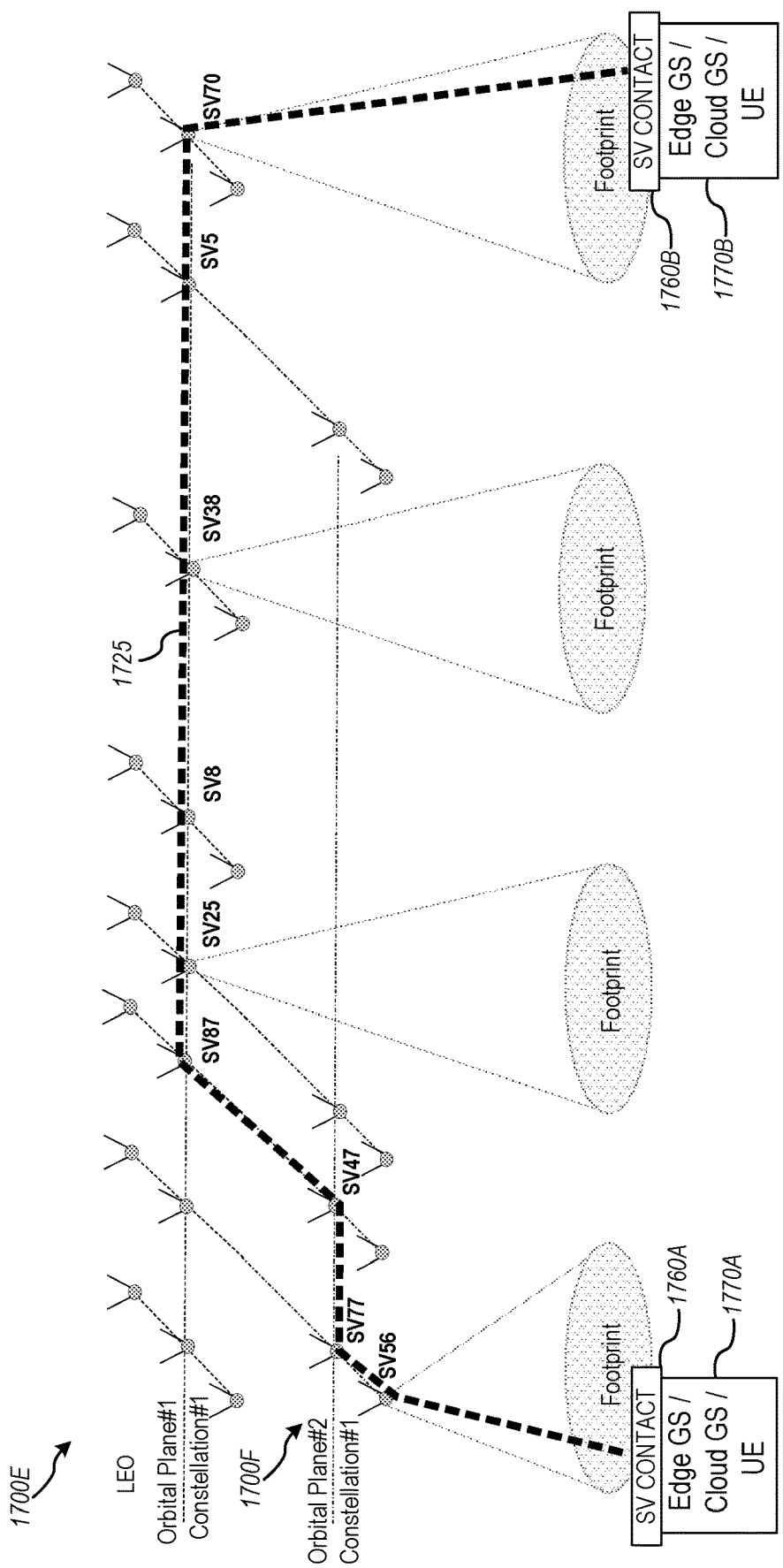

Finally, FIG. 17E illustrates multi-orbital plane fast path routes among constellation 1700E, 1700F (e.g., established with fast path 1726), and the use of START/END contacts 1760A, 1760B to each cloud/edge data center 1770A, 1770B. Specifically, in the depicted scenario, each fast path can include a mix of both lower and upper SVs in the same constellation interconnected via ISLs to form and reserve fast path(s). Each starting or ending contact can start with any SV orbital plane, as typically the lower plane can offer lowest latency and if so can pass to other SVs in the same lower plane or if needed bump up to higher plane if that is the optimum fast path.

It will be understood that the FP can use any mix of lower and higher orbital plane SVs to meet the definition parameters. Additionally, in the present examples, the FP can include specification of the SV spot beam or frequency within a particular SV spot beam at the start and stop time, which may provide uplink and downlink reservations at a start and stop time. The FP definition therefore is not limited to the ISL links that will be used and the "path" within the constellation.

Although the preceding examples describe forms of an overall fast communication "path" or "pathway", it will be understood that more dynamic methods of reservation and operation may also apply to a FP. For instance, as calculations for the FP are performed, various dynamic parameters may be used to determine whether the FP must reserve all or a portion of the fast path (or individual resources). The reservation of resources in the FP and among ISLs may be subscription-based (e.g., tied to some time-based subscription parameter or requirement, including full dedicated resources), SLA- or performance-based considerations (e.g., tied to the current network conditions, including partially dedicated or guaranteed resources), or associated with some other prioritized condition. Thus, it will be understood that a FP and which path that the FP takes in the constellation may be coordinated or implemented based on a variety of real-time conditions, subscriptions, SLAs, monetary arrangements, etc. Finally, it will be understood that a FP itself may not be needed or deployed if adequate bandwidth and latency exists within the network (and the FP will not offer better performance); however, the FP can be dynamically deployed if bandwidth or latency constraints offer an advantage.

As will be understood, the aspects of an exclusion zone discussed herein applies to all of the fast path capabilities. In any of the preceding examples, a fast path routing may be established for connections such as: edge server (terrestrial) to edge server (terrestrial); UE (terrestrial to non-terrestrial) to edge server; in-orbit edge-server to terrestrial edge server or UE; UEs to UEs; and other combinations or permutations. Thus, a fast path may be reserved and accessed directly by a UE or by a ground station which has a connected UE or edge-server.

In an example, a detailed evaluation is performed prior to use of the fast path, to calculate a proper path and to reserve such resources. The fast path information may be calculated at the same time that an exclusion zone is calculated. The evaluation for a particular fast path route may consider aspects such as: SV contact timing; SV health in terms of hours in use and battery capacity; orbital plane—whether to use a lower or higher plane; amount of data; priority; SLA (best/least effort); AI Engine or Accelerator availability (in the satellite or at the ground); Buildings and Environment; TTAC-Ka/L-B and conditions; Real-time telemetry; and aspects of terrestrial and Pay-per-use SLAs.

Use cases may include VIP (e.g., pay-per-minute high speed data links), and time-sensitive transactions such as financial trading. Likewise, cloud gaming involves latency sensitive communications, and may be improved by moving some data to the edge including frequently accessed data and relying on high-speed links via satellite for participants located on different continents. Other aspects of coordinating fast path use cases may involve transferring data globally to edge ground stations, so that data can be uploaded and exchanged on the satellite connection to enable improved, as fast as possible links.

As suggested above, variations in constellation pathways may be provided to the fast path scenarios discussed above. Specifically each fast path can include a mix of both lower and upper SVs in the same constellation interconnected via ISLs to form and reserve fast path(s). Each starting or ending contact can start with any SV orbital plane, as typically the lower plane can offer lowest latency. Contacts can pass to other SVs in the same lower plane or, if needed, bump up to a higher plane if needed for an optimum fast path. Thus, in some scenarios, the fast path can use any mix of lower and higher orbital plane SVs to meet the definition parameters.

In an example, the commands discussed above for use with exclusion zone are extended or adapted for use with fast paths, such as follows:

GS to GS Fast Path (FP) Setup

TABLE 17

| (INPUT) | Parameter | Type | Description |
| --- | --- | --- | --- |
| | FP.START.TIME | | Originating GS or UE to SV contact start time (point to point) |
| | FP.STOP.TIME | | Originating GS or UE to SV FP connection contact stop time (point to point) |
| | FP.STOP.TIME.LIMIT | | Maximum GS or UE to SV contact start time to acquire initial SV contact |
| | EDGE.GSn | INT | GS Name1 |
| | EDGE.GSn | STRING | GS Name2 |
| | FP.MIN.Latency | FLOAT | FP MIN Latency |
| | FP.PRE.PING | ON/OFF | FP PRE PING to ensure FP before sending |
| | FP.MAX HOP | INT | Indicates Maximum number of LEO SVs to consumer |

TABLE 17-continued

| (INPUT) | Parameter | Type | Description |
|---|---|---|---|
| | FP.DATA TYPE | | SMS, 2D Real-Time Video, CDN, Video Conference, Audio, 3D Video |
| | FP.DURATION | FLOAT | Amount of Time to reserve for FP |
| | FP.ALT DUPLICATE PATH | BINARY | Alternative FP Necessary |
| | FP.Monitor Network Telemetry | | |
| | FP.Billing.Tier | | Does subscriber have top tier plan (e.g., $150/min) |
| | FP.Security | | |
| | FP.GOV OVERRIDE | | Government Intercept |
| | FP.Lawful override | | Country specific |
| | FP.self heal capable | | Reroute, redundant |
| | FP.exclusive | | Exclusive route for specific subscriber |

Get SV (Get SV Orbital "Fly-By" Information)

TABLE 18

| (INPUT) | Parameter | Type | Description |
|---|---|---|---|
| | SVn.ID.International | STRING | International Designator |
| | SVn.ID.NORAD | INT | NORAD Catalog Number |
| | SVn.ID.NAME | STRING | SV Name |
| | SVn.ISL.STATUS.LEFT | BINARY | Status--UP/DOWN |
| | SVn.ISL.STATUS.RIGHT | BINARY | Status--UP/DOWN |
| | SVn.ISL.STATUS.FORE | BINARY | Status--UP/DOWN |
| | SVn.ISL.STATUS.AFT | BINARY | Status--UP/DOWN |
| | SVn.GND.lat | FLOAT | Ground location latitude for SV fly-over |
| | SVn.GND.long | FLOAT | Ground location longitude for SV fly-over |
| | SVn.GND.alt | FLOAT | Ground location altitude % for intensity threshold calculations |
| | SVn.GND.time | INT | Amount of time to obtain SV flyover(s) |
| | SVn.Period | Minutes | Location Minutes |
| | SVn.Inclination | Degrees | Location Inclination |
| | SVn.Apogee.Height | KM | Location Apogee |
| | SVn.Perigee.Height | KM | Location Perigee |
| | SVn.Eccentricity | FLOAT | Location Eccentricity |

Set FP (Implement FP within Constellation)—CONTACT Scheduling for UE and GS

TABLE 19

| (OUTPUT) | Parameter | Type | Description |
|---|---|---|---|
| | SVn.ID.International | STRING | International Designator |
| | SVn.ID.NORAD | INT | NORAD Catalog Number |
| | SVn.ID.NAME | STRING | SV Name |
| | SVn.SPOTn.TOGGLE | ON/OFF | SV Spot Beam n Downlink UTC TIME START/STOP |
| | SVn.SPOTn.FREQn.TOGGLE | ON/OFF | SV Spot Beam n Frequency n Downlink UTC TIME START/STOP |
| | SVn.ISL.FORE.TOGGLE | ON/OFF | SV Intersatellite Link UTC TIME START/STOP |
| | SVn.ISL.AFT.TOGGLE | ON/OFF | SV Intersatellite Link UTC TIME START/STOP |
| | SVn.ISL.RIGHT.TOGGLE | ON/OFF | SV Intersatellite Link UTC TIME START/STOP |
| | SVn.ISL.LEFT.TOGGLE | ON/OFF | SV Intersatellite Link UTC TIME START/STOP |
| | SVn.SHADE.TOGGLE | ON/OFF | SV Reflection Shade UTC TIME START/STOP |

TABLE 19-continued

| (OUTPUT) | Parameter | Type | Description |
|---|---|---|---|
| | SV.EZ.method | INT | ON/OFF or Intensity reduction (e.g., based on service provider SLA) |

FIGS. 18, 19A, 19B, 19C, and 19D illustrates tables of settings (e.g., within table 1810) for establishing ultra-low latency fast path connections within inter-satellite links. Here, FIG. 19A depicts a table 1910A of how a particular frequency spot beam, used for an exclusion zone enable or disable, may also provide fast path properties for routing within a constellation, including to define the initial SV that intercepts or terminates the fast path. Further, FIG. 19B depicts a table 1910B of how ISL links in different directions (fore, aft, right, left) used for an exclusion zone enable or disable, may be reserved for use with the fast path. In this table 1910B, different paths are specified between SV7, SV3, SV16, and SV18. In a similar manner, FIGS. 19C and 19D depict tables 1910C, 1910D of how ISL links may be established using multiple orbital planes, as a fast path traverses among High orbital plane #1 and Low orbital plane #2.

Figure 20:
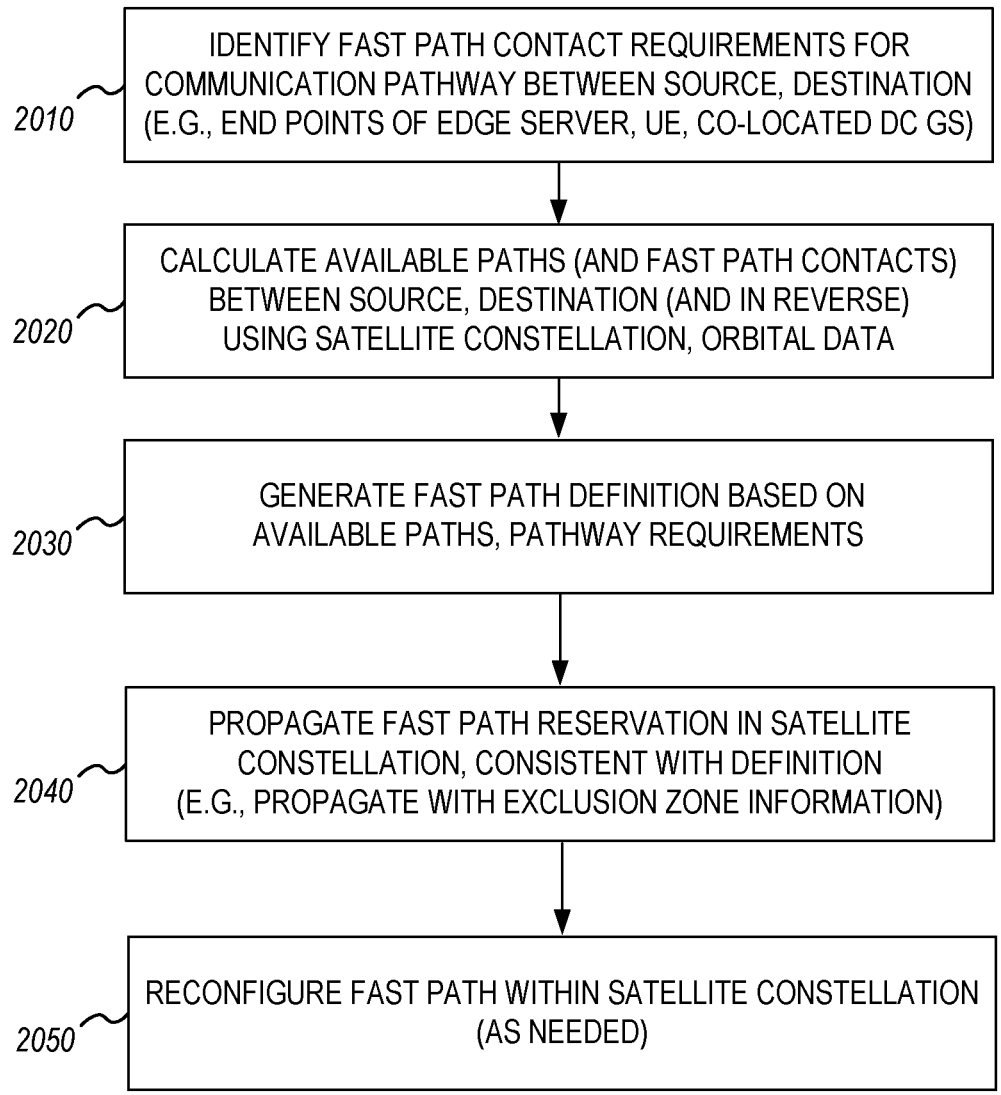
FIG. 20 illustrates a flowchart of a method of implementing fast path communications for inter-satellite communications in a non-terrestrial communication network, according to an example.

FIG. 20 provides a flowchart of an example method 2000 for configuration and use of a fast path using ISLs, according to an example. It will be understood that this method may be adapted for the use of a predetermined path or a dynamic path, including adaptive aspects discussed above.

At operation 2010, fast path requirements for a satellite communication pathway between a source and destination are identified. Such a source and destination may involve endpoints among an edge server, UE device, or a co-located data center ground station. In an example, identification of the fast path may include consideration of one or more tiers of service level agreements (SLAs), to ensure that adequate bandwidth and network capacity are reserved to meet the SLA. In various examples, such requirements may be calculated in a manner to reserve satellite and terrestrial network resources between some source and destination, while considering that the satellite network is in orbit (and thus, relevant satellites which are used for the fast path are changing).

At operation 2020, available inter-satellite link paths between the source and destination, and in reverse between the destination and the source, are calculated and determined. Such paths may include a calculation of fast path contacts (SVs) between the source and destination and in reverse. (The calculation in one direction may be different than in a reverse direction, since the terrestrial network/non-terrestrial network configuration may change). This determination may include or be based on the calculation of locations of orbital positions of satellite constellations which are accessible from a source satellite uplink location to a destination satellite downlink location, and vice versa. This determination may also be based on a variety of terrestrial network (TN) data and non-terrestrial network (NTN) orbital data, potentially from different TN and NTN networks. In particular, the pathway may result from a combination of TN/NTN nodes that can be managed by different network and service providers with roaming agreements.

At operation 2030, a fast path definition is generated based on the available paths, and pathway requirements. As noted above, these pathway requirements may include SLA requirements. These "available paths" may also include TN and NTN networks from TN and NTN constellations of different providers (e.g., that have TN/NTN roaming agreements in place). Such available paths may also include common "paths" using the same TN and NTN frequencies (e.g., 12 GHz).

At operation 2040, the fast path definition is propagated to the LEO constellation, which causes the constellation to reserve resources and establish a reservation for use with the fast path. In an example, the fast path definition is communicated to the LEO constellation at the same time as exclusion zone information.

At operation 2050, the fast path and routing within the satellite constellation may be reconfigured, as necessary. Thus, although the fast path definition may be embedded in the TTAC routing payload, a constellation may provide some inline real-time course corrections to the fast path (especially if the SV has some computational capability). For instance, if a telemetry event or adverse occurrence puts a particular SV out of service (solar storm, battery disruption, etc.), then other forms of routing may occur. Likewise, if one SV is not able to contact another SV, then dynamic rerouting may occur to find an alternate pathway.

Any number of routing algorithms may be used for path routing, planning, prediction, and adjustment. Likewise, various forms of telemetry analysis, real-time sensors, and network analysis may be used as part of the fast path definition and analysis.

Figure 21:
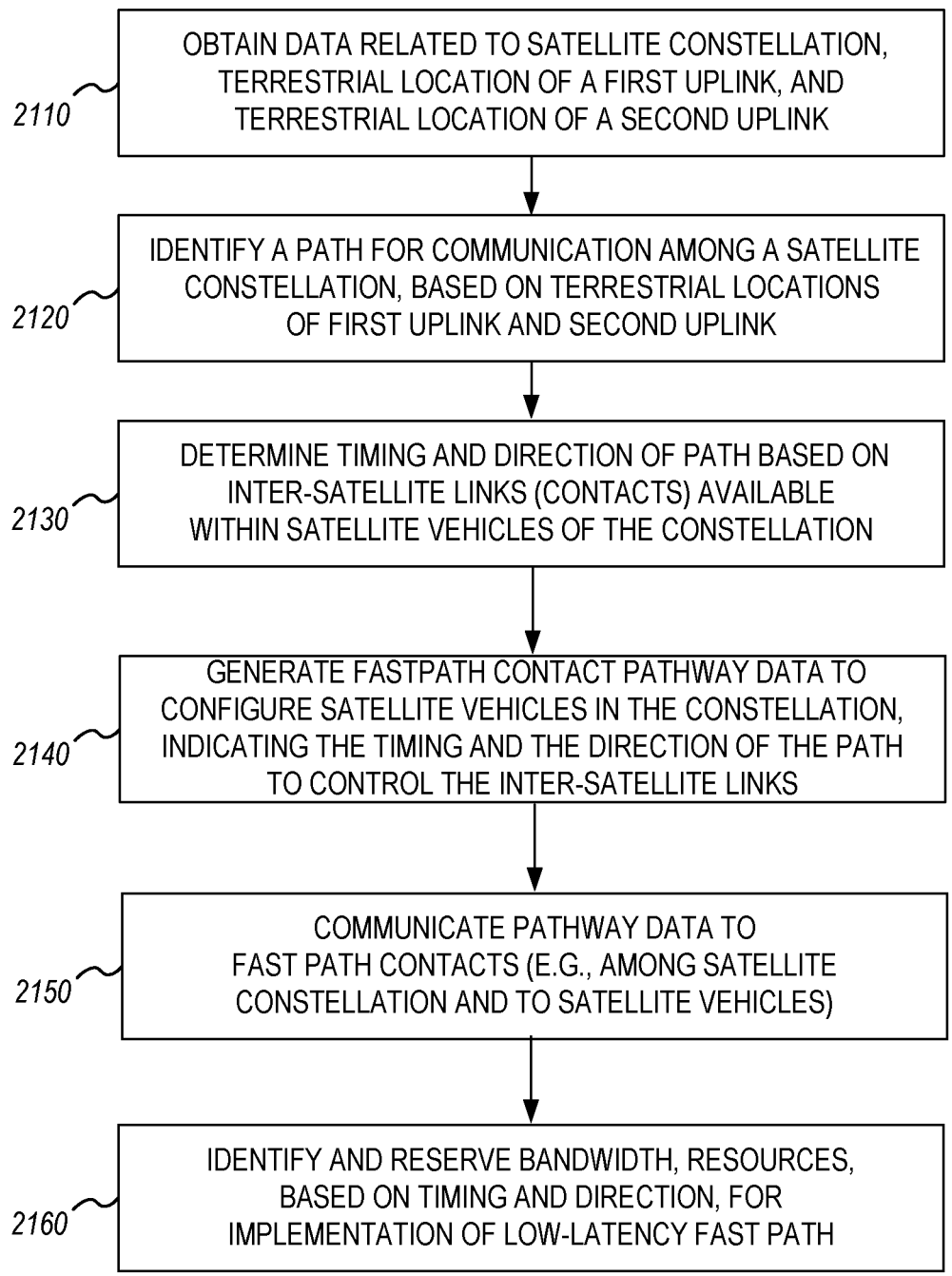
FIG. 21 illustrates a flowchart of a process performed by a terrestrial-based (ground) processing system for establishing fast path communications using inter-satellite communications in a non-terrestrial communication network, according to an example.

FIG. 21 illustrates a flowchart 2100 of an example process performed by a terrestrial-based (ground) processing system for establishing fast path communications using inter-satellite communications in a non-terrestrial communication network. It will be understood that corresponding operations may be performed by other systems and devices, consistent with the examples discussed above.

The flowchart 2100 begins at operation 2110, to obtain data related to a satellite constellation, a terrestrial location of a first uplink, and a terrestrial location of a second uplink. In an example, the satellite constellation includes a plurality of satellite vehicles, and is configured as a low-earth orbit (LEO) satellite constellation, having a plurality of satellite vehicles that are in orbit.

The flowchart 2100 continues at operation 2120, to identify (e.g., determine, calculate, adjust, etc.) a communication path for inter-satellite link communications within a satellite constellation, based on terrestrial locations of first uplink and second uplink. This path may be defined using various inter-satellite links, such as duplex optical communication links (e.g., linked from a particular (first) satellite vehicle of the satellite constellation to send and receive data with one or multiple other satellite vehicles (second, third) of the satellite constellation). As noted above, such inter-satellite links may be defined at a respective satellite vehicle based on one or more of fore, aft, right, and left directions from the respective satellite vehicle. The direction of the communication path can be used to control use of the duplex optical communication links in the one or more of fore, aft, right, and left directions.

The flowchart 2100 continues at operation 2130, to determine timing and direction of the communication path based on inter-satellite links between contacts, such as ISLs available among satellite vehicles of a constellation (or multiple constellations). This determination also may be based on dynamic, real-time availability information, or information indicating projections or changes to a constellation orbit. In a specific example, the operation(s) to determine the timing and/or direction of the communication path are based in part on: computations performed by computing hardware of the plurality of satellite vehicles, or telemetry data provided from memory (e.g., generated on-board) of the plurality of satellite vehicles. It will also be understood that constellations that have established roaming agreements can also be included, such that the configuration for fast path contact pathways may be considered for allowed constellations.

The flowchart 2100 continues at operation 2140, to generate pathway data to configure satellite vehicles (fast path contacts) in the constellation, indicating the timing and the direction of the communication path to control the inter-satellite links. In an example, the timing and the direction of the communication path includes changes to the inter-satellite links (e.g., during different times of orbit of the constellation) to use different of the plurality of satellite vehicles, e.g., based on orbits of respective vehicles and accessibility of the first and second satellite uplinks.

The flowchart 2100 continues at operation 2150, to communicate pathway data to respective fast path contacts, such as various entities among the satellite constellation and to respective satellite vehicles. In an example, this is communicated using routing table updates or routing configurations, such as discussed above with reference to exclusion zone examples. In other examples, aspects of a routing protocol, routing protocol data, routing data, or configuration data (e.g., in a particular format) for routing and routing settings may be communicated to enable or change the fast path.

In an example, the operations (e.g., operations 2110-2140) are performed by a computing device located at a third terrestrial location or other on-ground location (e.g., processing server), and the operations are iteratively or repeatedly performed based on timing and position information associated with calculated orbit positions of the plurality of satellite vehicles. In a specific example, the pathway data is communicated to the plurality of satellite vehicles via a routing table or like routing data. As noted above, such routing information may be used to control future orbital positions of the plurality of satellite vehicles, and the routing table may contain instructions (e.g., commands) to effectuate the inter-satellite links and related network routing actions.

The flowchart concludes at operation 2160, to identify and reserve bandwidth, resources, based on timing and direction, for implementation of a fast path. In an example, the fast path is defined in the satellite constellation as a low-latency communication path, such that at least one property of the communication path is prioritized relative to other communication paths used among the plurality of satellite vehicles. The low-latency communication path may be implemented according to one or more parameters, settings, or features of at least one data communication protocol (e.g., which is specific to inter-satellite link communications, or like network connections). For instance, the timing of the communication path may correspond to a time period of a subscription for the low-latency communication path, as the low-latency communication path is operated based on characteristics of at least one service level agreement associated with the subscription. In still further examples, bandwidth resources may be reserved for this low-latency communication path within the satellite constellation during this time period.

In further examples, the satellite constellation described with reference to flowchart 2100 is a first satellite constellation, and further operations (not depicted) may include: obtaining data related to a second constellation having a second plurality of satellite vehicles; identifying a portion of the communication path (determined in operation 2120) for communication in the second satellite constellation; determine the timing and the direction of the communication path (further to operation 2130) based on a second set of inter-satellite links available among the second plurality of satellite vehicles; and generate second pathway data for configuration of the second plurality of satellite vehicles (further to operation 2140), with such second pathway data indicating the timing and the direction of the communication path to control the second inter-satellite links and coordinate the communication path with the inter-satellite links configured in the first satellite constellation.

Also in further examples, the fast path determination or deployment operations may be coordinated with those used for exclusion zones. For instance, for each established fast path contact (e.g., SVs in a constellation used for the communication pathway), a new fast path exclusion zone can be created for that constellation. This can be used for reserving the resources of the originating constellation that, in turn, is communicated to other constellations and service providers that have roaming agreements in place.

Implementation in Edge Computing Scenarios

It will be understood that the present satellite communication and networking arrangements may be integrated with many aspects of edge computing strategies and deployments. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by: moving workloads onto compute equipment at satellite vehicles; using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

Figure 22:
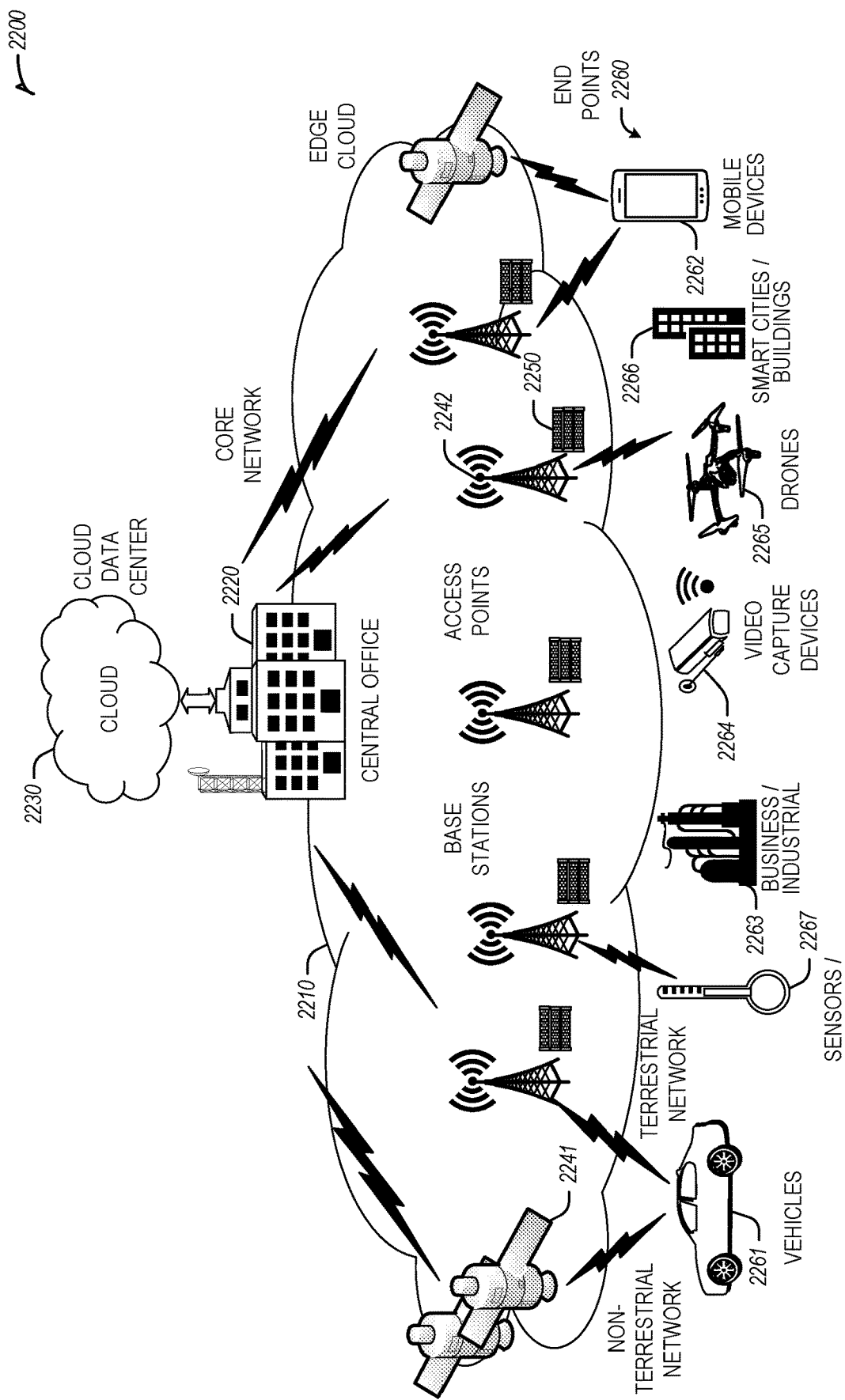
FIG. 22 illustrates an overview of an edge cloud configuration for edge computing, according to an example.

FIG. 22 is a block diagram 2200 showing an overview of a configuration for edge computing, which includes a layer of processing referenced in many of the current examples as an "edge cloud". This network topology, which may include a number of conventional networking layers (including those not shown herein), may be extended through use of the satellite and non-terrestrial network communication arrangements discussed herein.

As shown, the edge cloud 2210 is co-located at an edge location, such as a satellite vehicle 2241, a base station 2242, a local processing hub 2250, or a central office 2220, and thus may include multiple entities, devices, and equipment instances. The edge cloud 2210 is located much closer to the endpoint (consumer and producer) data sources 2260 (e.g., autonomous vehicles 2261, user equipment 2262, business and industrial equipment 2263, video capture devices 2264, drones 2265, smart cities and building devices 2266, sensors and IoT devices 2267, etc.) than the cloud data center 2230. Compute, memory, and storage resources which are offered at the edges in the edge cloud 2210 are critical to providing ultra-low or improved latency response times for services and functions used by the endpoint data sources 2260 as well as reduce network backhaul traffic from the edge cloud 2210 toward cloud data center 2230 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time. In the scenario of non-terrestrial network, distance and latency may be far to and from the satellite, but data processing may be better accomplished at edge computing hardware in the satellite vehicle rather requiring additional data connections and network backhaul to and from the cloud.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource will be "moved" to the data, as well as scenarios in which the data will be "moved" to the compute resource. Or as an example, base station (or satellite vehicle) compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 22, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 23:
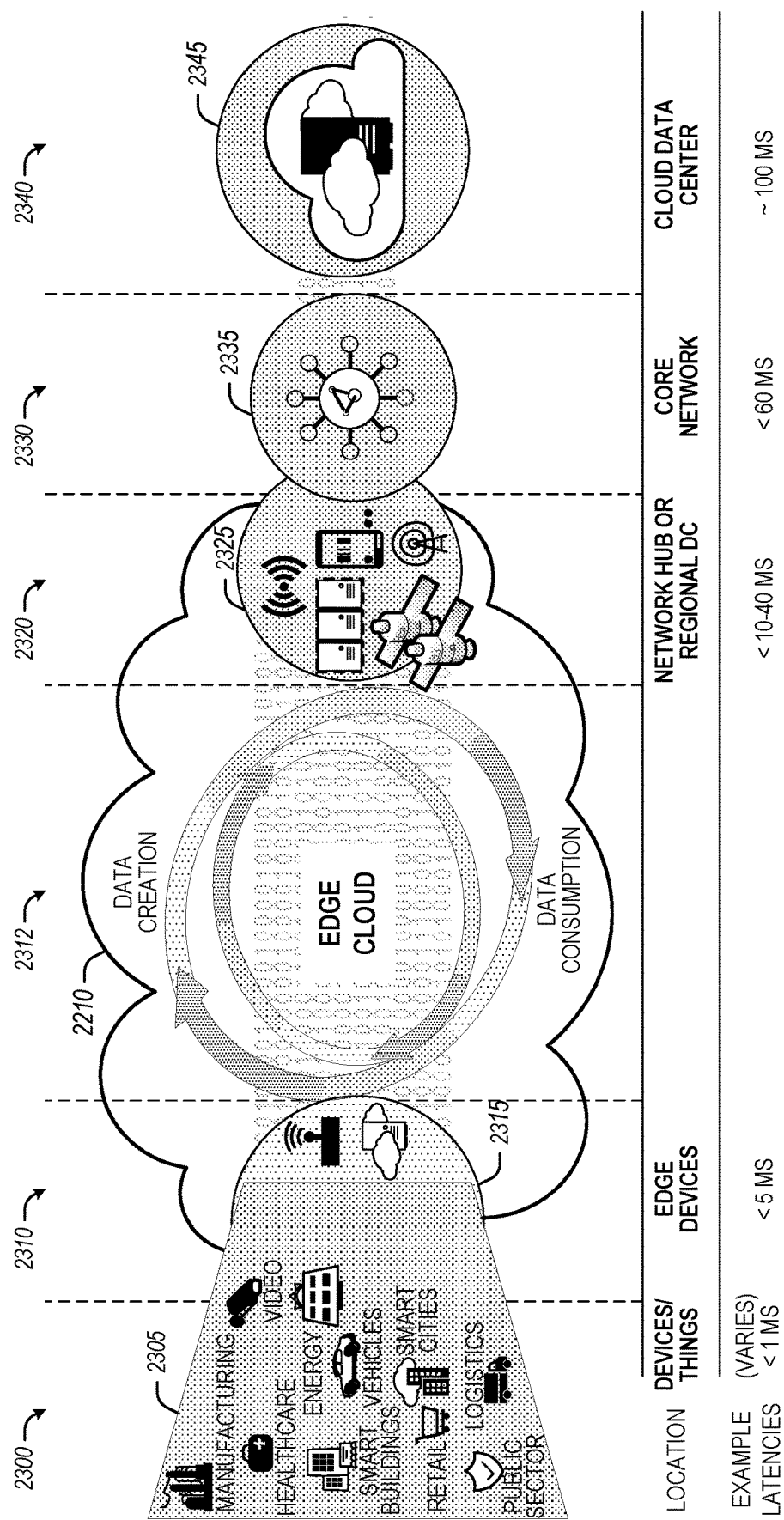
FIG. 23 illustrates an overview of layers of distributed compute deployed among an edge computing system, according to an example.

FIG. 23 illustrates operational layers among endpoints, an edge cloud, and cloud computing environments. Specifically, FIG. 23 depicts examples of computational use cases 2305, utilizing the edge cloud 2210 among multiple illustrative layers of network computing. The layers begin at an endpoint (devices and things) layer 2300, which accesses the edge cloud 2210 to conduct data creation, analysis, and data consumption activities. The edge cloud 2210 may span multiple network layers, such as an edge devices layer 2310 having gateways, on-premise servers, or network equipment (nodes 2315) located in physically proximate edge systems; a network access layer 2320, encompassing base stations, radio processing units, network hubs, regional data centers (DC), or local network equipment (equipment 2325); and any equipment, devices, or nodes located therebetween (in layer 2312, not illustrated in detail). The network communications within the edge cloud 2210 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 2300, under 5 ms at the edge devices layer 2310, to even between 10 to 40 ms when communicating with nodes at the network access layer 2320. (Variation to these latencies is expected with use of non-terrestrial networks). Beyond the edge cloud 2210 are core network 2330 and cloud data center 2340 layers, each with increasing latency (e.g., between 50-60 ms at the core network layer 2330, to 100 or more ms at the cloud data center layer). As a result, operations at a core network data center 2335 or a cloud data center 2345, with latencies of at least 50 to 100 ms or more, will not be able to accomplish many time-critical functions of the use cases 2305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2335 or a cloud data center 2345, a central office or content data network may be considered as being located within a "near edge" layer ("near" to the cloud, having high latency values when communicating with the devices and endpoints of the use cases 2305), whereas an access point, base station, on-premise server, or network gateway may be considered as located within a "far edge" layer ("far" from the cloud, having low latency values when communicating with the devices and endpoints of the use cases 2305). It will be understood that other categorizations of a particular network layer as constituting a "close", "local", "near", "middle", or "far" edge may be based on latency, distance, number of network hops, or other measurable characteristics, as measured from a source in any of the network layers 2300-2340.

The various use cases 2305 may access resources under usage pressure from incoming streams, due to multiple services utilizing the edge cloud. To achieve results with low latency, the services executed within the edge cloud 2210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2210 may provide the ability to serve and respond to multiple applications of the use cases 2305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications which require connection via satellite, and the additional latency that trips via satellite would require to the cloud.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2210 (network layers 2300-2340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2210.

As such, the edge cloud 2210 is formed from network components and functional features operated by and within edge gateway nodes, edge aggregation nodes, or other edge compute nodes among network layers 2310-2330. The edge cloud 2210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2210 may be servers, multi-tenant servers, appliance computing devices, and/or any other type of computing devices. For example, a node of the edge cloud 2210 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 26B. The edge cloud 2210 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 24:
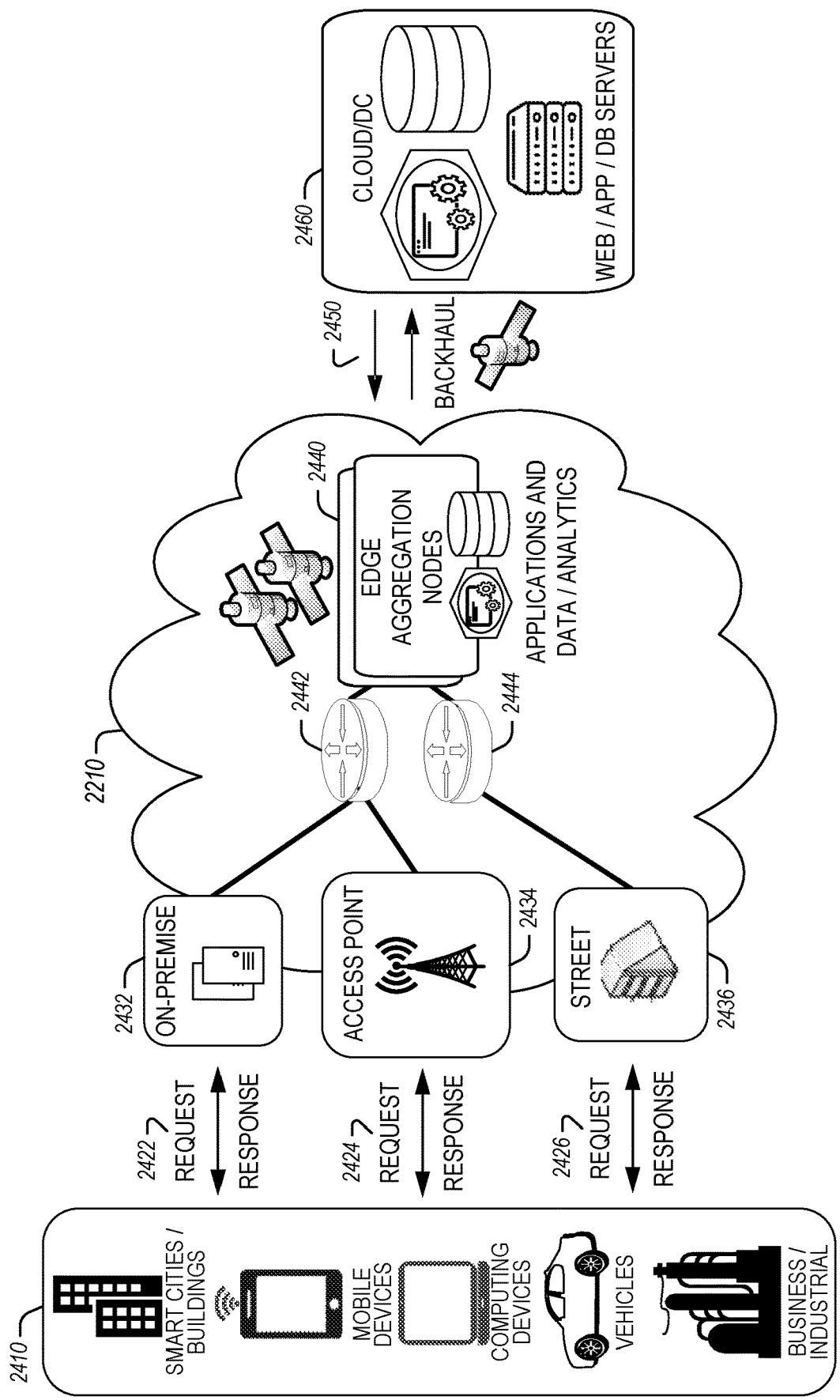
FIG. 24 illustrates operational layers among endpoints, an edge cloud, and cloud computing environments.

In FIG. 24, various client endpoints 2410 (in the form of mobile devices, computers, autonomous vehicles, business computing equipment, industrial processing equipment) exchange requests and responses that are specific to the type of endpoint network aggregation. For instance, client endpoints 2410 may obtain network access via a wired broadband network, by exchanging requests and responses 2422 through an on-premise network system 2432. Some client endpoints 2410, such as mobile computing devices, may obtain network access via a wireless broadband network, by exchanging requests and responses 2424 through an access point (e.g., cellular network tower) 2434. Some client endpoints 2410, such as autonomous vehicles may obtain network access for requests and responses 2426 via a wireless vehicular network through a street-located network system 2436. However, regardless of the type of network access, the TSP may deploy aggregation points 2442, 2444 within the edge cloud 2210 to aggregate traffic and requests. Thus, within the edge cloud 2210, the TSP may deploy various compute and storage resources, such as at edge aggregation nodes 2440 (including those located at satellite vehicles), to provide requested content. The edge aggregation nodes 2440 and other systems of the edge cloud 2210 are connected to a cloud or data center 2460, which uses a backhaul network 2450 (such as a satellite backhaul) to fulfill higher-latency requests from a cloud/data center for websites, applications, database servers, etc. Additional or consolidated instances of the edge aggregation nodes 2440 and the aggregation points 2442, 2444, including those deployed on a single server framework, may also be present within the edge cloud 2210 or other areas of the TSP infrastructure.

At a more generic level, an edge computing system may be described to encompass any number of deployments operating in the edge cloud 2210, which provide coordination from client and distributed computing devices. FIG. 23 provides a further abstracted overview of layers of distributed compute deployed among an edge computing environment for purposes of illustration.

Figure 25:
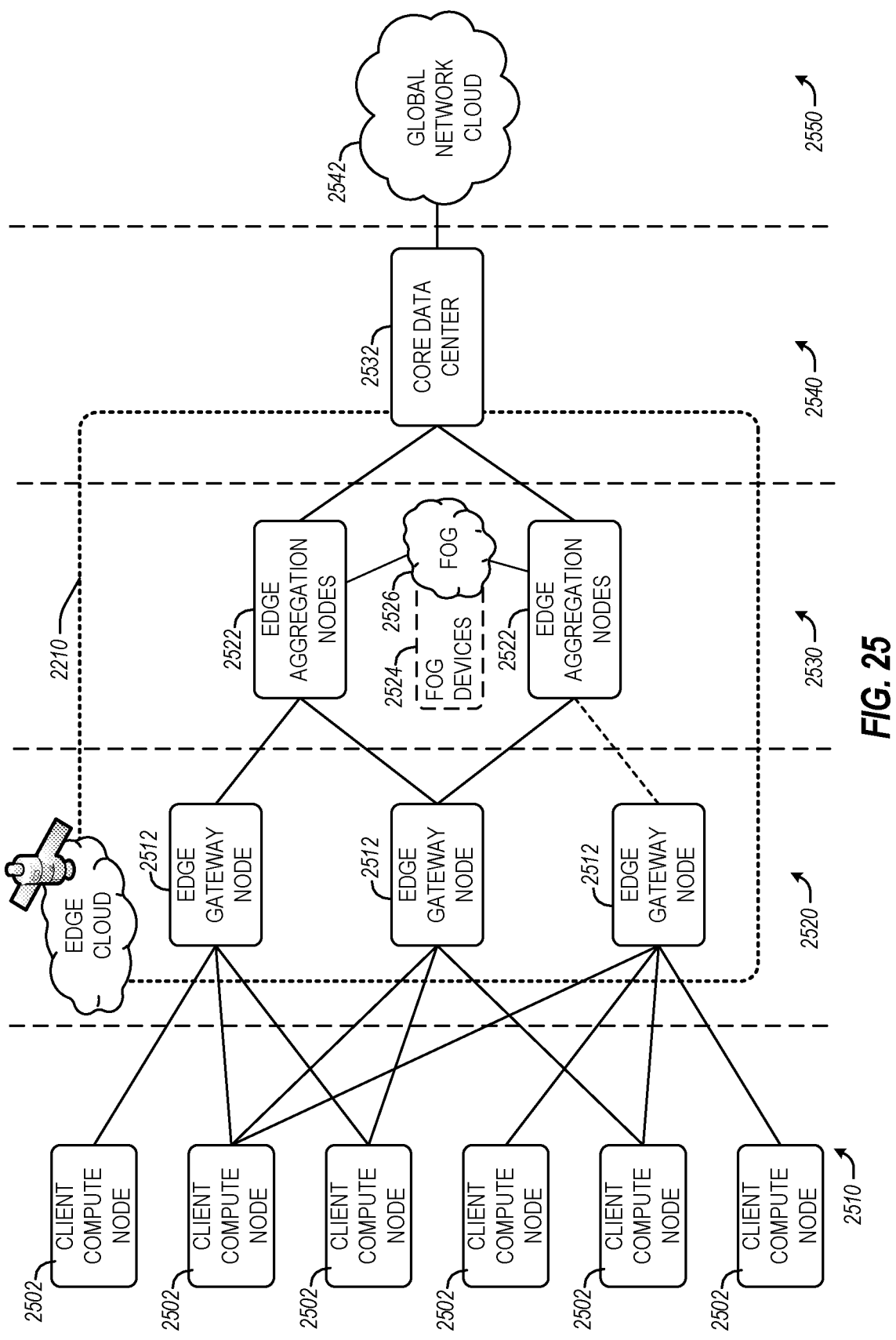
FIG. 25 illustrates an example approach for networking and services in an edge computing system.

FIG. 25 generically depicts an edge computing system for providing edge services and applications to multi-stakeholder entities, as distributed among one or more client compute nodes 2502, one or more edge gateway nodes 2512, one or more edge aggregation nodes 2522, one or more core data centers 2532, and a global network cloud 2542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 2510, 2520, 2530, 2540, 2550. For example, the client compute nodes 2502 are each located at an endpoint layer 2510, while each of the edge gateway nodes 2512 are located at an edge devices layer 2510 (local level) of the edge computing system. Additionally, each of the edge aggregation nodes 2522 (and/or fog devices 2524, if arranged or operated with or among a fog networking configuration 2526) are located at a network access layer 2520 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 2532 is located at a core network layer 252330 (e.g., a regional or geographically-central level), while the global network cloud 2542 is located at a cloud data center layer 252340 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 2532 may be located within, at, or near the edge cloud 2210.

Although an illustrative number of client compute nodes 2502, edge gateway nodes 2512, edge aggregation nodes 2522, core data centers 2532, global network clouds 2542 are shown in FIG. 25, it should be appreciated that the edge computing system may include more or fewer devices or systems at each layer. Additionally, as shown in FIG. 25, the number of components of each layer 2510, 2520, 2530, 2540, 2550 generally increases at each lower level (i.e., when moving closer to endpoints). As such, one edge gateway node 2512 may service multiple client compute nodes 2502, and one edge aggregation node 2522 may service multiple edge gateway nodes 2512.

Consistent with the examples provided herein, each client compute node 2502 may be embodied as any type of end point component, device, appliance, or "thing" capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2210.

As such, the edge cloud 2210 is formed from network components and functional features operated by and within the edge gateway nodes 2512 and the edge aggregation nodes 2522 of layers 2520, 2530, respectively. The edge cloud 2210 may be embodied as any type of network that provides edge computing and/or storage resources which are proximately located to radio access network (RAN) capable endpoint devices (e.g., mobile computing devices, IoT devices, smart devices, etc.), which are shown in FIG. 25 as the client compute nodes 2502. In other words, the edge cloud 2210 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 2210 may form a portion of or otherwise provide an ingress point into or across a fog networking configuration 2526 (e.g., a network of fog devices 2524, not shown in detail), which may be embodied as a system-level horizontal and distributed architecture that distributes resources and services to perform a specific function. For instance, a coordinated and distributed network of fog devices 2524 may perform computing, storage, control, or networking aspects in the context of an IoT system arrangement. Other networked, aggregated, and distributed functions may exist in the edge cloud 2210 between the cloud data center layer 2550 and the client endpoints (e.g., client compute nodes 2502). Some of these are discussed in the following sections in the context of network functions or service virtualization, including the use of virtual edges and virtual services which are orchestrated for multiple stakeholders.

The edge gateway nodes 2512 and the edge aggregation nodes 2522 cooperate to provide various edge services and security to the client compute nodes 2502. Furthermore, because each client compute node 2502 may be stationary or mobile, each edge gateway node 2512 may cooperate with other edge gateway devices to propagate presently provided edge services and security as the corresponding client compute node 2502 moves about a region. To do so, each of the edge gateway nodes 2512 and/or edge aggregation nodes 2522 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 26A and 26B. Each compute node may be embodied as a type of device, appliance, computer, or other "thing" capable of communicating with other edge, networking, or endpoint components.

Figure 26A:
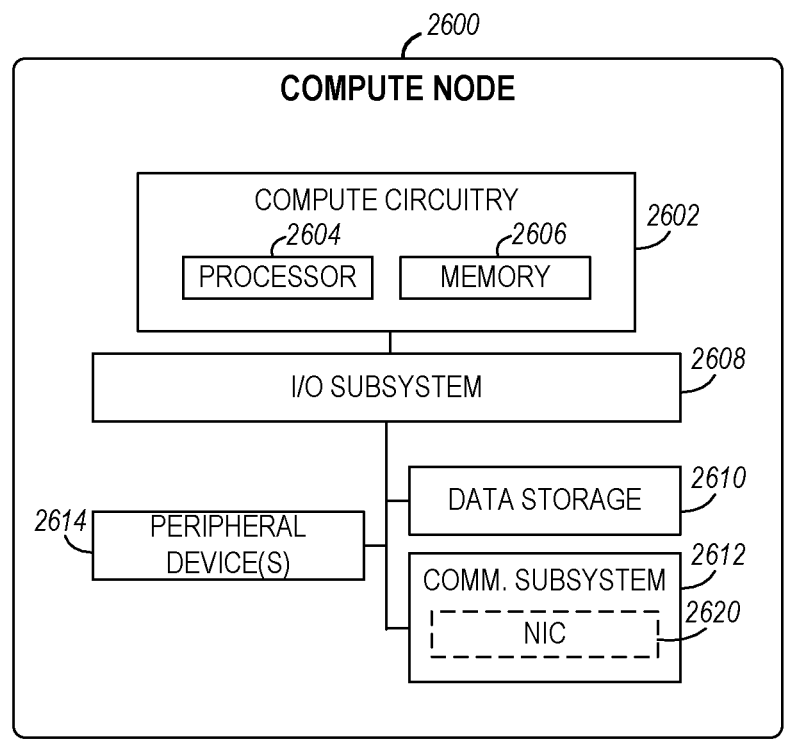
FIG. 26A illustrates an overview of example components deployed at a compute node system, according to an example.

In the simplified example depicted in FIG. 26A, an edge compute node 2600 includes a compute engine (also referred to herein as "compute circuitry") 2602, an input/output (I/O) subsystem 2608, data storage 2610, a communication circuitry subsystem 2612, and, optionally, one or more peripheral devices 2614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 2600 may be embodied as any type of engine, device, or collection of devices capable of performing various compute functions. In some examples, the compute node 2600 may be embodied as a single device such as an integrated circuit, an embedded system, a field-programmable gate array (FPGA), a system-on-a-chip (SOC), or other integrated system or device. In the illustrative example, the compute node 2600 includes or is embodied as a processor 2604 and a memory 2606. The processor 2604 may be embodied as any type of processor capable of performing the functions described herein (e.g., executing an application). For example, the processor 2604 may be embodied as a multi-core processor(s), a microcontroller, or other processor or processing/controlling circuit. In some examples, the processor 2604 may be embodied as, include, or be coupled to an FPGA, an application specific integrated circuit (ASIC), reconfigurable hardware or hardware circuitry, or other specialized hardware to facilitate performance of the functions described herein.

The main memory 2606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory, other storage class memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2606 may be integrated into the processor 2604. The main memory 2606 may store various software and data used during operation such as one or more applications, data operated on by the application(s), libraries, and drivers.

The compute circuitry 2602 is communicatively coupled to other components of the compute node 2600 via the I/O subsystem 2608, which may be embodied as circuitry and/or components to facilitate input/output operations with the compute circuitry 2602 (e.g., with the processor 2604 and/or the main memory 2606) and other components of the compute circuitry 2602. For example, the I/O subsystem 2608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2608 may form a portion of a system-on-a-chip (SoC) and be incorporated, along with one or more of the processor 2604, the main memory 2606, and other components of the compute circuitry 2602, into the compute circuitry 2602.

The one or more illustrative data storage devices 2610 may be embodied as any type of devices configured for short-term or long-term storage of data such as, for example, memory devices and circuits, memory cards, hard disk drives, solid-state drives, or other data storage devices. Each data storage device 2610 may include a system partition that stores data and firmware code for the data storage device 2610. Each data storage device 2610 may also include one or more operating system partitions that store data files and executables for operating systems depending on, for example, the type of compute node 2600.

The communication circuitry 2612 may be embodied as any communication circuit, device, or collection thereof, capable of enabling communications over a network between the compute circuitry 2602 and another compute device (e.g., an edge gateway node 2512 of an edge computing system). The communication circuitry 2612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 2612 includes a network interface controller (NIC) 2620, which may also be referred to as a host fabric interface (HFI). The NIC 2620 may be embodied as one or more add-in-boards, daughter cards, network interface cards, controller chips, chipsets, or other devices that may be used by the compute node 2600 to connect with another compute device (e.g., an edge gateway node 2512). In some examples, the NIC 2620 may be embodied as part of a system-on-a-chip (SoC) that includes one or more processors, or included on a multichip package that also contains one or more processors. In some examples, the NIC 2620 may include a local processor (not shown) and/or a local memory (not shown) that are both local to the NIC 2620. In such examples, the local processor of the NIC 2620 may be capable of performing one or more of the functions of the compute circuitry 2602 described herein. Additionally or alternatively, in such examples, the local memory of the NIC 2620 may be integrated into one or more components of the client compute node at the board level, socket level, chip level, and/or other levels.

Additionally, in some examples, each compute node 2600 may include one or more peripheral devices 2614. Such peripheral devices 2614 may include any type of peripheral device found in a compute device or server such as audio input devices, a display, other input/output devices, interface devices, and/or other peripheral devices, depending on the particular type of the compute node 2600. In further examples, the compute node 2600 may be embodied by a respective edge compute node in an edge computing system (e.g., client compute node 2502, edge gateway node 2512, edge aggregation node 2522) or like forms of appliances, computers, subsystems, circuitry, or other components.

Figure 26B:
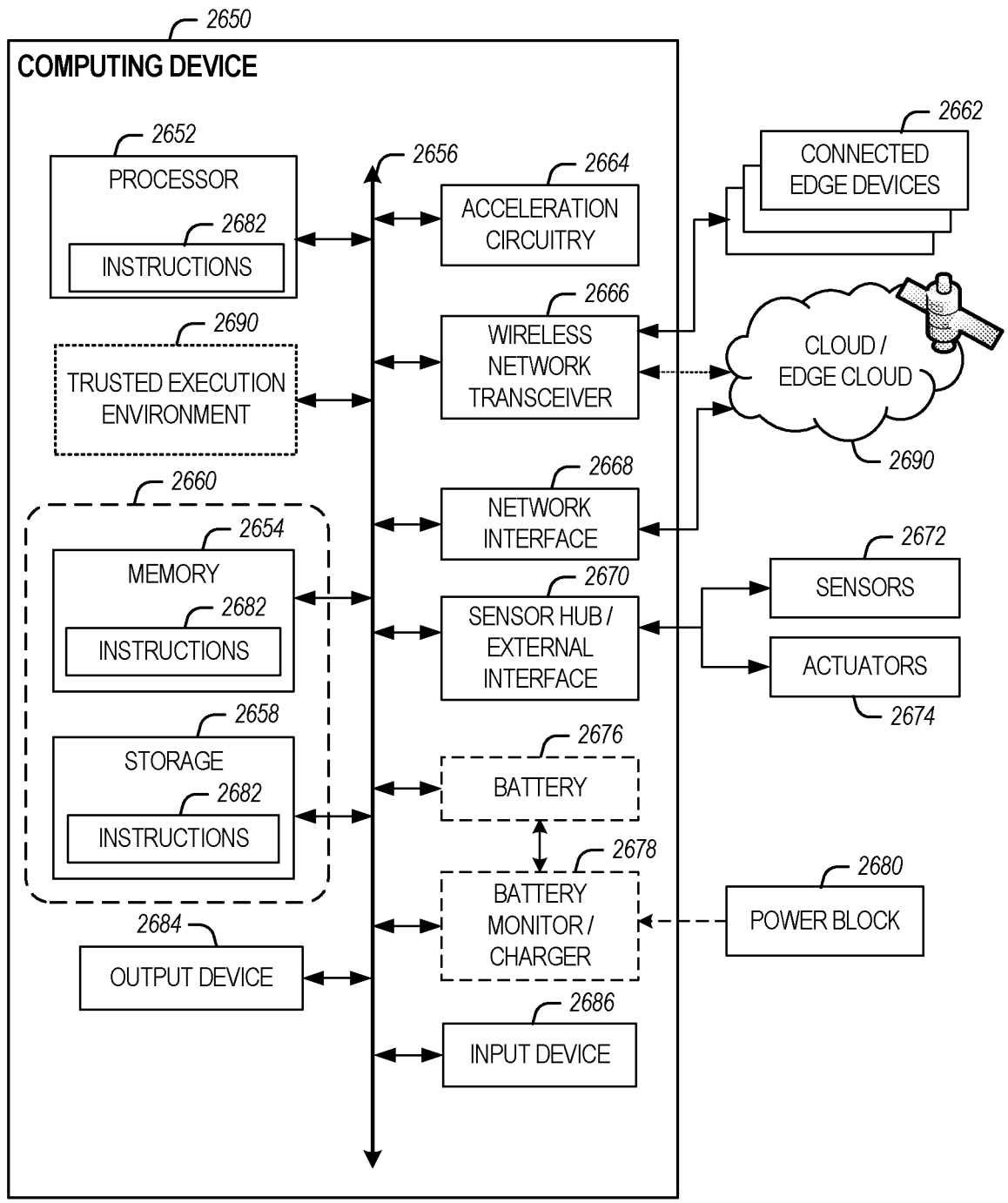
FIG. 26B illustrates a further overview of example components within a computing device, according to an example.

In a more detailed example, FIG. 26B illustrates a block diagram of an example of components that may be present in an edge computing node 2650 for implementing the techniques (e.g., operations, processes, methods, and methodologies) described herein. The edge computing node 2650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 2650, or as components otherwise incorporated within a chassis of a larger system. Further, to support the security examples provided herein, a hardware RoT (e.g., provided according to a DICE architecture) may be implemented in each IP block of the edge computing node 2650 such that any IP Block could boot into a mode where a RoT identity could be generated that may attest its identity and its current booted firmware to another IP Block or to an external entity.

The edge computing node 2650 may include processing circuitry in the form of a processor 2652, which may be a microprocessor, a multi-core processor, a multithreaded processor, an ultra-low voltage processor, an embedded processor, or other known processing elements. The processor 2652 may be a part of a system on a chip (SoC) in which the processor 2652 and other components are formed into a single integrated circuit, or a single package, such as the Edison™ or Galileo™ SoC boards from Intel Corporation, Santa Clara, California. As an example, the processor 2652 may include an Intel® Architecture Core™ based processor, such as a Quark™, an Atom™, a Xeon™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 2652 may communicate with a system memory 2654 over an interconnect 2656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2658 may also couple to the processor 2652 via the interconnect 2656. In an example, the storage 2658 may be implemented via a solid-state disk drive (SSDD). Other devices that may be used for the storage 2658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2658 may be on-die memory or registers associated with the processor 2652. However, in some examples, the storage 2658 may be implemented using a micro hard disk drive (HDD). Further, any number of new technologies may be used for the storage 2658 in addition to, or instead of, the technologies described, such resistance change memories, phase change memories, holographic memories, or chemical memories, among others.

The components may communicate over the interconnect 2656. The interconnect 2656 may include any number of technologies, including industry standard architecture (ISA), extended ISA (EISA), peripheral component interconnect (PCI), peripheral component interconnect extended (PCIx), PCI express (PCIe), NVLink, or any number of other technologies. The interconnect 2656 may be a proprietary bus, for example, used in an SoC based system. Other bus systems may be included, such as an I2C interface, an SPI interface, point to point interfaces, and a power bus, among others.

The interconnect 2656 may couple the processor 2652 to a transceiver 2666, for communications with the connected edge devices 2662. The transceiver 2666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2666 (or multiple transceivers) may communicate using multiple standards or radios for communications at a different range. For example, the edge computing node 2650 may communicate with close devices, e.g., within about 10 meters, using a local transceiver based on BLE, or another low power radio, to save power. More distant connected edge devices 2662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 2666 (e.g., a radio transceiver) may be included to communicate with devices or services in the edge cloud 2690 via local or wide area network protocols. The wireless network transceiver 2666 may be an LPWA transceiver that follows the IEEE 802.15.4, or IEEE 802.15.4g standards, among others. The edge computing node 2650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2666, as described herein. For example, the transceiver 2666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2668 may be included to provide a wired communication to nodes of the edge cloud 2690 or to other devices, such as the connected edge devices 2662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2668 may be included to enable connecting to a second network, for example, a first NIC 2668 providing communications to the cloud over Ethernet, and a second NIC 2668 providing communications to other devices over another type of network.

Given the variety of types of applicable communications from the device to another component or network, applicable communications circuitry used by the device may include or be embodied by any one or more of components 2664, 2666, 2668, or 2670. Accordingly, in various examples, applicable means for communicating (e.g., receiving, transmitting, etc.) may be embodied by such communications circuitry.

The edge computing node 2650 may include or be coupled to acceleration circuitry 2664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 2656 may couple the processor 2652 to a sensor hub or external interface 2670 that is used to connect additional devices or subsystems. The devices may include sensors 2672, such as accelerometers, level sensors, flow sensors, optical light sensors, camera sensors, temperature sensors, a global positioning system (GPS) sensors, pressure sensors, barometric pressure sensors, and the like. The hub or interface 2670 further may be used to connect the edge computing node 2650 to actuators 2674, such as power switches, valve actuators, an audible sound generator, a visual warning device, and the like.

In some optional examples, various input/output (I/O) devices may be present within or connected to, the edge computing node 2650. For example, a display or other output device 2684 may be included to show information, such as sensor readings or actuator position. An input device 2686, such as a touch screen or keypad may be included to accept input. An output device 2684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 2650.

A battery 2676 may power the edge computing node 2650, although, in examples in which the edge computing node 2650 is mounted in a fixed location, it may have a power supply coupled to an electrical grid. The battery 2676 may be a lithium ion battery, or a metal-air battery, such as a zinc-air battery, an aluminum-air battery, a lithium-air battery, and the like.

A battery monitor/charger 2678 may be included in the edge computing node 2650 to track the state of charge (SoCh) of the battery 2676. The battery monitor/charger 2678 may be used to monitor other parameters of the battery 2676 to provide failure predictions, such as the state of health (SoH) and the state of function (SoF) of the battery 2676. The battery monitor/charger 2678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2678 may communicate the information on the battery 2676 to the processor 2652 over the interconnect 2656. The battery monitor/charger 2678 may also include an analog-to-digital (ADC) converter that enables the processor 2652 to directly monitor the voltage of the battery 2676 or the current flow from the battery 2676. The battery parameters may be used to determine actions that the edge computing node 2650 may perform, such as transmission frequency, mesh network operation, sensing frequency, and the like.

A power block 2680, or other power supply coupled to a grid, may be coupled with the battery monitor/charger 2678 to charge the battery 2676. In some examples, the power block 2680 may be replaced with a wireless power receiver to obtain the power wirelessly, for example, through a loop antenna in the edge computing node 2650. A wireless battery charging circuit, such as an LTC4020 chip from Linear Technologies of Milpitas, California, among others, may be included in the battery monitor/charger 2678. The specific charging circuits may be selected based on the size of the battery 2676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2658 may include instructions 2682 in the form of software, firmware, or hardware commands to implement the techniques described herein. Although such instructions 2682 are shown as code blocks included in the memory 2654 and the storage 2658, it may be understood that any of the code blocks may be replaced with hardwired circuits, for example, built into an application specific integrated circuit (ASIC).

In an example, the instructions 2682 provided via the memory 2654, the storage 2658, or the processor 2652 may be embodied as a non-transitory, machine-readable medium 2660 including code to direct the processor 2652 to perform electronic operations in the edge computing node 2650. The processor 2652 may access the non-transitory, machine-readable medium 2660 over the interconnect 2656. For instance, the non-transitory, machine-readable medium 2660 may be embodied by devices described for the storage 2658 or may include specific storage units such as optical disks, flash drives, or any number of other hardware devices. The non-transitory, machine-readable medium 2660 may include instructions to direct the processor 2652 to perform a specific sequence or flow of actions, for example, as described with respect to the flowchart(s) and block diagram (s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 26A and 26B are intended to depict a high-level view of components of a device, subsystem, or arrangement of an edge computing node. However, it will be understood that some of the components shown may be omitted, additional components may be present, and a different arrangement of the components shown may occur in other implementations.

Figure 27:
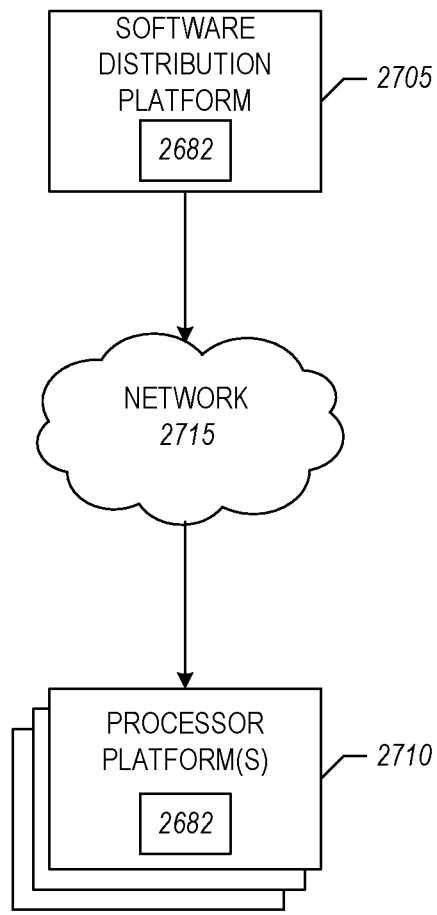
FIG. 27 illustrates a software distribution platform to distribute software instructions and derivatives, according to an example.

FIG. 27 illustrates an example software distribution platform 2705 to distribute software, such as the example computer readable instructions 2682 of FIG. 26B, to one or more devices, such as example processor platform(s) 2710 and/or other example connected edge devices or systems discussed herein. The example software distribution platform 2705 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 2705). Example connected edge devices may operate in commercial and/or home automation environments. In some examples, a third party is a developer, a seller, and/or a licensor of software such as the example computer readable instructions 2682 of FIG. 26B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 27, the software distribution platform 2705 includes one or more servers and one or more storage devices that store the computer readable instructions 2682. The one or more servers of the example software distribution platform 2705 are in communication with a network 2715, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2682 from the software distribution platform 2705. For example, the software, which may correspond to example computer readable instructions, may be downloaded to the example processor platform(s), which is/are to execute the computer readable instructions 2682. In some examples, one or more servers of the software distribution platform 2705 are communicatively connected to one or more security domains and/or security devices through which requests and transmissions of the example computer readable instructions 2682 must pass. In some examples, one or more servers of the software distribution platform 2705 periodically offer, transmit, and/or force updates to the software (e.g., the example computer readable instructions 2682 of FIG. 26B) to ensure improvements, patches, updates, etc. are distributed and applied to the software at the end user devices.

In the illustrated example of FIG. 27, the computer readable instructions 2682 are stored on storage devices of the software distribution platform 2705 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 2682 stored in the software distribution platform 2705 are in a first format when transmitted to the example processor platform(s) 2710. In some examples, the first format is an executable binary in which particular types of the processor platform(s) 2710 can execute. However, in some examples, the first format is uncompiled code that requires one or more preparation tasks to transform the first format to a second format to enable execution on the example processor platform(s) 2710. For instance, the receiving processor platform(s) 2700 may need to compile the computer readable instructions 2682 in the first format to generate executable code in a second format that is capable of being executed on the processor platform(s) 2710. In still other examples, the first format is interpreted code that, upon reaching the processor platform(s) 2710, is interpreted by an interpreter to facilitate execution of instructions.

In the examples above, many references were provided to low-earth orbit (LEO) satellites and constellations. However, it will be understood that the examples above are also relevant to many forms of middle-earth orbit satellites and constellations, geosynchronous orbit satellites and constellations, and other high altitude communication platforms such as balloons. Thus, it will be understood that the techniques discussed for LEO network settings are also applicable to many other network settings.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing device, comprising: processing circuitry; and a memory device including instructions embodied thereon, wherein the instructions, which when executed by the processing circuitry, configure the processing circuitry to perform operations to define an inter-satellite link pathway, with operations to: identify a communication path for inter-satellite link communications in a satellite constellation, the communication path identified based on a terrestrial location of a first satellite uplink to the satellite constellation and a terrestrial location of a second satellite uplink to the satellite constellation, the satellite constellation comprising a plurality of satellite vehicles; determine a timing and a direction of the communication path within the satellite constellation based on inter-satellite links available among the plurality of satellite vehicles; and generate pathway data for configuration of the plurality of satellite vehicles, the pathway data indicating the timing and the direction of the communication path to control the inter-satellite links.

In Example 2, the subject matter of Example 1 optionally includes subject matter where the computing device is located at a third terrestrial location, and wherein operations are performed based on timing and position information associated with calculated orbit positions of the plurality of satellite vehicles.

In Example 3, the subject matter of any one or more of Examples 1-2 optionally include subject matter where the pathway data is communicated to the plurality of satellite vehicles with a routing table, the routing table to control future orbital positions of the plurality of satellite vehicles, and the routing table containing instructions to effectuate the inter-satellite links.

In Example 4, the subject matter of any one or more of Examples 1-3 optionally include subject matter where the inter-satellite links are duplex optical communication links, and wherein one or multiple of the duplex optical communication links from a first satellite vehicle of the satellite constellation are used in the communication path to send and receive data with one or multiple other satellite vehicles of the satellite constellation.

In Example 5, the subject matter of Example 4 optionally includes subject matter where the inter-satellite links are defined at a respective satellite vehicle of the plurality of satellite vehicles based on one or more of fore, aft, right, and left directions from the respective satellite vehicle, and wherein the direction of the communication path is used to control use of the duplex optical communication links in the one or more of fore, aft, right, and left directions.

In Example 6, the subject matter of any one or more of Examples 1-5 optionally include subject matter where the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

In Example 7, the subject matter of any one or more of Examples 1-6 optionally include subject matter where the communication path is defined in the satellite constellation as a low-latency communication path operating according to at least one data communication protocol, and wherein at least one property of the communication path is prioritized relative to other communication paths used among the plurality of satellite vehicles.

In Example 8, the subject matter of Example 7 optionally includes subject matter where the timing of the communication path corresponds to a time period of a subscription for the low-latency communication path, and wherein the low-latency communication path is operated based on characteristics of at least one service level agreement associated with the subscription.

In Example 9, the subject matter of Example 8 optionally includes subject matter where bandwidth resources are reserved for the low-latency communication path within the satellite constellation during the time period.

In Example 10, the subject matter of any one or more of Examples 1-9 optionally include subject matter where the processing circuitry is further to perform operations to process data associated with availability of the inter-satellite links, wherein the configuration of the plurality of satellite vehicles is based on the availability of the inter-satellite links; and further optionally, the operations to determine the timing and direction of the communication path are based in part on: computations performed by computing hardware of the plurality of satellite vehicles, or telemetry data provided from memory of the plurality of satellite vehicles.

In Example 11, the subject matter of any one or more of Examples 1-10 optionally include subject matter where the satellite constellation is a first satellite constellation, and wherein the operations further: identify a portion of the communication path for communication in a second satellite constellation, the second satellite constellation comprising a second plurality of satellite vehicles; determine the timing and the direction of the communication path based on second inter-satellite links available among the second plurality of satellite vehicles; and generate second pathway data for configuration of the second plurality of satellite vehicles, the second pathway data indicating the timing and the direction of the communication path to control the second inter-satellite links and coordinate the communication path with the inter-satellite links configured in the first satellite constellation.

Example 12 is a method for defining an inter-satellite link pathway, implemented with operations executed with processing circuitry of a computing device, the method comprising: identifying a communication path for inter-satellite link communications in a satellite constellation, the communication path identified based on a terrestrial location of a first satellite uplink to the satellite constellation and a terrestrial location of a second satellite uplink to the satellite constellation, the satellite constellation comprising a plurality of satellite vehicles; determining a timing and a direction of the communication path based on inter-satellite links available among the plurality of satellite vehicles; and generating pathway data for configuration of the plurality of satellite vehicles, the pathway data indicating the timing and the direction of the communication path to control the inter-satellite links.

In Example 13, the subject matter of Example 12 optionally includes subject matter where the method is performed at a third terrestrial location, and wherein the method is performed based on timing and position information associated with calculated orbit positions of the plurality of satellite vehicles.

In Example 14, the subject matter of any one or more of Examples 12-13 optionally include subject matter where the pathway data is communicated to the plurality of satellite vehicles with a routing table, the routing table to control future orbital positions of the plurality of satellite vehicles, and the routing table containing instructions to effectuate the inter-satellite links.

In Example 15, the subject matter of any one or more of Examples 12-14 optionally include subject matter where the inter-satellite links are duplex optical communication links; wherein one or multiple of the duplex optical communication links from a first satellite vehicle of the satellite constellation are used in the communication path to send and receive data with one or multiple other satellite vehicles of the satellite constellation; and optionally, wherein the inter-satellite links are defined at a respective satellite vehicle of the plurality of satellite vehicles based on one or more of fore, aft, right, and left directions from the respective satellite vehicle, and wherein the direction of the communication path is used to control use of the duplex optical communication links in the one or more of fore, aft, right, and left directions.

In Example 16, the subject matter of any one or more of Examples 12-15 optionally include subject matter where the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

In Example 17, the subject matter of any one or more of Examples 12-16 optionally include subject matter where the communication path is defined in the satellite constellation as a low-latency communication path operating according to at least one data communication protocol, wherein at least one property of the communication path is prioritized relative to other communication paths used among the plurality of satellite vehicles; and optionally, wherein the timing of the communication path corresponds to a time period of a subscription for the low-latency communication path, wherein the low-latency communication path is operated based on characteristics of at least one service level agreement associated with the subscription; and optionally, wherein bandwidth resources are reserved for the low-latency communication path within the satellite constellation during the time period.

In Example 19, the subject matter of any one or more of Examples 12-17 optionally includes receiving data associated with availability of the inter-satellite links, wherein the configuration of the plurality of satellite vehicles is based on the availability of the inter-satellite links; and optionally, where determining the timing and direction of the communication path is based at least in part on: computations performed by computing hardware of the plurality of satellite vehicles, or telemetry data provided from memory of the plurality of satellite vehicles.

Example 19 is at least one non-transitory computer-readable storage medium including instructions, wherein the instructions, when executed by processing circuitry of a computing device, cause the processing circuitry to perform operations comprising: identifying a communication path for inter-satellite link communications in a satellite constellation, the communication path identified based on a terrestrial location of a first satellite uplink to the satellite constellation and a terrestrial location of a second satellite uplink to the satellite constellation, the satellite constellation comprising a plurality of satellite vehicles; determining a timing and a direction of the communication path based on inter-satellite links available among the plurality of satellite vehicles; and generating pathway data for configuration of the plurality of satellite vehicles, the pathway data indicating the timing and the direction of the communication path to control the inter-satellite links.

In Example 20, the subject matter of Example 19 optionally includes subject matter where the operations are performed at a third terrestrial location, and wherein operations are performed based on timing and position information associated with calculated orbit positions of the plurality of satellite vehicles.

In Example 21, the subject matter of any one or more of Examples 19-20 optionally include subject matter where the pathway data is communicated to the plurality of satellite vehicles with a routing table, the routing table to control future orbital positions of the plurality of satellite vehicles, and the routing table containing instructions to effectuate the inter-satellite links.

In Example 22, the subject matter of any one or more of Examples 19-21 optionally include subject matter where the inter-satellite links are duplex optical communication links; wherein one or multiple of the duplex optical communication links from a first satellite vehicle of the satellite constellation are used in the communication path to send and receive data with one or multiple other satellite vehicles of the satellite constellation; wherein the inter-satellite links are defined at a respective satellite vehicle of the plurality of satellite vehicles based on one or more of fore, aft, right, and left directions from the respective satellite vehicle; and wherein the direction of the communication path is used to control use of the duplex optical communication links in the one or more of fore, aft, right, and left directions.

In Example 23, the subject matter of any one or more of Examples 19-22 optionally include subject matter where the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

In Example 24, the subject matter of any one or more of Examples 19-23 optionally include subject matter where the communication path is defined in the satellite constellation as a low-latency communication path operating according to at least one data communication protocol; wherein at least one property of the communication path is prioritized relative to other communication paths used among the plurality of satellite vehicles; wherein the timing of the communication path corresponds to a time period of a subscription for the low-latency communication path; wherein the low-latency communication path is operated based on characteristics of at least one service level agreement associated with the subscription; and wherein bandwidth resources are reserved for the low-latency communication path within the satellite constellation during the time period.

In Example 25, the subject matter of any one or more of Examples 19-24 optionally include subject matter where determining the timing and direction of the communication path is based at least in part on: computations performed by computing hardware of the plurality of satellite vehicles, or telemetry data provided from memory of the plurality of satellite vehicles.

Example 26 is an apparatus, comprising: means for identifying a communication path for inter-satellite link communications in a satellite constellation, the communication path identified based on a terrestrial location of a first satellite uplink to the satellite constellation and a terrestrial location of a second satellite uplink to the satellite constellation, the satellite constellation comprising a plurality of satellite vehicles; means for determining a timing and a direction of the communication path based on inter-satellite links available among the plurality of satellite vehicles; and means for generating pathway data for configuration of the plurality of satellite vehicles, the pathway data indicating the timing and the direction of the communication path to control the inter-satellite links.

In Example 27, the subject matter of Example 26 optionally includes means for evaluating data based on timing and position information associated with calculated orbit positions of the plurality of satellite vehicles, wherein the apparatus is located at a third terrestrial location.

In Example 28, the subject matter of any one or more of Examples 26-27 optionally include means for communicating the pathway data to the plurality of satellite vehicles, within a routing table, the routing table to control future orbital positions of the plurality of satellite vehicles, and the routing table containing instructions to effectuate the inter-satellite links.

In Example 29, the subject matter of any one or more of Examples 26-28 optionally include means for evaluating duplex optical communication links of the inter-satellite links, wherein one or multiple of the duplex optical communication links from a first satellite vehicle of the satellite constellation are used in the communication path to send and receive data with one or multiple other satellite vehicles of the satellite constellation.

In Example 30, the subject matter of Example 29 optionally includes means for defining the inter-satellite links for a respective satellite vehicle of the plurality of satellite vehicles based on one or more of fore, aft, right, and left directions from the respective satellite vehicle, wherein the direction of the communication path is used to control use of the duplex optical communication links in the one or more of fore, aft, right, and left directions.

In Example 31, the subject matter of any one or more of Examples 26-30 optionally include means for evaluating data from the satellite constellation, the satellite constellation being a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

In Example 32, the subject matter of any one or more of Examples 26-31 optionally include means for evaluating the communication path that is defined in the satellite constellation as a low-latency communication path operating according to at least one data communication protocol, wherein at least one property of the communication path is prioritized relative to other communication paths used among the plurality of satellite vehicles.

In Example 33, the subject matter of Example 32 optionally includes means for identifying the timing of the communication path to correspond to a time period of a subscription for the low-latency communication path, wherein the low-latency communication path is operated based on characteristics of at least one service level agreement associated with the subscription.

In Example 34, the subject matter of Example 33 optionally includes means for reserving bandwidth resources for the low-latency communication path within the satellite constellation during the time period.

In Example 35, the subject matter of any one or more of Examples 26-34 optionally include means for evaluating the timing and direction of the communication path based at least in part on: computations performed by computing hardware of the plurality of satellite vehicles, or telemetry data provided from memory of the plurality of satellite vehicles.

In Example 36, the subject matter of any one or more of Examples 26-35 optionally include means for identifying a portion of the communication path for communication in a second satellite constellation, the second satellite constellation comprising a second plurality of satellite vehicles; means for determining the timing and the direction of the communication path based on second inter-satellite links available among the second plurality of satellite vehicles; and means for generating second pathway data for configuration of the second plurality of satellite vehicles, the second pathway data indicating the timing and the direction of the communication path to control the second inter-satellite links and coordinate the communication path with the inter-satellite links configured in the first satellite constellation.

Example 37 is a device, comprising: processing circuitry; and a memory device including instructions embodied thereon, wherein the instructions, which when executed by the processing circuitry, configure the processing circuitry to perform operations for implementing, deploying, or using a satellite ultra-low latency communication pathway, in accordance with Examples 1-36, or the other techniques discussed herein.

Example 38 is a method, comprising a plurality of operations executed with a processor and memory of a device, to perform the implementing, deploying, or using of a satellite ultra-low latency communication pathway, in accordance with Examples 1-36, or the other techniques discussed herein.

Example 39 is a non-transitory device-readable storage medium including instructions, wherein the instructions, when executed by a processing circuitry of a device, cause the processing circuitry to perform implementing, deploying, or using of a satellite ultra-low latency communication pathway, in accordance with Examples 1-36, or the other techniques discussed herein.

Example 40 is an apparatus, comprising respective means for implementing, deploying, or using a satellite ultra-low latency communication pathway, in accordance with Examples 1-36, or the other techniques discussed herein.

Example 41 is a satellite vehicle comprising circuitry for implementing, deploying, or using a satellite ultra-low latency communication pathway, in accordance with Examples 1-36, or the other techniques discussed herein.

Example 42 is a satellite constellation comprising respective satellite vehicles for implementing, deploying, or using a satellite ultra-low latency communication pathway, in accordance with Examples 1-36, or the other techniques discussed herein.

Example 43 is a user equipment communications device comprising circuitry for implementing, deploying, or using a satellite ultra-low latency communication pathway, in accordance with Examples 1-36, or the other techniques discussed herein.

Example 44 is a 5G communication network, comprising network equipment configured for implementing, deploying, or using a satellite ultra-low latency communication pathway, in accordance with Examples 1-36, or the other techniques discussed herein.

Example 45 is an edge computing system, comprising terrestrial processing equipment configured for implementing, deploying, or using a satellite ultra-low latency communication pathway, in accordance with Examples 1-36, or the other techniques discussed herein.

Example 46 is a network comprising respective devices and device communication mediums for performing any of the operations or techniques in Examples 1-45, or discussed herein.

Example 47 is a system comprising respective components arranged or configured to perform any of the operations or techniques in Examples 1-45, or discussed herein.

Example 48 is a method, performed using specially configured circuitry of a device, arranged or configured to perform any of the operations or techniques in Examples 1-45, or discussed herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

What is claimed is:

1. A computing device, comprising:
    processing circuitry; and
    a memory device including instructions embodied thereon, wherein the instructions, which when executed by the processing circuitry, configure the processing circuitry to perform operations to establish an inter-satellite link pathway, with operations to:
        identify a communication path for inter-satellite link communications in a satellite constellation, the communication path identified based on a first terrestrial location of a first satellite uplink to the satellite constellation and a second terrestrial location of a second satellite uplink to the satellite constellation, the satellite constellation comprising a plurality of satellite vehicles;
        determine a timing and a direction of the communication path within the satellite constellation based on inter-satellite links available among the plurality of satellite vehicles, wherein at least one property of the communication path is identified to be prioritized relative to other communication paths used among the plurality of satellite vehicles; and
        generate pathway data for configuration of the plurality of satellite vehicles, the pathway data indicating the timing and the direction of the communication path to control the inter-satellite links, wherein bandwidth resources of the inter-satellite links are reserved for the communication path between a first satellite of the satellite constellation used for the first satellite uplink and a second satellite of the satellite constellation used for the second satellite uplink;
    wherein the computing device is located at a third terrestrial location, and wherein the pathway data is provided with commands communicated to the satellite constellation.

2. The computing device of claim 1, wherein operations to determine the timing and the direction of the communication path are based on calculations performed on timing and position information associated with calculated orbit positions of the plurality of satellite vehicles.

3. The computing device of claim 1, wherein the pathway data is communicated to the plurality of satellite vehicles with a routing table, the routing table to control future orbital positions of the plurality of satellite vehicles, and the routing table containing instructions to effectuate the inter-satellite links.

4. The computing device of claim 1, wherein the inter-satellite links are duplex optical communication links, and wherein one or multiple of the duplex optical communication links from a first satellite vehicle of the satellite constellation are used in the communication path to send and receive data with one or multiple other satellite vehicles of the satellite constellation.

5. The computing device of claim 4, wherein the inter-satellite links are defined at a respective satellite vehicle of the plurality of satellite vehicles based on one or more of fore, aft, right, and left directions from the respective satellite vehicle, and wherein the direction of the communication path is used to control use of the duplex optical communication links in the one or more of fore, aft, right, and left directions.

6. The computing device of claim 1, wherein the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

7. The computing device of claim 1, wherein the communication path is defined in the satellite constellation as a low-latency communication path operating according to at least one data communication protocol.

8. The computing device of claim 7, wherein the timing of the communication path corresponds to a time period of a subscription for the low-latency communication path, and wherein the low-latency communication path is operated based on characteristics of at least one service level agreement associated with the subscription.

9. The computing device of claim 1, wherein the instructions further configure the processing circuitry to perform operations to:
process data associated with availability of the inter-satellite links, wherein the configuration of the plurality of satellite vehicles is based on the availability of the inter-satellite links.

10. The computing device of claim 9, wherein the operations to determine the timing and direction of the communication path are based in part on: computations performed by computing hardware of the plurality of satellite vehicles, or telemetry data provided from memory of the plurality of satellite vehicles.

11. The computing device of claim 1, wherein the satellite constellation is a first satellite constellation, and wherein the instructions configure the processing circuitry to:
identify a portion of the communication path for use in a second satellite constellation, the second satellite constellation comprising a second plurality of satellite vehicles;
determine the timing and the direction of the communication path based on second inter-satellite links available among the second plurality of satellite vehicles; and
generate second pathway data for configuration of the second plurality of satellite vehicles, the second pathway data indicating the timing and the direction of the communication path to control the second inter-satellite links and coordinate the communication path with the inter-satellite links configured in the first satellite constellation.

12. A method for defining an inter-satellite link pathway, implemented with operations executed with processing circuitry of a computing device, the method comprising:
identifying a communication path for inter-satellite link communications in a satellite constellation, the communication path identified based on a terrestrial location of a first satellite uplink to the satellite constellation and a terrestrial location of a second satellite uplink to the satellite constellation, the satellite constellation comprising a plurality of satellite vehicles;
determining a timing and a direction of the communication path based on inter-satellite links available among the plurality of satellite vehicles, wherein at least one property of the communication path is identified to be prioritized relative to other communication paths used among the plurality of satellite vehicles; and
generating pathway data for configuration of the plurality of satellite vehicles, the pathway data indicating the timing and the direction of the communication path to control the inter-satellite links, wherein bandwidth resources of the inter-satellite links are reserved for the communication path between a first satellite of the satellite constellation used for the first satellite uplink and a second satellite of the satellite constellation used for the second satellite uplink;
wherein the computing device is located at a third terrestrial location, and wherein the pathway data is provided with commands communicated to the satellite constellation.

13. The method of claim 12, wherein determining the timing and the direction of the communication path is based on calculations performed on timing and position information associated with calculated orbit positions of the plurality of satellite vehicles.

14. The method of claim 12, wherein the pathway data is communicated to the plurality of satellite vehicles with a routing table, the routing table to control future orbital positions of the plurality of satellite vehicles, and the routing table containing instructions to effectuate the inter-satellite links.

15. The method of claim 12, wherein the inter-satellite links are duplex optical communication links;
wherein one or multiple of the duplex optical communication links from a first satellite vehicle of the satellite constellation are used in the communication path to send and receive data with one or multiple other satellite vehicles of the satellite constellation;
wherein the inter-satellite links are defined at a respective satellite vehicle of the plurality of satellite vehicles based on one or more of fore, aft, right, and left directions from the respective satellite vehicle; and
wherein the direction of the communication path is used to control use of the duplex optical communication links in the one or more of fore, aft, right, and left directions.

16. The method of claim 12, wherein the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

17. The method of claim 12, wherein the communication path is defined in the satellite constellation as a low-latency communication path operating according to at least one data communication protocol;
wherein the timing of the communication path corresponds to a time period of a subscription for the low-latency communication path; and
wherein the low-latency communication path is operated based on characteristics of at least one service level agreement associated with the subscription.

18. The method of claim 12, further comprising receiving data associated with availability of the inter-satellite links, wherein the configuration of the plurality of satellite vehicles is based on the availability of the inter-satellite links.

19. The method of claim 18, wherein determining the timing and direction of the communication path is based at least in part on: computations performed by computing hardware of the plurality of satellite vehicles, or telemetry data provided from memory of the plurality of satellite vehicles.

20. At least one non-transitory computer-readable storage medium including instructions, wherein the instructions, when executed by processing circuitry of a computing device, cause the processing circuitry to perform operations comprising:

identifying a communication path for inter-satellite link communications in a satellite constellation, the communication path identified based on a first terrestrial location of a first satellite uplink to the satellite constellation and a second terrestrial location of a second satellite uplink to the satellite constellation, the satellite constellation comprising a plurality of satellite vehicles;

determining a timing and a direction of the communication path based on inter-satellite links available among the plurality of satellite vehicles, wherein at least one property of the communication path is identified to be prioritized relative to other communication paths used among the plurality of satellite vehicles; and generating pathway data for configuration of the plurality of satellite vehicles, the pathway data indicating the timing and the direction of the communication path to control the inter-satellite links, wherein bandwidth resources of the inter-satellite links are reserved for the communication path between a first satellite of the satellite constellation used for the first satellite uplink and a second satellite of the satellite constellation used for the second satellite uplink;

wherein the computing device is located at a third terrestrial location, and wherein the pathway data is provided with commands communicated to the satellite constellation.

21. The computer-readable storage medium of claim 20, wherein operations to determine the timing and the direction of the communication path are based on calculations performed on timing and position information associated with calculated orbit positions of the plurality of satellite vehicles.

22. The computer-readable storage medium of claim 20, wherein the pathway data is communicated to the plurality of satellite vehicles with a routing table, the routing table to control future orbital positions of the plurality of satellite vehicles, and the routing table containing instructions to effectuate the inter-satellite links.

23. The computer-readable storage medium of claim 20, wherein the inter-satellite links are duplex optical communication links;

wherein one or multiple of the duplex optical communication links from a first satellite vehicle of the satellite constellation are used in the communication path to send and receive data with one or multiple other satellite vehicles of the satellite constellation;

wherein the inter-satellite links are defined at a respective satellite vehicle of the plurality of satellite vehicles based on one or more of fore, aft, right, and left directions from the respective satellite vehicle; and wherein the direction of the communication path is used to control use of the duplex optical communication links in the one or more of fore, aft, right, and left directions.

24. The computer-readable storage medium of claim 20, wherein the satellite constellation is a low-earth orbit (LEO) satellite constellation, wherein the plurality of satellite vehicles are in-orbit, and wherein the timing and the direction of the communication path includes changes to the inter-satellite links to use different of the plurality of satellite vehicles based on orbits of respective vehicles and accessibility of the first and second satellite uplinks.

25. The computer-readable storage medium of claim 20, wherein the communication path is defined in the satellite constellation as a low-latency communication path operating according to at least one data communication protocol;

wherein the timing of the communication path corresponds to a time period of a subscription for the low-latency communication path; and wherein the low-latency communication path is operated based on characteristics of at least one service level agreement associated with the subscription.

26. The computer-readable storage medium of claim 20, wherein determining the timing and direction of the communication path is based at least in part on: computations performed by computing hardware of the plurality of satellite vehicles, or telemetry data provided from memory of the plurality of satellite vehicles.

\* \* \* \* \*